(12) United States Patent
Kato et al.

(10) Patent No.: US 12,176,717 B2
(45) Date of Patent: Dec. 24, 2024

(54) GRID SYSTEM, CONTROL DEVICE, CONTROL METHOD FOR GRID SYSTEM, AND POWER CONVERSION DEVICE

(71) Applicant: Mitsubishi Electric Corporation, Tokyo (JP)

(72) Inventors: Takahiro Kato, Tokyo (JP); Sadayuki Inoue, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 850 days.

(21) Appl. No.: 17/270,443

(22) PCT Filed: Oct. 23, 2018

(86) PCT No.: PCT/JP2018/039351
§ 371 (c)(1),
(2) Date: Feb. 23, 2021

(87) PCT Pub. No.: WO2020/084688
PCT Pub. Date: Apr. 30, 2020

(65) Prior Publication Data
US 2021/0257839 A1 Aug. 19, 2021

(51) Int. Cl.
*H02J 3/38* (2006.01)
*G05B 11/32* (2006.01)
(Continued)

(52) U.S. Cl.
CPC ............. *H02J 3/381* (2013.01); *G05B 11/32* (2013.01); *G05F 1/67* (2013.01); *H02J 3/32* (2013.01)

(58) Field of Classification Search
None
See application file for complete search history.

(56) References Cited

U.S. PATENT DOCUMENTS

2014/0222239 A1* 8/2014 Watanabe ................. G05F 1/66
700/297
2015/0357820 A1* 12/2015 Sugimoto ............... H02M 7/04
307/52
(Continued)

FOREIGN PATENT DOCUMENTS

CN 102570489 A 7/2012
CN 106030450 A 10/2016
(Continued)

OTHER PUBLICATIONS

International Search Report and Written Opinion mailed on Dec. 11, 2018, received for PCT Application PCT/JP2018/039351, Filed on Oct. 23, 2018, 8 pages including English Translation.
(Continued)

*Primary Examiner* — David Earl Ogg
(74) *Attorney, Agent, or Firm* — XSENSUS LLP

(57) ABSTRACT

A grid system includes a voltage source, a plurality of consumers connected to the voltage source via a distribution grid, and a grid control unit for transmitting a power command value to a device provided to each consumer. The consumer is provided with a power generation device, a power storage device, and power conversion devices for converting respective powers of the power generation device and the power storage device. The power conversion devices respectively include power command correction means for correcting the power command value from the grid control unit on the basis of the frequency of voltage at a power receiving point X2 which is a connection point between the consumer and the distribution grid. The power command value for the power conversion device of the power generation device is set to be greater than the power command value for the power conversion device of the power storage device.

15 Claims, 27 Drawing Sheets

(51) Int. Cl.
 G05F 1/67 (2006.01)
 H02J 3/32 (2006.01)

(56) References Cited

U.S. PATENT DOCUMENTS

2016/0072281 A1* 3/2016 Izumi ................... H02J 3/381
                                                        307/66
2016/0329713 A1* 11/2016 Berard .................. H02J 3/32
2017/0179722 A1* 6/2017 Porter .................. H02J 3/32
2019/0199129 A1* 6/2019 Kobayashi ............ H02S 50/00

FOREIGN PATENT DOCUMENTS

JP      2007-129845 A      5/2007
JP      2015-198526 A     11/2015
WO   WO-2018116823 A1 *   6/2018  .............. H02J 3/16

OTHER PUBLICATIONS

Chinese Office Action issued Jul. 5, 2023, in corresponding Chinese Patent Application No. 201880098651.5, 27pp.
Japanese Office Action issued Dec. 20, 2022 in corresponding Japanese Patent Application No. 2019-071730 (with machine-generated English translation), 8 pages.
Chinese Office Action issued Jan. 18, 2024, in Patent Application No. 201880098651.5.

* cited by examiner

GRID SYSTEM, CONTROL DEVICE, CONTROL METHOD FOR GRID SYSTEM, AND POWER CONVERSION DEVICE

CROSS-REFERENCE TO RELATED APPLICATION

The present application is based on PCT filing PCT/JP2018/039351, filed Oct. 23, 2018, the entire contents of which are incorporated herein by reference.

TECHNICAL FIELD

The present disclosure relates to a grid system, a control device, a control method for the grid system, and a power conversion device.

BACKGROUND ART

In a power grid with power generation equipment and power storage equipment connected, power of the power storage equipment is used for stably controlling variation in grid frequency and variation in grid voltage caused by power variation in renewable energy. For example, Patent Document 1 discloses a frequency control method and a frequency control system in which, even in the case where a large amount of power generation equipment is introduced in a power grid, load frequency control (LFC) and power adjustment control associated with the frequency of power storage equipment are coordinated with each other, whereby the capacity of the power storage equipment is reduced and the grid frequency can be stably controlled.

CITATION LIST

Patent Document

Patent Document 1: Japanese Laid-Open Patent Publication No. 2015-198526

SUMMARY OF THE INVENTION

Problems to be Solved by the Invention

In the frequency control method of Patent Document 1, if generated power of the power generation equipment is excessive so that adjustment using power of the power storage equipment is impossible, it is necessary to reduce generated power of the power generation equipment. In addition, when variation in flow power occurs, temporary frequency variation occurs by phase change due to voltage variation at a distribution impedance, and thus there is a concern in which such temporary frequency variation might change output of the power generation equipment or the power storage equipment.

The present disclosure has been made to solve the above problem, and an object of the present disclosure is to provide a grid system, a control device, and a grid system control method that can suppress the influence of excessive power of the power generation equipment on the grid system and the influence of frequency variation.

Solution to the Problems

A grid system according to the present disclosure includes: a voltage source; a device provided to a consumer and connected to the voltage source via a distribution grid; and a grid control unit for transmitting a power command value for the device. The consumer includes a plurality of consumers. At least one of the consumers is provided with a power generation device connected to a power receiving point which is a connection point with the distribution grid, a power storage device connected to the power receiving point, a first power conversion device provided between the power generation device and the power receiving point, and including a first power converter for converting output voltage of the power generation device to predetermined AC voltage, a second power conversion device provided between the power storage device and the power receiving point, and including a second power converter for converting output voltage of the power storage device to predetermined AC voltage, and a detection unit for acquiring a frequency of voltage at the power receiving point. The first power conversion device includes first power command correction means for correcting the power command value from the grid control unit on the basis of the frequency of the voltage at the power receiving point acquired by the detection unit, and first power control means for controlling the first power converter on the basis of the power command value corrected by the first power command correction means. The second power conversion device includes second power command correction means for correcting the power command value from the grid control unit on the basis of the frequency of the voltage at the power receiving point acquired by the detection unit, and second power control means for controlling the second power converter on the basis of the power command value corrected by the second power command correction means. The power command value corrected by the first power command correction means is set to be greater than the power command value corrected by the second power command correction means.

A control device according to the present disclosure is a control device for controlling a device provided to a consumer and connected to a voltage source via a distribution grid, on the basis of a power command value from a grid control unit. The consumer is provided with a power generation device connected to a power receiving point which is a connection point with the distribution grid, a power storage device connected to the power receiving point, a first power converter which is provided between the power generation device and the power receiving point, and which converts output voltage of the power generation device to predetermined AC voltage, and a second power converter which is provided between the power storage device and the power receiving point, and which converts output voltage of the power storage device to predetermined AC voltage. The control device includes: power command correction means for correcting the power command value from the grid control unit on the basis of a frequency of voltage at the power receiving point; and power control means for controlling the first power converter and the second power converter respectively on the basis of different power command values corrected by the power command correction means. The power command value for controlling the first power converter is set to be greater than the power command value for controlling the second power converter.

A grid system control method according to the present disclosure is a control method for a grid system including a voltage source, a device provided to a consumer and connected to the voltage source via a distribution grid, and a grid control unit for transmitting a power command value to the device, the method including the steps of: acquiring a frequency of voltage at a power receiving point which is a connection point between the device and the distribution grid; correcting a power command value from the grid control unit on the basis of the frequency at the power receiving point; converting output voltage of a power generation device provided to the consumer and connected to the voltage source, to a value of AC voltage based on the corrected first power command value; and converting output voltage of a power storage device provided to the consumer and connected to the voltage source, to a value of AC voltage based on a second power command value having a smaller value than the corrected first power command value.

Effect of the Invention

According to the present disclosure, it is possible to suppress the influence of excessive generated power of power generation equipment on the grid, and suppress output variation of power generation equipment and power storage equipment with respect to temporary frequency variation of the voltage source.

DESCRIPTION OF EMBODIMENTS

Figure 1:
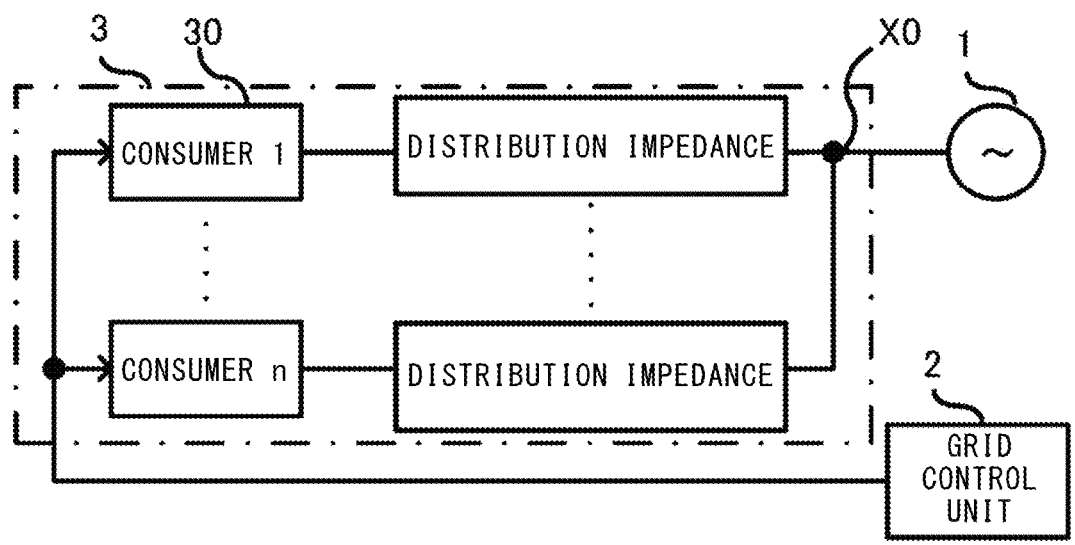
FIG. 1 is a configuration diagram showing the entirety of a grid system according to embodiment 1.

Hereinafter, embodiments will be described with reference to the drawings. In the drawings, the same reference characters denote the same or corresponding parts, and the same description will not be repeated.

Embodiment 1

Hereinafter, a grid system according to embodiment 1 will be described with reference to the drawings.

FIG. 1 is a configuration diagram showing the entirety of the grid system according to embodiment 1. The grid system includes a voltage source 1 for outputting voltage to a distribution grid, a grid control unit 2 which transmits and outputs a power command to each consumer 30 composing a consumer group 3, and the consumer groups 3. The voltage source 1 and devices provided to each consumer 30 of the consumer group 3 are connected via distribution impedances (corresponding to impedances of the distribution grid). In the drawing, X0 corresponds to a consumer group end and is a power receiving point of the consumer group 3 present between the voltage source 1 and the distribution impedances, and voltage at the end of the consumer group 3 corresponds to voltage at the power receiving point X0.

The voltage source 1 outputs voltage to the distribution grid. The voltage source 1 may correspond to a power grid or may be an independent voltage source separated from the power grid. In addition, the voltage source 1 may be configured as a power generation device such as a power generator, a combination of a power generation device and a load, a large-capacity power storage device, or the like.

The power grid, the power generator, and the like have elements that conserve kinetic energy of rotational motion of a rotor of the power generator or the like. Therefore, the instantaneous power balance is lost, the kinetic energy of rotational motion is changed and operation to keep the power balance is performed. Specifically, in the case where consumed power in the consumer group 3 or the like is greater than power that can be supplied by the power grid, the power generator, or the like, a part of the kinetic energy of rotational motion is extracted as power that can be supplied, and the power is supplied to the consumer group 3. Thus, the kinetic energy of rotational motion is reduced, so that the rotation speed is reduced and the change in the rotation speed appears as frequency change in the power grid or the power generator. The voltage source 1 in the present embodiment is assumed to have characteristics that the frequency changes in accordance with power to be borne.

Each consumer 30 has a load such as home electrical appliances. At least one of the consumers 30 has one or both of a power generation device such as a photovoltaic generation device or a fuel cell, and a power storage device such as a storage battery. The set of these consumers 30 composes the consumer group 3. In the present embodiment, the case where all the consumers 30 have both of the power generation device and the power storage device will be described. Each consumer 30 adjusts flow power from the consumer 30 to the distribution grid in accordance with a power command from the grid control unit 2. Specifically, output powers of the power generation device and the power storage device in the consumer 30 are adjusted so that flow power from the consumer 30 to the distribution grid coincides with a power command value from the grid control unit 2.

The grid control unit 2 outputs a power command value to each consumer 30, considering power optimization and voltage stabilization in the grid system, a long-time operation and fuel efficiency improvement of the voltage source 1, and the like. Specifically, the grid control unit 2 adjusts the power command value so as to reduce power borne by the voltage source 1 through power interchange between the consumers 30 on the basis of a generated power predicted value and a power generation amount record value of the power generation device of each consumer 30, a power consumption predicted value and a power consumption record value of the load of each consumer 30, a charged power amount of the power storage device of each consumer 30, loss in the distribution grid, and the like. In the case where the voltage source 1 has a power storage function, the grid control unit 2 adjusts the power command value so as to discharge power from the consumer 30 to the voltage source 1 to charge the voltage source 1, or adjusts the power command value so as to discharge power from the voltage source 1 to the consumer group 3 to perform discharge of the voltage source 1, for example.

In addition, considering conditions such as a deterioration condition of the power storage device provided to each consumer 30, the large-capacity power storage device provided to the voltage source 1, or the like, the grid control unit 2 may determine the power command value so as to suppress the deterioration. When voltage of the consumer or the consumer group increases, the power command value is adjusted so that flow power from the consumer 30 to the distribution grid reduces. When voltage of the consumer or the consumer group reduces, the power command value is adjusted so that flow power from the consumer 30 to the distribution grid increases. Further, output of the grid control unit 2 is not limited to the power command value, but also includes a power amount for a certain period (e.g., a power amount for thirty minutes or a power amount for five minutes), a drooping characteristic described later (e.g., information such as a slope, a dead band, or an upper/lower limit), or the like. Here, voltage of the consumer refers to, for example, voltage at the power receiving point which corresponds to the consumer end and at which the consumer 30 and the distribution grid are connected, or refers to, in the consumer 30, output voltage of the power storage device or the power generation device provided to each consumer 30. In addition, voltage of the consumer group refers to voltage at the power receiving point X0 which corresponds to the consumer group end and which is present between the voltage source 1 and the distribution impedances.

Communication between the grid control unit 2 and each consumer 30 may not necessarily be performed at all times, and may be performed at intervals of thirty minutes or one hour, for example.

Figure 2:
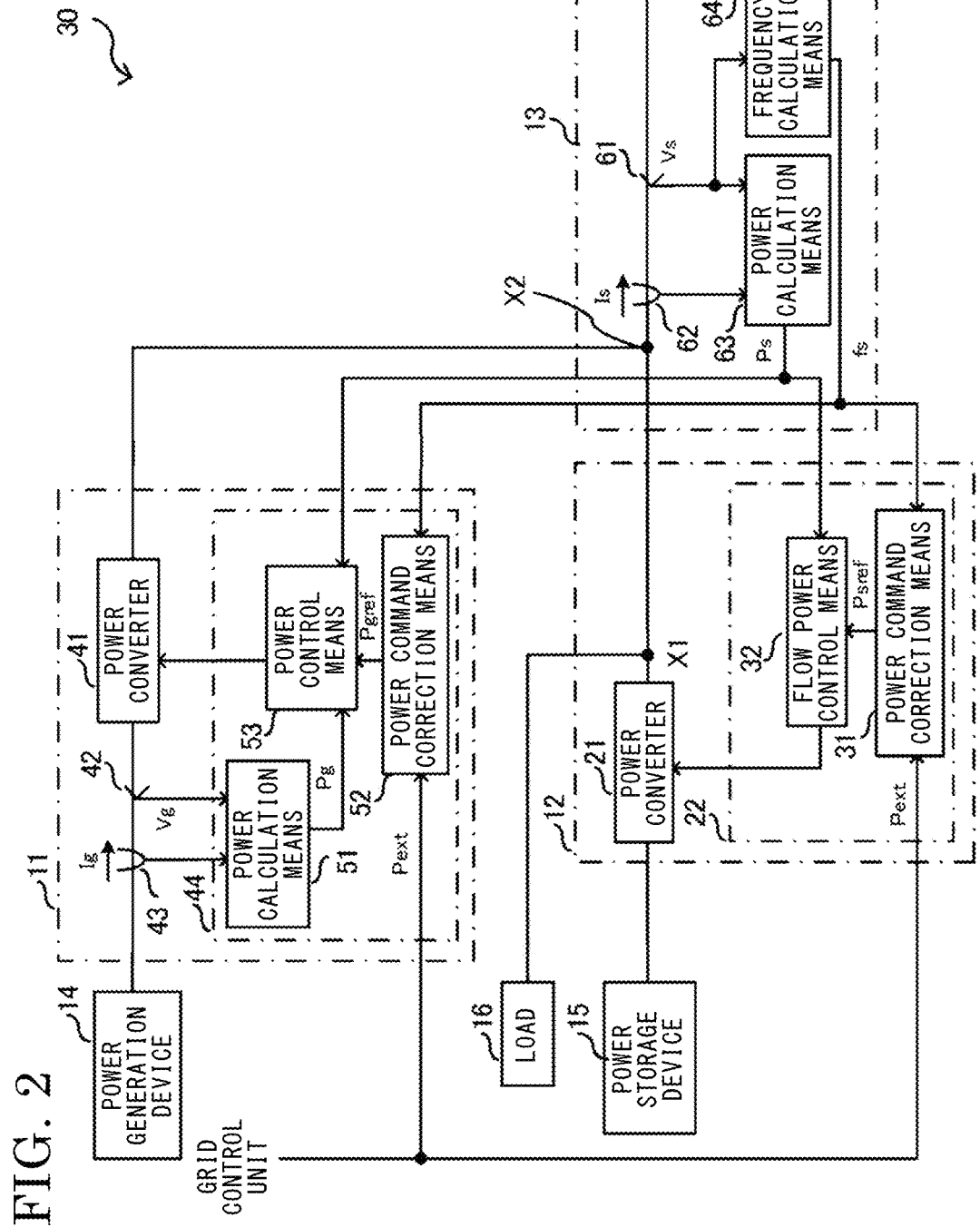
FIG. 2 is a schematic wiring diagram in a consumer having a power generation device and a power storage device in the grid system according to embodiment 1.

FIG. 2 shows the internal configuration of one consumer 30 of the consumer group 3 in FIG. 1, and is a schematic wiring diagram in the consumer 30 having the power generation device and the power storage device. In the drawing, the consumer 30 includes a detection unit 13, a power generation device 14, a power storage device 15, and a load 16. A power conversion device 11 (first power conversion device) for converting power from the power generation device 14 is connected to the power generation device 14. A power conversion device 12 (second power conversion device) for converting power from the power storage device 15 is connected to the power storage device 15. The power conversion devices 11, 12 are connected to the grid control unit 2. The detection unit 13 is connected between the power conversion devices 11, 12 and the distribution grid.

The detection unit 13 includes voltage detection means 61, current detection means 62, power calculation means 63, and frequency calculation means 64. The detection unit 13 is connected between the power conversion devices 11, 12 and the distribution grid. The detection unit 13 detects the flow power and the frequency at the power receiving point X2 at which the consumer 30 and the distribution grid are connected, and outputs the detected flow active power Ps and frequency fs to the power conversion device 11 and the power conversion device 12.

The voltage detection means 61 detects, in the consumer, voltage Vs at the connection point X2 (power receiving point) between the power conversion devices 11, 12 and the distribution grid.

The current detection means 62 detects, in the consumer, current Is at the connection point X2 (power receiving point) between the power conversion devices 11, 12 and the distribution grid. In the present embodiment, the polarity of current flowing from the power conversion devices 11, 12 to the distribution grid is defined as positive.

The power calculation means 63 receives the detected voltage Vs and the detected current Is, and calculates and outputs flow active power Ps. As a specific calculation method for the flow active power Ps, the average of a product of the voltage Vs and the current Is (=Vs×Is) per the cycle of the voltage Vs is calculated. In addition, the product of the voltage Vs and the current Is (=Vs×Is) may be subjected to filter processing using a low-pass filter or the like.

The frequency calculation means 64 receives the voltage Vs, and calculates and outputs the frequency fs of the voltage Vs. As a specific method, zero-crossing of the voltage Vs is detected to measure the cycle, and then the reciprocal of the measured cycle is outputted as the frequency fs. Alternatively, a cosine wave of the internal phase is multiplied by the voltage Vs, and the multiplication result is subjected to a low-pass filter or the like so as to reduce a high-frequency component (approximately two times the distribution grid frequency in a steady state), whereby the frequency fs is extracted and outputted.

In addition, if flow power of the consumer changes due to sharp load change in the consumer 30, generated power variation in the power generation device 14, or the like, voltage drop due to the distribution impedance and the flow power of the consumer occurs, so that the voltage phase at the connection point between the power conversion devices 11, 12 in the consumer and the distribution grid is changed. If the voltage phase of the voltage Vs is changed while the frequency of the voltage source 1 is constant, the zero-cross point of the voltage Vs changes. Thus, frequency change due to the zero-cross change might be erroneously detected as frequency change of the voltage source 1. By making the setting so as to remove temporary frequency change using a low-pass filter or the like, it is possible to suppress the influence of temporary frequency change caused by voltage variation due to the distribution impedance and power change.

In the above description, the case where the power conversion device 11 and the power conversion device 12 are connected to the detection unit 13, has been described, but the configuration is not limited thereto. For example, a configuration in which the power conversion device 11 is connected inside the power conversion device 12 may be employed. In addition, a configuration in which the detection unit 13 is provided inside the power conversion device 11 or the power conversion device 12 may be employed, or a configuration in which the power calculation means 63 and the frequency calculation means 64 of the detection unit 13 are individually provided inside the power conversion device 11 and the power conversion device 12 may be employed. In any case, it is only necessary that the voltage detection means 61 and the current detection means 62 can detect, in the consumer 30, voltage and current at the connection point between the power conversion devices 11, 12 and the distribution grid.

The power conversion device 11 is connected between the power generation device 14 and the detection unit 13, and converts DC voltage of the power generation device 14 to AC voltage of the distribution grid. The power conversion device 11 includes a power converter 41 (first power converter), voltage detection means 42, current detection means 43, and a control unit 44.

Although described later in detail, the output power of the power conversion device 11 is basically adjusted so that the generated power of the power generation device 14 is maximized. However, in the case where the flow active power Ps calculated by the power calculation means 63 is greater than a power command value determined on the basis of a power command value Pext from the grid control unit 2 and the frequency fs from the frequency calculation means 64, the output power of the power conversion device 11 is controlled to be reduced.

The power converter 41 includes a switching element, a driving circuit for driving the switching element, a capacitor for stabilizing output voltage of the power generation device 14, and the like, and is configured as a full-bridge or half-bridge inverter circuit or the like, for example. In accordance with a drive command from the control unit 44, the driving circuit switches the switching element to convert DC voltage of the power generation device 14 to AC voltage for the distribution grid so as to have predetermined voltage. The output power of the power converter 41 is set in advance by a drive command from the control unit 44 as described later, and the driving circuit performs drive control for the switching element so as to achieve the power set by the drive command.

The voltage detection means 42 is connected between the power generation device 14 and the power converter 41, and detects output voltage Vg of the power generation device 14.

The current detection means 43 is connected between the power generation device 14 and the power converter 41, and detects output current Ig of the power generation device 14.

The control unit 44 includes power calculation means 51, power command correction means 52 (first power command correction means), and power control means 53 (first power control means). The control unit 44 receives the voltage Vg detected by the voltage detection means 42, the current Ig detected by the current detection means 43, the power command value Pext from the grid control unit 2, the flow active power Ps from the power calculation means 63 of the detection unit 13, and the frequency fs from the frequency calculation means 64 of the detection unit 13, and outputs a drive command to the power converter 41.

The basic operation of the control unit 44 is as follows. The generated power Pg of the power generation device 14 is calculated from the voltage Vg and the current Ig, and the drive command for the power converter 41 is adjusted so that the generated power Pg is maximized. For the adjustment, for example, hill climbing or the like is used. The power command value Pext from the grid control unit 2 is corrected using the frequency fs, to generate a power command value Pgref. If the flow active power Ps is greater than the power command value Pgref, the drive command for the power converter 41 is generated so that the output power of the power converter 41 is reduced. That is, the drive command for the power converter 41 is outputted so as to adjust the output power of the power converter 41 so that the power command value Pgref and the flow active power Ps coincide with each other, and so as to maximize the generated power of the power generation device 14 within a range not exceeding the power command value Pgref.

Next, the components constituting the control unit 44 will be described. The power calculation means 51 receives the voltage Vg and the current Ig, and calculates and outputs the generated power Pg of the power generation device 14. As a specific calculation method for the generated power Pg, for example, a product of the voltage Vg and the current Ig (=Vg×Ig) is subjected to filter processing using a low-pass filter or the like. The output of the low-pass filter here corresponds to the generated power Pg.

The power command correction means 52 receives the power command value Pext from the grid control unit 2 and the frequency fs from the detection unit 13, and outputs the corrected power command value Pgref. As a correction method, if the frequency fs is a predetermined frequency fsm, a value obtained by adding correction power dPg to the power command value Pext from the grid control unit 2 is outputted as the corrected power command value Pgref. If the frequency fs changes from the predetermined frequency fsm, a value obtained by adding an addition value based on the frequency change and the correction power dPg to the power command value Pext from the grid control unit 2 is outputted as the corrected power command value Pgref.

Specifically, a difference between the frequency fs and the predetermined frequency fsm is multiplied by a gain Kfp, and a value obtained by adding the correction power dPg and the power command value Pext from the grid control unit 2, to the multiplication result, is the power command value Pgref, as follows:

$$Pgref=Pext+Kfp(fsm-fs)+dPg.$$

This has a drooping characteristic. In addition, the drooping characteristic may be imparted with a dead band so that the power command value is not corrected when change in the frequency fs is small.

Figure 3A:
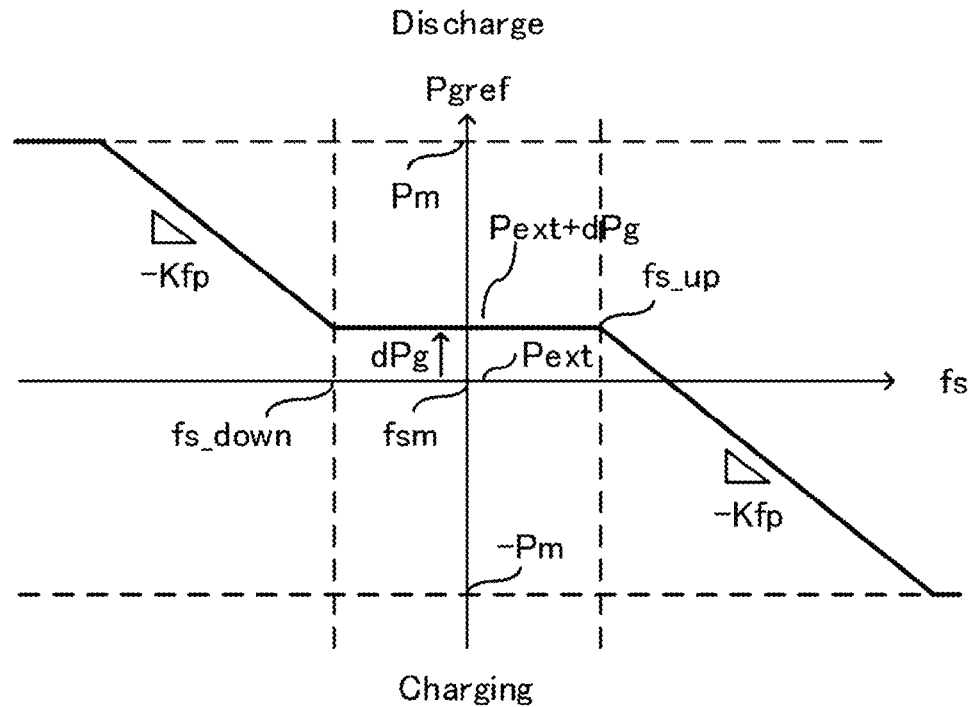
FIG. 3A shows a drooping characteristic of power command correction means provided to a power conversion device for the power generation device in the consumer in the grid system according to embodiment 1.
Figure 3B:
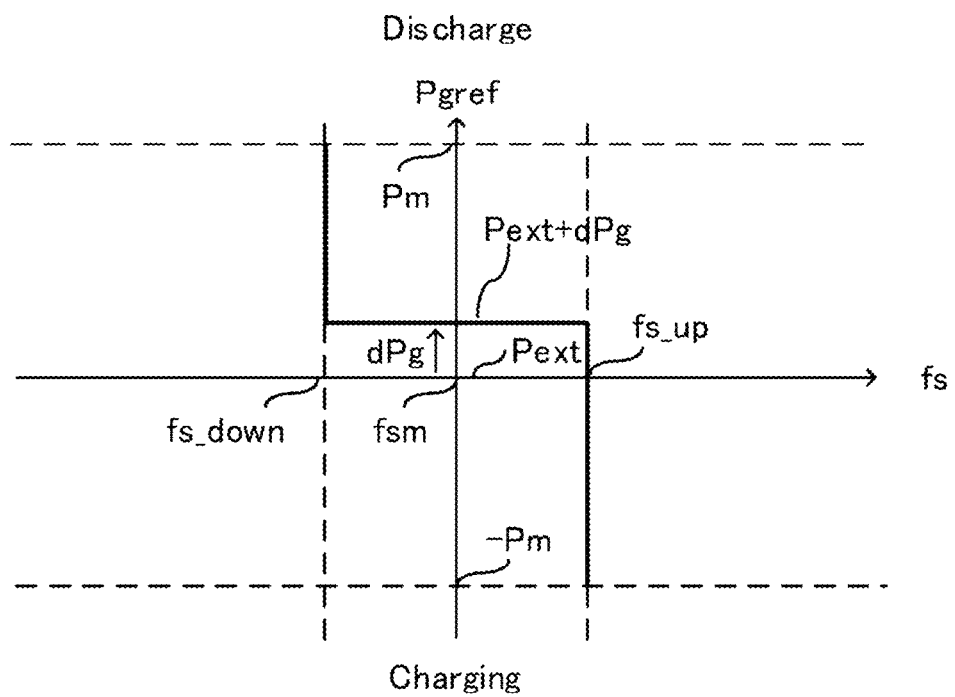
FIG. 3B shows another drooping characteristic of the power command correction means provided to the power conversion device for the power generation device in the consumer in the grid system according to embodiment 1.

FIG. 3A and FIG. 3B show examples of the drooping characteristic of the power command correction means 52. In the drawings, the horizontal axis indicates the frequency fs and the vertical axis indicates the corrected power command value Pgref. The range of the frequency fs from a lower end frequency fs_down to an upper end frequency fs_up is set as a dead band. In this range, the power command value Pext of the grid control unit 2 is used as the corrected power command value Pgref, but the correction power dPg is added as an offset over the entirety of the drooping characteristic, so that Pgref=Pext+dPg is satisfied in the range of the dead band.

The correction power dPg is set for prioritizing a charging operation for the power storage device 15 over a reducing operation for the generated power of the power generation device 14 in such a case where the generated power of the power generation device 14 is excessive over the load 16 in the consumer. Specifically, the correction power dPg may be set to a value greater than control error of the flow active power Ps and detection error of the flow active power Ps.

In the drawings, Pm denotes rated flow active power and corresponds to the maximum rated value of the flow active power Ps of the consumer. The rated flow active power Pm may be set on the basis of the maximum contracted power (current) of the flow active power Ps of the consumer, or in the case where a circuit breaker or the like is provided in the consumer, the rated flow active power Pm may be set to be equal to or smaller than the capacity of the circuit breaker or the like. In addition, "Discharge" means that power from the consumer 30 to the distribution impedance increases, and "Charging" means that power from the distribution impedance to the consumer increases.

Hereinafter, each figure will be described. FIG. 3A shows an example of the drooping characteristic in the case of correcting the power command value using proportional control (P control) with respect to the frequency fs. If the frequency fs is greater than the upper end frequency fs_up, a value obtained by adding the correction power dPg and a product of the gain Kfp and a difference between the frequency fs and the upper end frequency fs_up, to the power command value Pext from the grid control unit 2, is used as the power command value Pgref. That is, the following is satisfied:

$$Pgref=Pext+Kfp(fs\_up-fs)+dPg.$$

At this time, if the corrected power command value Pgref is smaller than a value (−Pm) obtained by multiplying the rated flow active power Pm by minus, the corrected power command value Pgref is limited by the value obtained by multiplying the rated flow active power Pm by minus. That is, the following is satisfied:

$$Pgref=-Pm(\text{if } Pgref<-Pm).$$

If the frequency fs is smaller than the lower end frequency fs_down, a value obtained by adding the correction power dPg and a product of the gain Kfp and a difference between the frequency fs and the lower end frequency fs_down, to the power command value Pext from the grid control unit 2, is used as the power command value Pgref. That is, the following is satisfied:

$$Pgref=Pext+Kfp(fs\_down-fs)+dPg.$$

At this time, if the corrected power command value Pgref is greater than the rated flow active power Pm, the corrected power command value Pgref is limited by the rated flow active power Pm. That is, the following is satisfied:

$$Pgref=Pm(\text{if } Pgref>Pm).$$

Here, the gain Kfp is the same between the case where the frequency fs is greater than the upper end frequency fs_up and the case where the frequency fs is smaller than the lower end frequency fs_down, but may be set to different values. In addition, dead band information (upper end frequency fs_up, lower end frequency fs_down) for the drooping characteristic, information about the gain Kfp, or the like may be separately received from the grid control unit 2, and the drooping characteristic may be set in accordance with such information.

In addition, in the case of desiring to adjust individual powers to be borne among the individual consumers 30, the gain Kfp may be set for each consumer 30 or the offset of the drooping characteristic may be set for each consumer 30.

FIG. 3B shows an example of the drooping characteristic in the case of correcting the power command value using proportional integral control (PI control) with respect to the frequency fs. An output limiter for a PI controller may be set in accordance with the output range of the power command correction means 52. For example, the output limiter of the PI controller may be set in a range between the maximum output and the minimum output of the power command correction means 52, or may be set so that a value obtained by adding an output of the PI controller to the power command value Pext from the grid control unit 2 is within a range between the maximum output and the minimum output of the power command correction means 52.

If the frequency fs is greater than the upper end frequency fs_up, the PI controller is operated by inputting a difference between the frequency fs and the upper end frequency fs_up to the PI controller, and a value obtained by adding the output of the PI control and the correction power dPg to the power command value Pext from the grid control unit 2 is used as the power command value Pgref. At this time, if the corrected power command value Pgref is smaller than a value (−Pm) obtained by multiplying the rated flow active power Pm by minus, the corrected power command value Pgref is limited by the value obtained by multiplying the rated flow active power Pm by minus. That is, the following is satisfied:

$$Pgref=-Pm(\text{if } Pgref<-Pm).$$

If the frequency fs is smaller than the lower end frequency fs_down, the PI controller is operated by inputting a difference between the frequency fs and the lower end frequency fs_down to the PI controller, and a value obtained by adding the output of the PI control and the correction power dPg to the power command value Pext from the grid control unit 2 is used as the power command value Pgref. At this time, if the corrected power command value Pgref is greater than the rated flow active power Pm, the corrected power command value Pgref is limited by the rated flow active power Pm. That is, the following is satisfied:

$$Pgref=Pm(\text{if } Pgref>Pm).$$

Dead band information (upper end frequency fs_up, lower end frequency fs_down) for the drooping characteristic, information about the gain and the limiter for the PI controller, or the like may be separately received from the grid control unit 2, and the drooping characteristic may be set in accordance with such information.

Figure 4A:
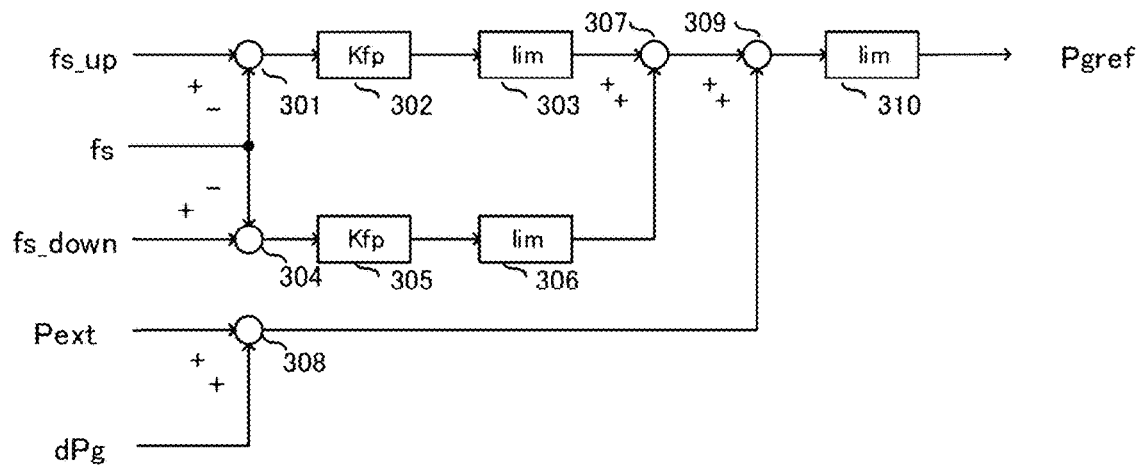
FIG. 4A is a control block diagram for realizing the drooping characteristic of the power command correction means provided to the power conversion device for the power generation device in the consumer in the grid system according to embodiment 1.
Figure 4B:
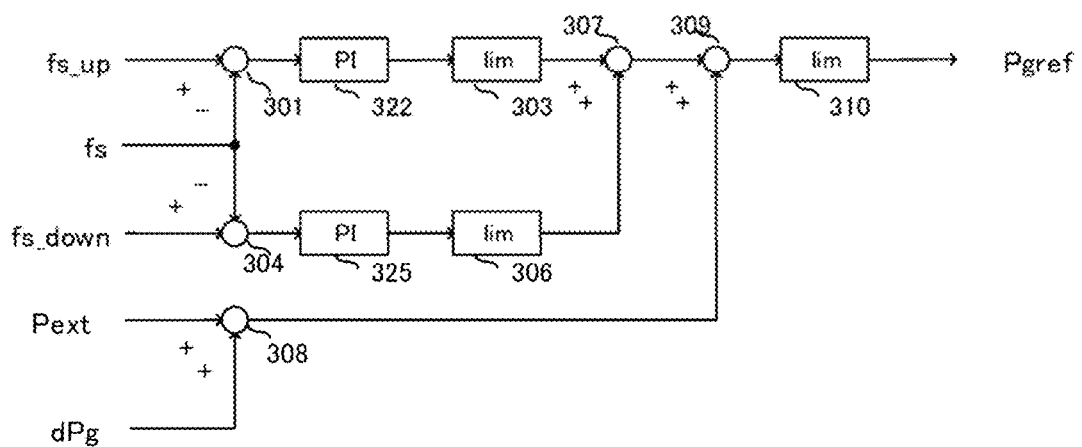
FIG. 4B is a control block diagram for realizing another drooping characteristic of the power command correction means provided to the power conversion device for the power generation device in the consumer in the grid system according to embodiment 1.

FIG. 4A and FIG. 4B show examples of control block diagrams for realizing the drooping characteristic of the power command correction means 52. FIG. 4A is an example of a control block diagram corresponding to FIG. 3A, and FIG. 4B is an example of a control block diagram corresponding to FIG. 3B.

First, FIG. 4A will be described. In the drawing, the frequency fs and the upper end frequency fs_up are inputted to a subtractor 301 and a subtraction result is outputted as dfsup (dfsup=fs_up−fs).

The output dfsup of the subtractor 301 is inputted to a gain 302, and a result of multiplying dfsup by the gain Kfp is outputted as kfsup (kfsup=dfsup×Kfp).

The output kfsup of the gain 302 is inputted to a limiter 303, and if kfsup is greater than 0, a result of limitation by 0 is outputted as lfsup. That is, if kfsup>0 is satisfied, lfsup=kfsup=0 is outputted, and otherwise, lfsup=kfsup is outputted.

The frequency fs and the lower end frequency fs_down are inputted to a subtractor 304, and a result of subtraction is outputted as dfsdown (dfsdown=fs_down−fs).

The output dfsdown of the subtractor 304 is inputted to a gain 305, and a result of multiplying dfsdown by the gain Kfp is outputted as kfsdown (kfsdown=dfsdown×Kfp).

The output kfsdown of the gain 305 is inputted to a limiter 306, and if kfsdown is smaller than 0, a limiter result of limitation by 0 is outputted as lfsdown. That is, if kfsdown<0 is satisfied, lfsdown=kfsdown=0 is outputted, and otherwise, lfsdown=kfsdown is outputted.

The output lfsup of the limiter 303 and the output lfsdown of the limiter 306 are inputted to an adder 307, and a result of addition is outputted as dPadd (dPadd=lfsup+lfsdown).

The power command value Pext from the grid control unit 2 and the correction power dPg are inputted to an adder 308, and a result of addition is outputted as dPext (dPext=Pext+dPg).

The output dPadd of the adder 307 and the output dPext of the adder 308 are inputted to an adder 309, and a result of addition is outputted as Padd (Padd=dPadd+dPext).

The output Padd of the adder 309 is inputted to a limiter 310, and if Padd is greater than the rated flow active power Pm, the power command value Pgref limited by the rated flow active power Pm is outputted. That is, if Padd>Pm is satisfied, Pgref=Padd=Pm is outputted, and otherwise, Pgref=Padd is outputted. On the other hand, if Padd is smaller than the rated flow active power Pm multiplied by −1, the power command value Pgref limited by the rated flow active power Pm multiplied by −1 is outputted. That is, if Padd<−Pm is satisfied, Pgref=Padd=−Pm is outputted, and otherwise, Pgref=Padd is outputted.

Next, FIG. 4B will be described. In the drawing, the frequency fs and the upper end frequency fs_up are inputted to a subtractor 301, and a result of subtraction is outputted as dfsup (dfsup=fs_up−fs).

The output dfsup of the subtractor 301 is inputted to a PI controller 322, and a result of performing PI control of dfsup is outputted as kfsup (kfsup=dfsup×Kpfp+dfsup×Kifp/s, where Kpfp is a proportional gain, Kifp is an integral gain, and s of/s is a Laplace operator; the same applies in the following description).

The output kfsup of the PI controller 322 is inputted to a limiter 303, and if kfsup is greater than 0, a result of limitation by 0 is outputted as lfsup. That is, if kfsup>0 is satisfied, lfsup=kfsup=0 is outputted, and otherwise, lfsup=kfsup is outputted. It is noted that the integral value of the PI controller 322 may also be limited in the same manner.

The frequency fs and the lower end frequency fs_down are inputted to a subtractor 304, and a result of subtraction is outputted as dfsdown (dfsdown=fs_down-fs).

The output dfsdown of the subtractor 304 is inputted to a PI controller 325, and a result of performing PI control of dfsdown is outputted as kfsdown (kfsdown=dfsdown× Kpfp+dfsdown×Kifp/s).

The output kfsdown of the PI controller 325 is inputted to a limiter 306, and if kfsdown is smaller than 0, a result of limitation by 0 is outputted as lfsdown. That is, if kfsdown<0 is satisfied, lfsdown=kfsdown=0 is outputted, and otherwise, lfsdown=kfsdown is outputted. It is noted that the integral value of the PI controller 325 may also be limited in the same manner.

The output lfsup of the limiter 303 and the output lfsdown of the limiter 306 are inputted to an adder 307, and a result of addition is outputted as dPadd (dPadd=lfsup+lfsdown).

The power command value Pext from the grid control unit 2 and the correction power dPg are inputted to an adder 308, and a result of addition is outputted as dPext (dPext=Pext+ dPg).

The output dPadd of the adder 307 and the output dPext of the adder 308 are inputted to an adder 309, and a result of addition is outputted as Padd (Padd=dPadd+dPext).

The output Padd of the adder 309 is inputted to a limiter 310, and if Padd is greater than the rated flow active power Pm, the power command value Pgref limited by the rated flow active power Pm is outputted. That is, if Padd>Pm is satisfied, Pgref=Padd=Pm is outputted, and otherwise, Pgref=Padd is outputted. On the other hand, if Padd is smaller than the rated flow active power Pm multiplied by −1, the corrected power command value Pgref limited by the rated flow active power Pm multiplied by −1 is outputted. That is, if Padd<−Pm is satisfied, Pgref=Padd=−Pm is outputted, and otherwise, Pgref=Padd is outputted.

As described above, the power command correction means 52 has the drooping characteristic imparted with a dead band, with respect to the frequency fs, and can correct the power command value Pext using proportional control (P control) or proportional integral control (PI control) and output the corrected power command value Pgref.

The power control means 53 receives the generated power Pg, the power command value Pgref corrected by the power command correction means 52, and the flow active power Ps from the detection unit 13, and outputs a drive command value Pref to the power converter 41. Specifically, if the flow active power Ps is smaller than the power command value Pgref, the drive command value Pref for the power converter 41 is generated by hill climbing or the like so that the generated power Pg of the power generation device 14 is maximized. It is noted that the drive command value Pref for the power converter 41 is limited by the maximum output power of the power converter 41.

If the flow active power Ps is greater than the power command value Pgref, control is performed so as to reduce the upper limit of output power of the power converter 41 based on the drive command value Pref. If the flow active power Ps is smaller than the power command value Pgref, the upper limit of the drive command value Pref is the maximum output power of the power converter 41, but if the flow active power Ps is greater than the power command value Pgref, the upper limit of the output power of the power converter 41 based on the drive command value Pref is reduced in accordance with the amount of excess of the flow active power Ps over the power command value Pgref. In calculation of the reduction amount for the upper limit of the drive command value Pref, a PI controller is configured with the power command value Pgref as an input command value and with the flow active power Ps as a feedback value, and the upper limit of the drive command value Pref is reduced in accordance with the output of the PI controller. Alternatively, the drive command value Pref is reduced using the output of the PI controller. In this case, by setting the lower limit of the output of the PI controller to 0, the output of the PI controller can be made to be 0 when the flow active power Ps is smaller than the power command value Pgref.

Next, the power conversion device 12 will be described.

The power conversion device 12 is connected between the power storage device 15 and the detection unit 13, and converts DC voltage of the power storage device 15 to AC voltage for the distribution grid. The power conversion device 12 includes a power converter 21 (second power converter) and a control unit 22.

Although described later in detail, the output power of the power conversion device 12 is basically adjusted so that the flow active power Ps becomes the power command value Pext from the grid control unit 2. In addition, if the frequency fs changes from a predetermined frequency, the power command value Pext from the grid control unit 2 is corrected to adjust the output power so that the corrected power command value and the flow active power coincide with each other.

The power converter 21 includes a switching element, a driving circuit for the switching element, a capacitor for stabilizing the output voltage of the power storage device 15, and the like, and as in the power conversion device 11, the power converter 21 is configured as a full-bridge or half-bridge inverter circuit or the like, for example. In accordance with a command from the control unit 22, the driving circuit switches the switching element to convert DC voltage of the power storage device 15 to AC voltage for the distribution grid. The output power of the power converter 21 is set in advance by a drive command from the control unit 22 as described later, and the driving circuit performs drive control for the switching element so as to achieve the power set by the drive command.

The control unit 22 includes power command correction means 31 (second power command correction means) and flow power control means 32 (second power control means). The control unit 22 receives the power command value Pext from the grid control unit 2, the flow active power Ps from the detection unit 13, and the frequency fs from the detection unit 13, and outputs a drive command to the power converter 21.

The basic operation of the control unit 22 is as follows. The drive command for the power converter 21 is adjusted so that the power command value Pxet from the grid control unit 2 and the flow active power Ps coincide with each other. In addition, if the frequency fs changes from a predetermined frequency, the power command value Pext from the grid control unit 2 is corrected in accordance with the frequency fs, to generate a power command value Psref, and the drive command for the power converter 21 is generated so that the flow active power Ps coincides with the corrected power command value Psref. Specifically, the output power of the power converter 21 is adjusted so that the corrected power command value Psref and the flow active power Ps coincide with each other.

The power command correction means 31 receives the power command value Pext from the grid control unit 2 and the frequency fs from the detection unit 13, and outputs the corrected power command value Psref. As a correction method, if the frequency fs is the predetermined frequency fsm, the power command value Pext from the grid control unit 2 is outputted as the corrected power command value Psref, and if the frequency fs changes from the predetermined frequency fsm, the power command value Pext from the grid control unit 2 is corrected in accordance with the frequency change, and the resultant power command value Psref is outputted. Specifically, a value obtained by adding a product of the gain Kfp and a difference between the frequency fs and the predetermined frequency fsm to the power command value Pext from the grid control unit 2, is the corrected power command value Psref, as follows:

$Psref=Pext+Kfp(fsm-fs)$.

This has a drooping characteristic. In addition, the drooping characteristic may be imparted with a dead band so that the power command value is not corrected when change in the frequency fs is small.

Figure 5A:
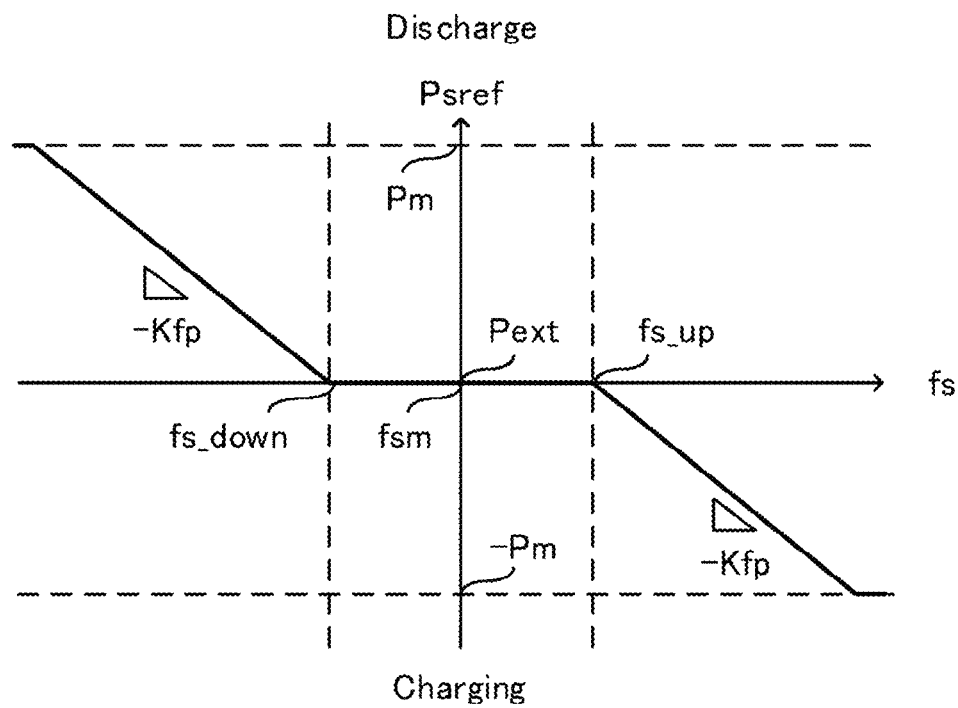
FIG. 5A shows a drooping characteristic of power command correction means provided to a power conversion device for the power storage device in the consumer in the grid system according to embodiment 1.
Figure 5B:
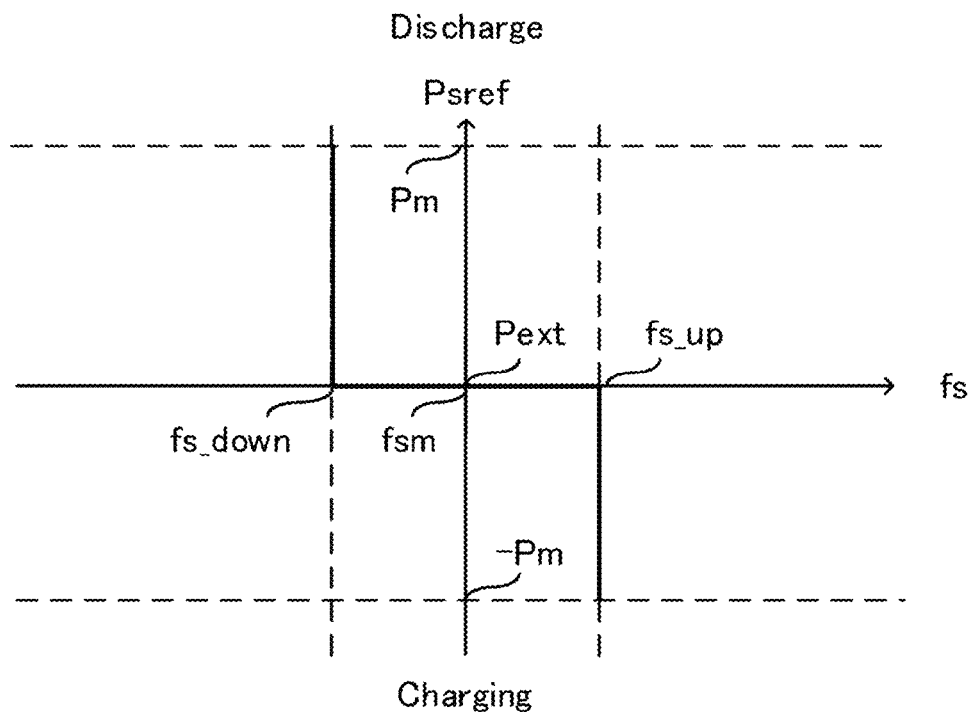
FIG. 5B shows another drooping characteristic of the power command correction means provided to the power conversion device for the power storage device in the consumer in the grid system according to embodiment 1.

FIG. 5A and FIG. 5B show examples of the drooping characteristic of the power command correction means 52. In the drawings, the horizontal axis indicates the frequency fs and the vertical axis indicates the corrected power command value Psref. The range of the frequency fs from the lower end frequency fs_down to the upper end frequency fs_up is set as a dead band, in which the power command value Pext from the grid control unit 2 is outputted as the corrected power command value Psref (Psref=Pext). In addition, as in the description in FIG. 3A and FIG. 3B, Pm in the drawings denotes the rated flow active power and corresponds to the maximum rated value of the flow active power Ps of the consumer. The rated flow active power Pm may be set on the basis of the maximum contracted power (current) of the flow active power Ps of the consumer, or in the case where a circuit breaker or the like is provided in the consumer, the rated flow active power Pm may be set to be equal to or smaller than the capacity of the circuit breaker or the like.

Hereinafter, each figure will be described. FIG. 5A shows an example of the drooping characteristic in the case of correcting the power command value using proportional control (P control) with respect to the frequency fs. If the frequency fs is greater than the upper end frequency fs_up, a value obtained by adding a product of the gain Kfp and a difference between the frequency fs and the upper end frequency fs_up, to the power command value Pext from the grid control unit 2, is used as the corrected power command value Psref. That is, the following is satisfied:

$Psref=Pext+Kfp(fs\_up-fs)$

At this time, if the corrected power command value Psref is smaller than a value ($-Pm$) obtained by multiplying the rated flow active power Pm by minus, the corrected power command value Psref is limited by the value obtained by multiplying the rated flow active power Pm by minus. That is, the following is satisfied:

$Psref=-Pm$(if $Psref<-Pm$).

If the frequency fs is smaller than the lower end frequency fs_down, a value obtained by adding a product of the gain Kfp and a difference between the frequency fs and the lower end frequency fs_down, to the power command value Pext from the grid control unit 2, is used as the corrected power command value Psref. That is, the following is satisfied:

$Psref=Pext+Kfp(fs\_down-fs)$.

At this time, if the corrected power command value Psref is greater than the rated flow active power Pm, the corrected power command value Psref is limited by the rated flow active power Pm. That is, the following is satisfied:

$Psref=Pm$(if $Psref>Pm$).

Here, the gain Kfp is the same between the case where the frequency fs is greater than the upper end frequency fs_up and the frequency fs is smaller than the lower end frequency fs_down, but may be set to different values. In addition, dead band information (upper end frequency fs_up, lower end frequency fs_down) for the drooping characteristic, information about the gain Kfp, or the like may be separately received from the grid control unit 2, and the drooping characteristic may be set in accordance with such information.

FIG. 5B shows an example of the drooping characteristic in the case of correcting the power command value using proportional integral control (PI control) with respect to the frequency fs. An output limiter of a PI controller may be set in accordance with the output range of the power command correction means 31. For example, the output limiter of the PI controller may be set in a range between the maximum output and the minimum output of the power command correction means 31, or may be set so that a value obtained by adding the output of the PI controller to the power command value Pext from the grid control unit 2 is within a range between the maximum output and the minimum output of the power command correction means 31.

If the frequency fs is greater than the upper end frequency fs_up, the PI controller is operated by inputting a difference between the frequency fs and the upper end frequency fs_up to the PI controller, and a value obtained by adding the output of the PI control to the power command value Pext from the grid control unit 2 is used as the power command value Psref. At this time, if the corrected power command value Psref is smaller than a value ($-Pm$) obtained by multiplying the rated flow active power Pm by minus, the corrected power command value Psref is limited by the value obtained by multiplying the rated flow active power Pm by minus. That is, the following is satisfied:

$Psref=-Pm$(if $Psref<-Pm$).

If the frequency fs is smaller than the lower end frequency fs_down, the PI controller is operated by inputting a difference between the frequency fs and the lower end frequency fs_down to the PI controller, and a value obtained by adding the output of the PI control to the power command value Pext from the grid control unit 2 is used as the corrected power command value Psref. At this time, if the corrected power command value Psref is greater than the rated flow active power Pm, the corrected power command value Psref is limited by the rated flow active power Pm. That is, the following is satisfied:

Psref=Pm(if Psref>Pm).

Dead band information (upper end frequency fs_up, lower end frequency fs_down) for the drooping characteristic, information about the gain and the limiter for the PI controller, or the like may be separately received from the grid control unit 2, and the drooping characteristic may be set in accordance with such information.

Further, the correction amount for the power command value with respect to the frequency fs may be adjusted in accordance with the battery remaining amount of the power storage device 15. Specifically, if the battery remaining amount of the power storage device 15 is smaller than a predetermined battery remaining amount, the magnitude of the gain Kfp for the discharge side may be adjusted to be small, the magnitude of the gain Kfp for the charging side may be adjusted to be great, the lower end frequency fs_down may be adjusted to be small, or the upper end frequency fs_up may be adjusted to be small. In addition, if the battery remaining amount of the power storage device 15 is greater than the predetermined battery remaining amount, the magnitude of the gain Kfp for the discharge side may be adjusted to be great, the magnitude of the gain Kfp for the charging side may be adjusted to be small, the lower end frequency fs_down may be adjusted to be great, or the upper end frequency fs_up may be adjusted to be great.

Information about the battery remaining amount of the power storage device 15 may be transmitted to the grid control unit 2, and the grid control unit 2 may transmit a change for the drooping characteristic (change of gain Kfp, upper end frequency fs_up, lower end frequency fs_down, or the like) to the power conversion devices 11, 12. Alternatively, the power conversion device 12 may grasp the battery remaining amount of the power storage device 15 and transmit the battery remaining amount or a change for the drooping characteristic (change of gain Kfp, upper end frequency fs_up, lower end frequency fs_down, or the like) to the power conversion device 11.

Figure 6A:
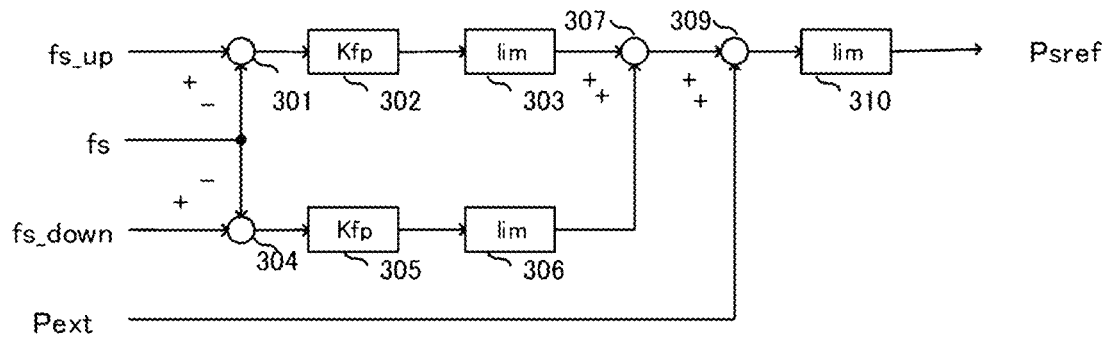
FIG. 6A is a control block diagram for realizing the drooping characteristic of the power command correction means provided to the power conversion device for the power storage device in the consumer in the grid system according to embodiment 1.
Figure 6B:
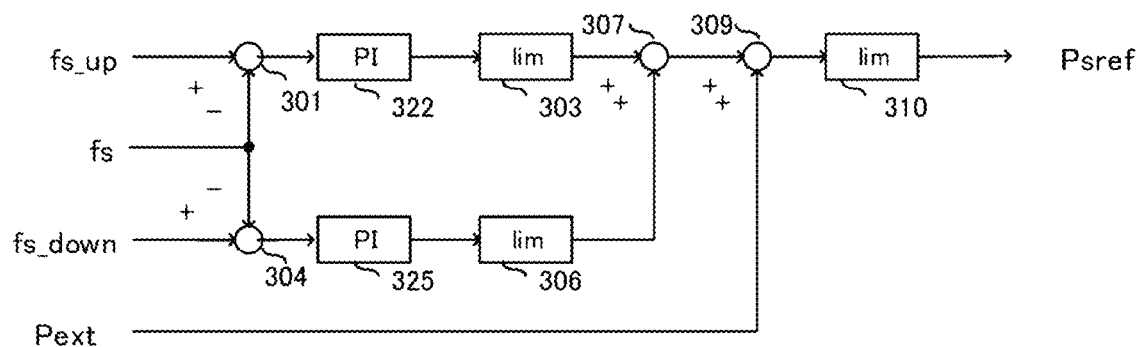
FIG. 6B is a control block diagram for realizing the drooping characteristic of the power command correction means provided to the power conversion device for the power storage device in the consumer in the grid system according to embodiment 1.

FIG. 6A and FIG. 6B show examples of control block diagrams for realizing the drooping characteristic of the power command correction means 31. FIG. 6A is an example of a control block diagram corresponding to FIG. 5A, and FIG. 6B is an example of a control block diagram corresponding to FIG. 5B.

In FIG. 6A, the control block includes subtractors 301, 304, gains 302, 305, limiters 303, 306, 310, and adders 307, 309 and thus the configuration thereof is the same as a configuration (dPext=Pext) obtained by removing the adder 308 from FIG. 4A. Therefore, the details of the operation will not be described.

The output dPadd of the adder 307 and the power command value Pext from the grid control unit 2 are inputted to the adder 309, and a result of addition is outputted as Padd (Padd=dPadd+Pext).

The output Padd of the adder 309 is inputted to the limiter 310, and if Padd is greater than the rated flow active power Pm, the power command value Psref limited by the rated flow active power Pm is outputted. That is, if Padd>Pm is satisfied, Psref=Padd=Pm is outputted, and otherwise, Psref=Padd is outputted. On the other hand, if Padd is smaller than the rated flow active power Pm multiplied by −1, the corrected power command value Psref limited by the rated flow active power Pm multiplied by −1 is outputted. That is, if Padd<−Pm is satisfied, Psref=Padd=−Pm is outputted, and otherwise, Psref=Padd is outputted.

In FIG. 6B, the control block includes subtractors 301, 304, PI controllers 322, 325, limiters 303, 306, 310, and adders 307, 309, and thus the configuration thereof is the same as a configuration (dPext=Pext) obtained by removing the adder 308 from FIG. 4B. Therefore, the details of the operation will not be described.

The output dPadd of the adder 307 and the power command value Pext from the grid control unit 2 are inputted to the adder 309, and a result of addition is outputted as Padd (Padd=dPadd+Pext).

The output Padd of the adder 309 is inputted to the limiter 310, and if Padd is greater than the rated flow active power Pm, the power command value Psref limited by the rated flow active power Pm is outputted. That is, if Padd>Pm is satisfied, Psref=Padd=Pm is outputted, and otherwise, Psref=Padd is outputted. On the other hand, if Padd is smaller than the rated flow active power Pm multiplied by −1, the corrected power command value Psref limited by the rated flow active power Pm multiplied by −1 is outputted. That is, if Padd<−Pm is satisfied, Psref=Padd=−Pm is outputted, and otherwise, Psref=Padd is outputted.

In the above description, as shown in FIG. 3A and FIG. 3B, the correction power dPg is added in the power command correction means 52. However, instead of this configuration, the correction power dPg may be subtracted in the power command correction means 31 shown in FIG. 5A and FIG. 5B without adding the correction power dPg to the power command correction means 52 shown in FIG. 3A and FIG. 3B. Alternatively, the above configurations may be combined such that, for example, a part of the correction power dPg is added in the power command correction means 52 and the rest of the correction power dPg is subtracted in the power command correction means 31.

As described above, by setting the correction power dPg for the power command correction means 52 and the power command correction means 31, it is possible to set the outputs such that the power command value Pgref corrected by the power command correction means 52 is greater than the power command value Psref corrected by the power command correction means 31 in a steady state except when the limiter of the power conversion device 12 is operated, and thus the charging operation for the power storage device 15 can be preferentially performed prior to the reduction operation for the generated power of the power generation device 14. In other words, the power command value Psref corrected by the power command correction means 31 is smaller than the power command value Pgref corrected by the power command correction means 52. Here, the steady state is a state in which frequency variation due to power variation in a load or the like and voltage variation by the distribution impedance has converged, and corresponds to, for example, a period between communication intervals of the grid control unit 2 and the power conversion device 12 of the consumer, or a period between communication intervals of the grid control unit 2 and the power conversion device 11 of the consumer 30.

Further, in a period between communication intervals of the grid control unit 2 and the power conversion devices 11, 12 of the consumer 30, for example, variation in power consumption in the load 16, variation in the generated power of the power generation device 14, or power variation due to operation limitation or the like based on over-charging or over-discharge of the power storage device 15, can occur, thus deviating from the power demand-supply balance predicted by the grid control unit 2. In the present embodiment, when the frequency of the voltage source 1 varies due to power variation, the power command values are adjusted so as to reduce the power variation by the power command correction means 31, 52 of the power conversion devices 11, 12 of the consumer 30. Thus, power borne by the voltage source 1 is reduced, frequency variation in the voltage source 1 can be suppressed, and the grid system can be prevented from failing.

In the above description, in the configuration shown in FIG. 2, when the frequency fs is changed, the power command correction means 31, 52 basically adjust the power command value Pext from the grid control unit 2 in accordance with the frequency fs from the detection unit 13. However, the active powers outputted from the power converters 21, 41 may be adjusted in accordance with the frequency fs. Specifically, the maximum output power of the output active power of the power conversion device 11 may be transmitted from the grid control unit 2, the command value for the output active power of the power conversion device 12 may be transmitted from the grid control unit 2, the output based on the drooping characteristic shown in FIG. 3A or FIG. 3B may be set as a limiter value for the drive command value Pref for the power converter 41, and the output based on the drooping characteristic shown in FIG. 5A or FIG. 5B may be set as a limiter value for the drive command value Pref for the power converter 21. In this case, the power converter 41 merely discharges the generated power of the power generation device 14, and therefore, the minimum value of the output based on the drooping characteristic shown in FIG. 3A or FIG. 3B may be subjected to a limiter at 0 or may be subjected to a limiter at such a value for charging power needed for operation of the power conversion device 11.

Next, the flow power control means 32 of the control unit 22 will be described. The flow power control means 32 receives the flow active power Ps and the corrected power command value Psref, and outputs the drive command value Pref to the power converter 21. Specifically, the drive command value Pref for the power converter 21 is generated so that the flow active power Ps coincides with the corrected power command value Psref.

In addition, in the case where power of the power storage device 15 is prohibited from reversely flowing from the consumer 30 to the voltage source 1, a configuration may be made such that, as shown in FIG. 2, the power conversion device 12 and the load 16 are connected, power flowing in a range from the connection point X1 therebetween to the connection point X2 with the power conversion device 11 is detected as reverse flow power, and the reverse flow power is inputted to the flow power control means 32, to prevent reverse flow.

The power generation device 14 is connected to the power conversion device 11, outputs DC voltage, and is capable of discharging power (power generation). Specifically, the power generation device 14 is a solar cell, a fuel cell, or the like. Alternatively, the power generation device 14 may be a device in which output of an AC power generation source by wind power generation or the like is converted to DC power.

The power storage device 15 is connected to the power conversion device 12, outputs DC voltage, and is capable of charging/discharging power. Specifically, the power storage device 15 is a lithium ion battery, a lead battery, a storage battery such as an electric vehicle battery, a large-capacity capacitor, or the like.

The load 16 is connected between the detection unit 13, and the power conversion device 12 or the power conversion device 11, and specifically, the load 16 is a home electrical appliance or the like.

Hereinafter, a specific example for suppressing power variation in the grid system according to embodiment 1 will be described with reference to FIG. 7, in which the number of the consumers in FIG. 1 is assumed to be one for the purpose of simplification of description. In the following description, it is assumed that the consumer 30 in FIG. 7 has the configuration shown in FIG. 2, the drooping characteristic of the power command correction means 52 is the one shown in FIG. 3B, and the drooping characteristic of the power command correction means 31 is the one shown in FIG. 5B.

Figure 7:
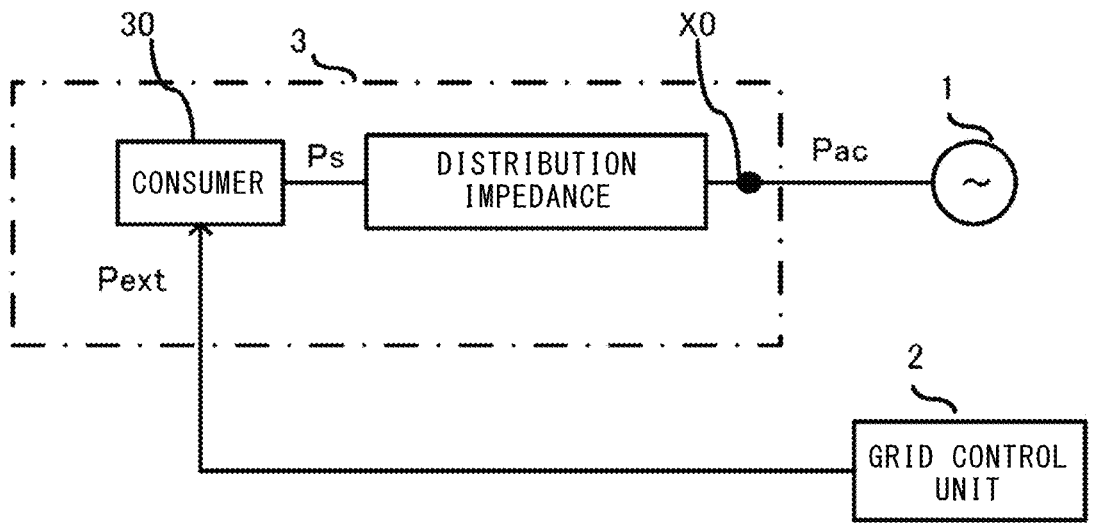
FIG. 7 is a configuration diagram showing the entirety of the grid system according to embodiment 1 in the case where the number of consumers is one.

In FIG. 7, Ps denotes flow active power from the consumer 30, Pac denotes active power of the voltage source 1, and Pext denotes a power command value from the grid control unit 2 to the consumer 30. In the drawing, the flow active power Ps of the consumer 30 and the active power Pac of the voltage source 1 have polarities opposite to each other. Therefore, in the following description, the active power Pac of the voltage source 1 is defined as having a polarity opposite to the flow active power Ps.

The flow active power Ps of the consumer 30 is determined by output active power Pgac of the power conversion device 11, output active power Pbac of the power conversion device 12, and consumed power Pload of the load 16. Specifically, Ps=Pgac+Pbac−Pload is satisfied.

In addition, in the following description, it is assumed that the voltage source 1 has such a characteristic that the frequency of the output voltage changes in accordance with active power borne by the voltage source 1. Specifically, when power discharged from the voltage source 1 to the consumer group 3 increases, the frequency of the output voltage of the voltage source 1 decreases, and when power charged from the consumer 30 to the voltage source 1 increases, the frequency of the output voltage of the voltage source 1 increases.

Figure 8A:
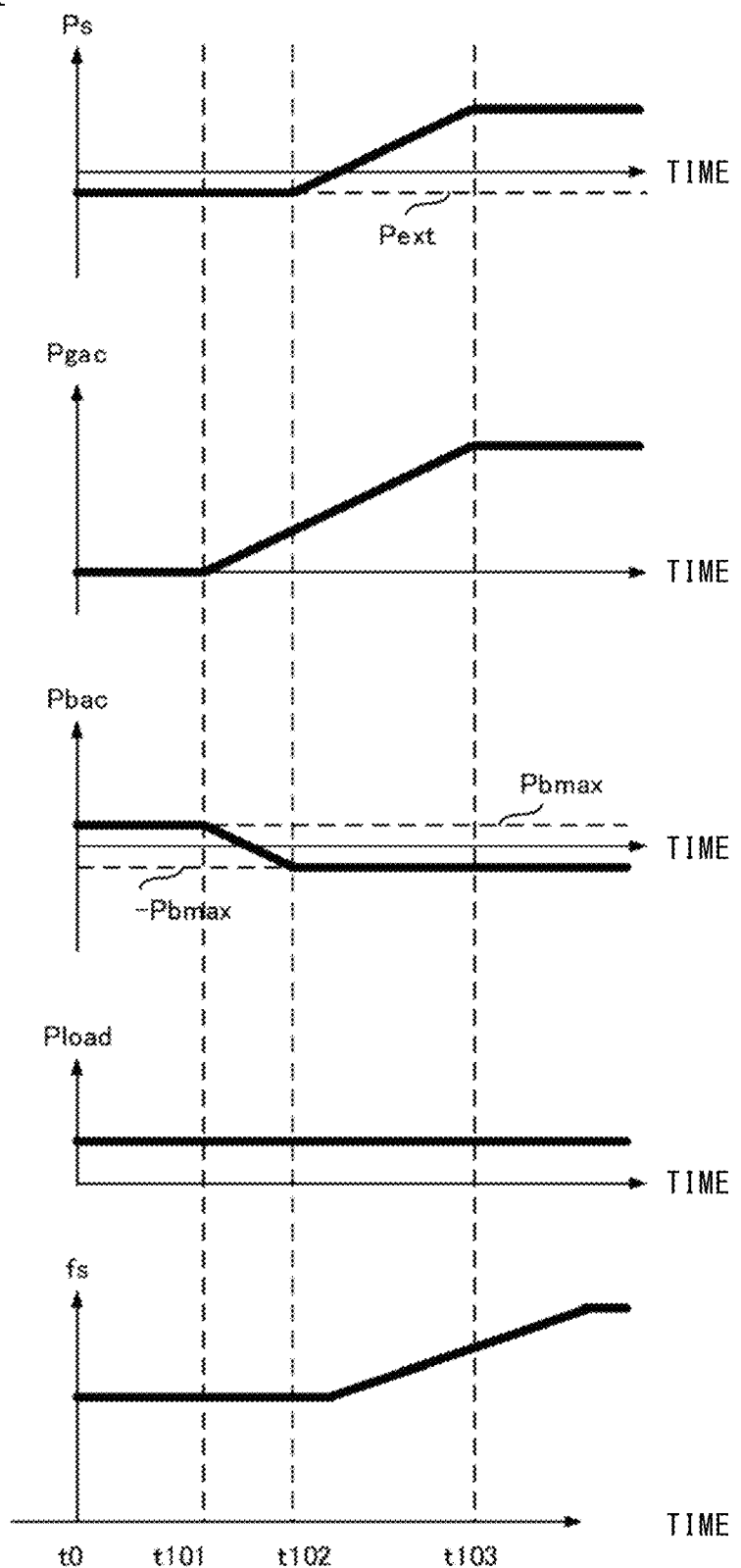
FIG. 8A is a timing chart in a conventional configuration as a comparative example for explaining suppression of power variation in the grid system according to embodiment 1.
Figure 8B:
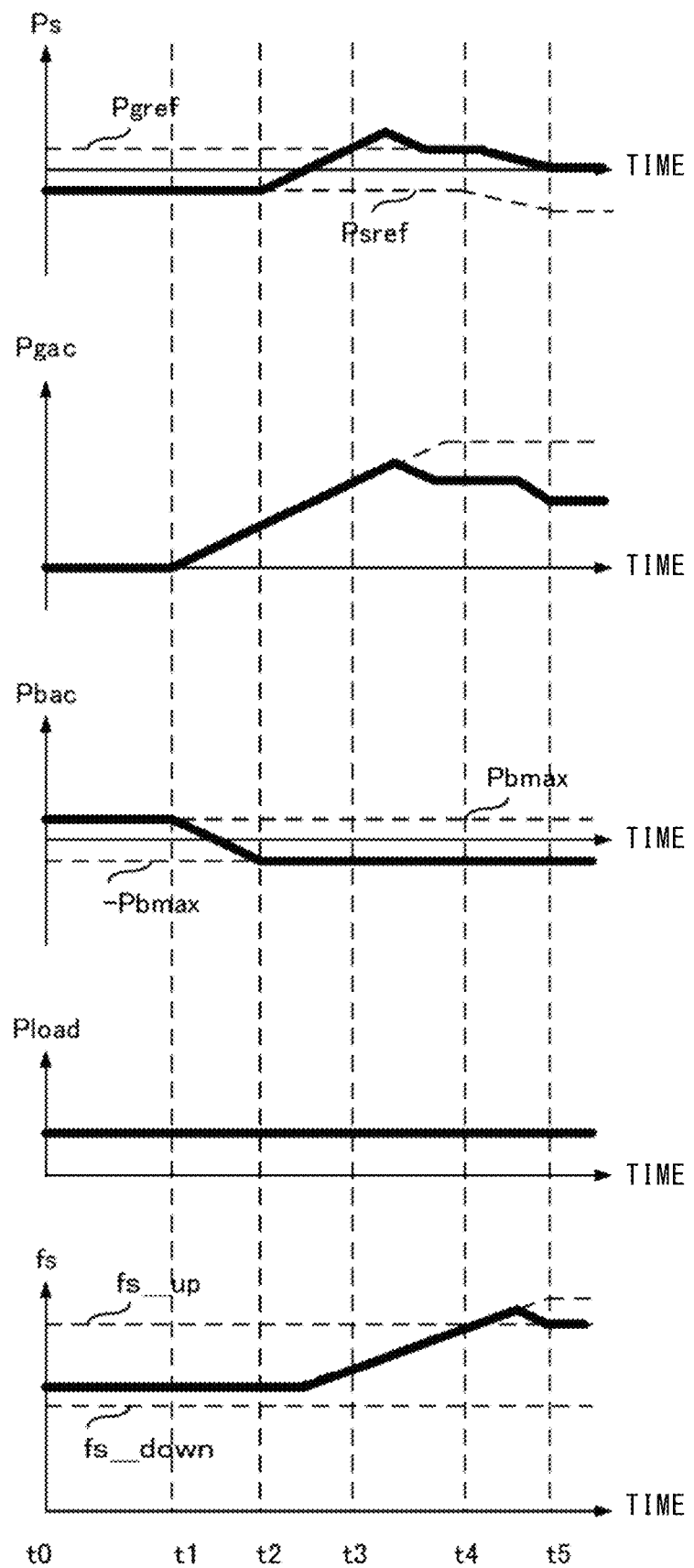
FIG. 8B is a timing chart for explaining suppression of power variation in the grid system according to embodiment 1.

FIG. 8A and FIG. 8B are timing charts of powers Ps, Pgac, Pbac, Pload and the frequency Fs in the grid system shown in FIG. 7, and show the case where the generated power of the power generation device 14 increases. FIG. 8A shows a conventional example for comparison, and FIG. 8B shows an example in which the configuration of the present embodiment described above is applied.

FIG. 8A and FIG. 8B show timing charts of, from the upper stage, flow active power Ps of the consumer 30, output active power Pgac of the power conversion device 11 on the side connected with the detection unit 13, output active power Pbac of the power conversion device 12 on the side connected with the detection unit 13, consumed power Pload of the load, and the frequency fs calculated by the frequency calculation means 64. In the drawings, Pext denotes the power command value from the grid control unit 2, Pbmax denotes the maximum output power of the power conversion device 12, fs_up denotes the upper end frequency of the drooping characteristic of the power command correction means 31, 52, fs_down denotes the lower end frequency of the drooping characteristic of the power command correction means 31, 52, Pgref denotes the corrected power command value outputted from the power command correction means 52, and Psref denotes the corrected power command value outputted from the power command correction means 31. It is noted that the waveform of the frequency fs is a waveform in which a temporary frequency change due to voltage variation based on the distribution impedance and power change, or the like, has been removed by a low-pass filter or the like.

First, FIG. 8A for the conventional configuration will be described. In the conventional configuration, the power command correction means 31, 52 are not provided and the power control means 53 operates so that the generated power Pg of the power generation device 14 is maximized. That is, output power of the power conversion device 11 is not adjusted in accordance with the flow active power Ps, and output power of the power conversion device 12 is adjusted so that the power command value Pext from the grid control unit 2 and the flow active power Ps coincide with each other.

Before time t101, there is no generated power from the power generation device 14, and the power conversion device 12 outputs, as the output active power Pbac of the power conversion device 12, a difference between the power command value Pext from the grid control unit 2 and the consumed power Pload of the load 16 in order that the power command value Pext from the grid control unit 2 and the flow active power Ps coincide with each other. Thus, the flow active power Ps coincides with the power command value Pext from the grid control unit 2.

At time t101, the generated power of the power generation device 14 increases, so that the output active power Pgac of the power conversion device 11 increases. Thus, the flow active power Ps increases, and then the power conversion device 12 performs a charging operation for the power storage device 15 so as to cause the flow active power Ps to coincide with the power command value Pext from the grid control unit 2, so that the output active power Pbac of the power conversion device 12 is reduced.

At time t102, the output active power Pbac of the power conversion device 12 reaches maximum charging power (−Pbmax) of the power conversion device 12, so that the flow active power Ps starts to increase. Along with this, active power borne by the voltage source 1 increases, and the frequency fs increases with a delay. Here, the delay of increase in the frequency fs is due to the low-pass filter of the frequency calculation means 64 and the like.

At time t103, the generated power increases to the maximum, the output active power Pgac of the power conversion device 11 becomes constant, and the flow active power Ps also becomes constant. Along with this, the active power borne by the voltage source 1 also becomes constant, and the frequency fs also becomes constant with a delay. Here, the delay of the frequency fs to become constant is due to the low-pass filter of the frequency calculation means 64 and the like as described above.

As described above, in the conventional configuration, the voltage source 1 ordinarily needs to bear the excessive generated power of the power generation device 14 that cannot be reduced by the consumer 30.

Next, with reference to FIG. 8B, the case of applying the configuration of the present embodiment described above will be described.

Before time t1, there is no generated power from the power generation device 14, and the power conversion device 12 outputs, as the output active power Pbac of the power conversion device 12, a difference between the power command value Psref and the consumed power Pload of the load 16 in order that the power command value Psref obtained by correcting the power command value Pext from the grid control unit 2 in accordance with the frequency fs, and the flow active power Ps coincide with each other. Thus, the flow active power Ps and the power command value Psref coincide with each other.

At time t1, the generated power of the power generation device 14 increases, so that the output active power Pgac of the power conversion device 11 increases. Thus, the flow active power Ps increases, and then the power conversion device 12 performs a charging operation for the power storage device 15 so as to cause the flow active power Ps to coincide with the power command value Psref, so that the output active power Pbac of the power conversion device 12 is reduced.

At time t2, the output active power Pbac of the power conversion device 12 reaches the maximum charging power (−Pbmax) of the power conversion device 12, so that the flow active power Ps starts to increase. Along with this, the active power borne by the voltage source 1 increases, and the frequency fs increases with a delay. Here, the delay of increase in the frequency fs is due to the low-pass filter of the frequency calculation means 64 and the like.

At time t3, when the flow active power Ps becomes greater than the power command value Pgref obtained by correcting the power command value Pext using the frequency fs and the correction power dPg, the power control means 53 generates the drive command so as to reduce the output active power Pgac of the power conversion device 11. Thus, the output active power Pgac of the power conversion device 11 is reduced (the generated power Pg of the power generation device 14 is reduced), so that the flow active power Ps coincides with the power command value Pgref.

At time t4, when the frequency fs changing with a delay from the change of the flow active power Ps becomes greater than the upper end frequency fs_up, the power command value Psref corrected by the power command correction means 31 and the power command value Pgref corrected by the power command correction means 52 are reduced in accordance with a difference between the frequency fs and the upper end frequency fs_up. Thus, the power command value Pgref and the power command value Psref are adjusted so that the generated power reducing operation of the power conversion device 11 and the charging operation of the power conversion device 12 are increased.

At the time t4, the output active power Pbac of the power conversion device 12 has been the maximum charging power, and thus the charging operation cannot be increased any more. Therefore, the output active power Pgac of the power conversion device 11 is reduced (the generated power Pg of the power generation device 14 is reduced), and the flow active power Ps coincides with the power command value Pgref corrected by the change of the frequency fs. As the flow active power Ps decreases, the active power borne by the voltage source 1 is also reduced, so that the frequency fs starts to decrease.

At time t5, the frequency fs coincides with the upper end frequency fs_up, and the power variations are converged.

In FIG. 7 above, the case where the number of the consumers 30 is one has been described. In a system having a plurality of consumers 30, control is performed in accordance with the conditions of the power generation devices and the power storage devices in the respective consumers 30, using the flow active power and the frequency at the power receiving point X2 obtained by the detection unit 13 in each consumer 30.

As described above, in the present embodiment 1, the charging operation for the power storage device 15 is prioritized over the excessive generated power of the power generation device 14, whereby the active power borne by the voltage source 1 can be reduced and an effect of suppressing change of the frequency fs is also obtained. In addition, with respect to frequency variation in the grid system, the power command value is corrected, whereby power variation in the grid system can also be suppressed. Further, in the case where the voltage source 1 has a storage battery for bearing the active power, in the present embodiment, the ordinary active power to be borne can be reduced, whereby an effect of reducing the capacity of the storage battery of the voltage source 1 is also obtained.

Embodiment 2

Hereinafter, a grid system according to embodiment 2 will be described with reference to the drawings.

Figure 9:
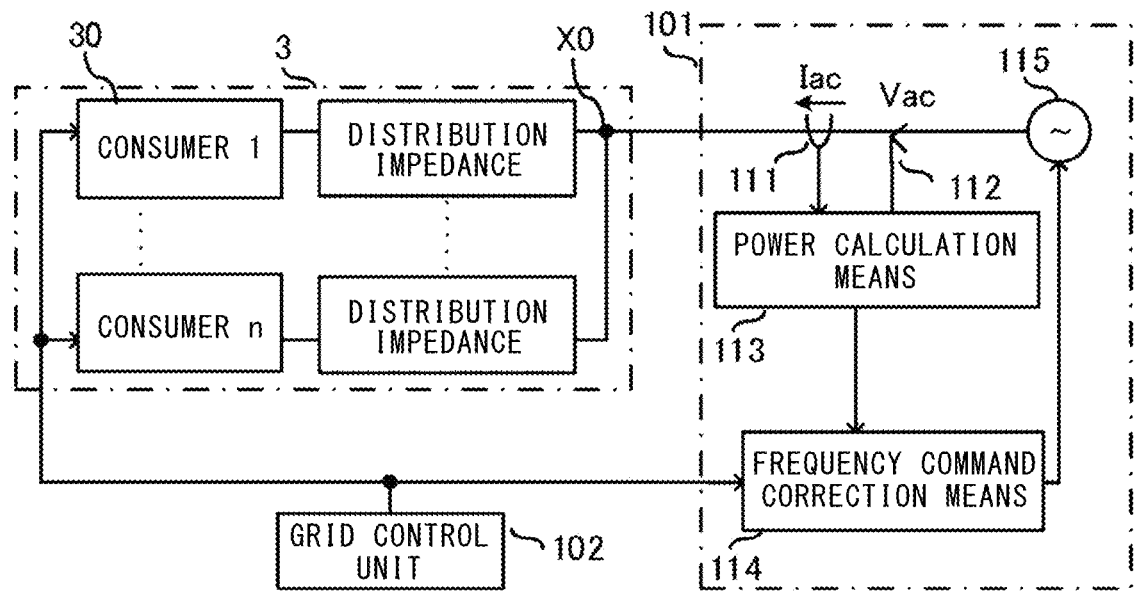
FIG. 9 is a configuration diagram showing the entirety of a grid system according to embodiment 2.

FIG. 9 is a configuration diagram showing the entirety of the grid system according to embodiment 2. In the drawing, the grid system includes a voltage source device 101 for outputting voltage to the distribution grid, a grid control unit 102 for transmitting a power command to each consumer 30 composing the consumer group 3, and the consumer group 3. The voltage source device 101 and devices provided to each consumer 30 are connected via distribution impedances (corresponding to impedances of the distribution grid). A difference from the grid system of embodiment 1 is the configuration of the voltage source described below, and the other configurations are the same as in embodiment 1.

For the voltage source 1 in embodiment 1, frequency change due to a rotational motion of a rotor of a power generator or the like and power borne by the voltage source 1 is taken into consideration. In embodiment 2, a function of adjusting a frequency command value for the output voltage in accordance with active power outputted from a voltage source 115 is provided. Specifically, the voltage source device 101 is configured by having frequency command correction means 114 for correcting the frequency of voltage outputted from the voltage source 115 in accordance with the active power borne by the voltage source 115.

In addition, the grid control unit 102 not only transmits a power command for the flow active power of each consumer to the consumer group 3, but also is connected to the voltage source device 101 and has a function of transmitting an output power command to the voltage source 115.

The voltage source device 101 includes current detection means 111, voltage detection means 112, power calculation means 113, the frequency command correction means 114, and the voltage source 115. The voltage source device 101 is connected to the consumer group 3, receives a power command value Peac from the grid control unit 102, and outputs predetermined output voltage to the consumer group 3.

The current detection means 111 detects output current Iac of the voltage source 115.

The voltage detection means 112 detects output voltage Vac of the voltage source 115.

The power calculation means 113 receives the detected voltage Vac and the detected current Iac, and outputs detected active power Pac to the frequency command correction means 114. As a specific calculation method for the detected active power Pac, the average of a product of the voltage Vac and the current Iac (=Vac×Iac) per the cycle of the voltage Vac is calculated. In addition, the product of the voltage Vac and the current Iac (=Vac×Iac) may be subjected to filter processing using a low-pass filter or the like.

The frequency command correction means 114 receives the detected active power Pac from the power calculation means 113 and the power command value Peac from the grid control unit 102, and outputs a corrected frequency command fref. As a correction method, if the detected active power Pac coincides with the power command value Pac from the grid control unit 102, a predetermined frequency command value fm is used as the corrected frequency command value fref. If the detected active power Pac changes from the power command value Peac from the grid control unit 102, a value obtained by adding a value based on the power change to the predetermined frequency command value fm is used as the corrected frequency command value fref.

Specifically, a value obtained by adding a product of a gain Kpf and a difference between the detected active power Pac and the power command value Peac from the grid control unit 102, to the predetermined frequency command value fm, is the frequency command value fref, as follows:

$$fref=fm+Kpf(Peac-Pac).$$

This has a drooping characteristic. The drooping characteristic may be imparted with a dead band so that the frequency command value is not corrected when change in the detected active power Pac is small.

Figure 10A:
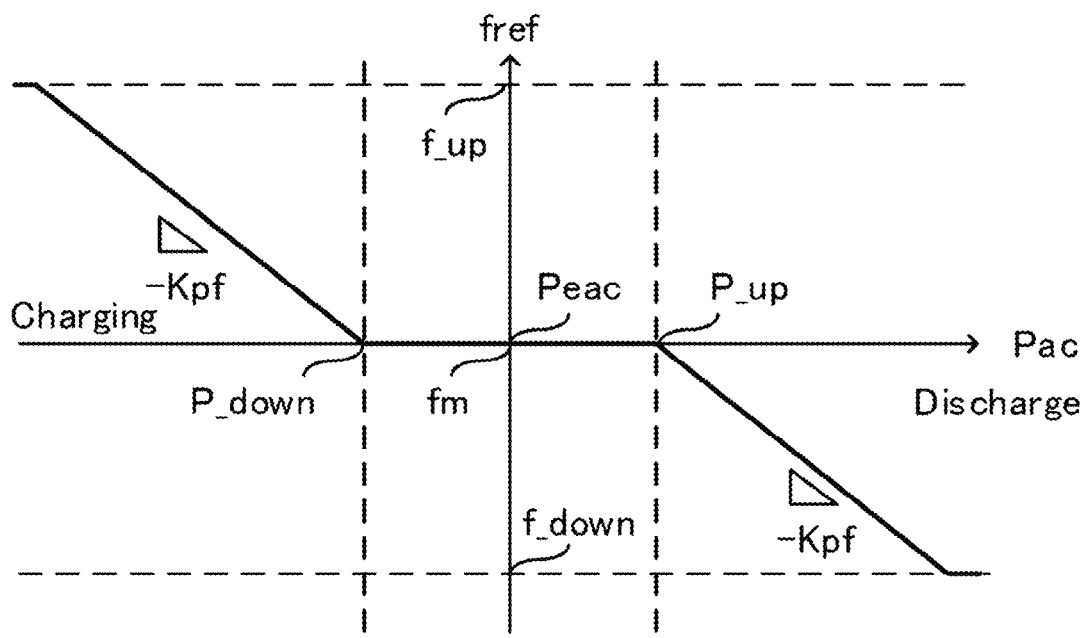
FIG. 10A shows a drooping characteristic of frequency command correction means for correcting the frequency of voltage supplied from a voltage source to a consumer in the grid system according to embodiment 2.
Figure 10B:
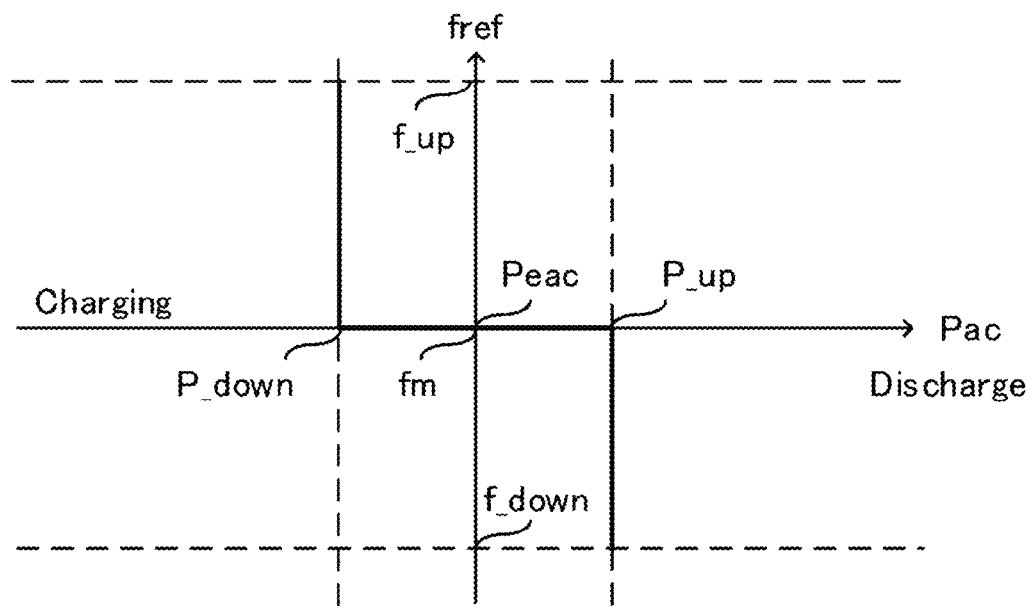
FIG. 10B shows a drooping characteristic of the frequency command correction means for correcting the frequency of voltage supplied from the voltage source to the consumer in the grid system according to embodiment 2.

FIG. 10A and FIG. 10B show examples of the drooping characteristic of the frequency command correction means 114. The horizontal axis indicates the detected active power Pac and the vertical axis indicates the frequency command value fref. The range of the detected active power Pac from lower end active power P_down to upper end active power P_up is set as a dead band, and in this range, the predetermined frequency command value fm is outputted as the corrected frequency command value fref. In addition, f_up denotes an upper limit frequency and f_down denotes a lower limit frequency, and these may be set as appropriate with reference to a frequency range in grid interconnection regulations (regulations regarding power in grid interconnection prescribed in individual countries and regions) or the like.

FIG. 10A shows an example of the drooping characteristic in the case of correcting the frequency command value using proportional control (P control) with respect to the detected active power Pac. If the detected active power Pac is greater than the upper end active power P_up, a value obtained by adding a product of the gain Kpf and a difference between the detected active power Pac and the upper end active power P_up to the predetermined frequency command value fm is used as the frequency command value fref. That is, the following is satisfied:

$$fref=fm+Kpf(P\_up-Pac).$$

At this time, if the corrected frequency command value fref is smaller than the lower limit frequency f_down, the corrected frequency command value fref is limited by the lower limit frequency f_down. That is, the following is satisfied:

$$fref=f\_down(if\ fref \leq f\_down).$$

If the detected active power Pac is smaller than the lower end active power P_down, a value obtained by adding a product of the gain Kpf and a difference between the detected active power Pac and the lower end active power P_down to the predetermined frequency command value fm is used as the frequency command value fref. That is, the following is satisfied:

$$fref=fm+Kpf(P\_down-Pac).$$

At this time, if the corrected frequency command value fref is greater than the upper limit frequency f_up, the corrected frequency command value fref is limited by the upper limit frequency f_up. That is, the following is satisfied:

$$fref=f\_up(if\ fref>f\_up).$$

Here, the gain Kpf is the same between the case where the detected active power Pac is greater than the upper end active power P_up and the case where the detected active power Pac is smaller than the lower end active power P_down, but may be set to different values. In addition, dead band information (upper end active power P_up, lower end active power P_down, upper limit frequency f_up, lower limit frequency f_down) for the drooping characteristic, information about the gain Kpf, or the like may be separately received from the grid control unit 102, and the drooping characteristic may be set in accordance with such information.

FIG. 10B shows an example of the drooping characteristic in the case of correcting the frequency command value using proportional integral control (PI control) with respect to the detected active power Pac. An output limiter for a PI controller may be set in accordance with the output range of the frequency command correction means 114. For example, the output limiter for the PI controller may be set in a range between the maximum output and the minimum output of the frequency command correction means 114, or may be set so that a value obtained by adding an output of the PI controller to the predetermined frequency command value fm is within a range between the maximum output and the minimum output of the frequency command correction means 114.

If the detected active power Pac is greater than the upper end active power P_up, the PI controller is operated by inputting a difference between the detected active power Pac and the upper end active power P_up to the PI controller, and a value obtained by adding the predetermined frequency command value fm to the output of the PI control is used as the frequency command value fref. At this time, if the corrected frequency command value fref is smaller than the lower limit frequency f_down, the corrected frequency command value fref is limited by the lower limit frequency f_down. That is, the following is satisfied:

$$fref=f\_down(if\ fref<f\_down).$$

If the detected active power Pac is smaller than the lower end active power P_down, the PI controller is operated by inputting a difference between the detected active power Pac and the lower end active power P_down to the PI controller, and a value obtained by adding the predetermined frequency command value fm to the output of the PI control is used as the frequency command value fref. At this time, if the corrected frequency command value fref is greater than the upper limit frequency f_up, the corrected frequency command value fref is limited by the upper limit frequency f_up. That is, the following is satisfied:

$$fref=f\_up(if\ fref>f\_up).$$

Dead band information (upper end active power P_up, lower end active power P_down, upper limit frequency f_up, lower limit frequency f_down) for the drooping characteristic, information about the gain and the limiter for the PI controller, or the like may be separately received from the grid control unit 102, and the drooping characteristic may be set in accordance with such information.

Further, in the case where the voltage source 115 has a power storage device, the correction amount for the frequency command value fref with respect to the detected active power Pac may be adjusted in accordance with the battery remaining amount of the power storage device of the voltage source 115. Specifically, if the battery remaining amount of the power storage device of the voltage source 115 is smaller than the predetermined battery remaining amount, the magnitude of the gain Kpf for the discharge side may be adjusted to be great, the magnitude of the gain Kpf for the charging side may be adjusted to be small, the lower end active power P_down may be adjusted to be small, or the upper end active power P_up may be adjusted to be small.

On the other hand, if the battery remaining amount of the power storage device of the voltage source 115 is greater than the predetermined battery remaining amount, the magnitude of the gain Kpf for the discharge side may be adjusted to be small, the magnitude of the gain Kpf for the charging side may be adjusted to be great, the lower end active power P_down may be adjusted to be great, or the upper end active power P_up may be adjusted to be great.

Information about the battery remaining amount of the power storage device of the voltage source 115 is transmitted to the grid control unit 102, and the grid control unit 102 may transmit a change for the drooping characteristic (change of gain Kpf, upper end active power P_up, lower end active power P_down, or the like) to the voltage source device 101.

Alternatively, the voltage source 115 may grasp the battery remaining amount of the power storage device of the voltage source 115 and transmit a change for the drooping characteristic (change of gain Kpf, upper end active power P_up, lower end active power P_down, or the like) to the frequency command correction means 114.

Figure 11A:
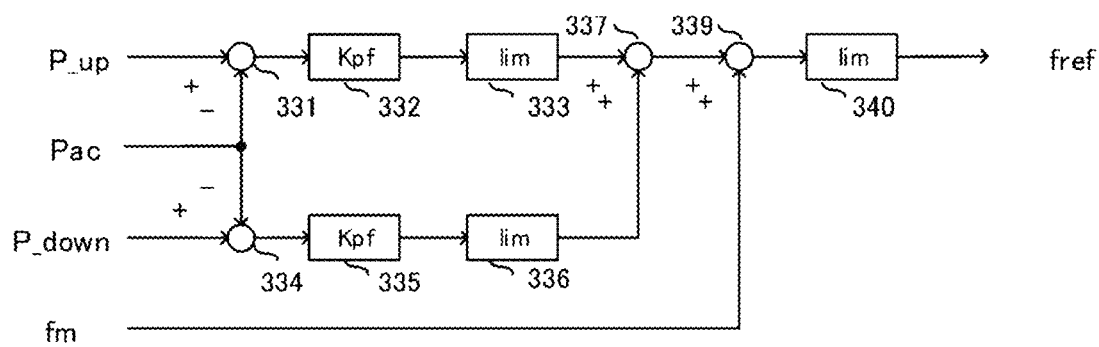
FIG. 11A is a control block diagram for realizing the drooping characteristic of the frequency command correction means provided to the voltage source in the grid system according to embodiment 2.
Figure 11B:
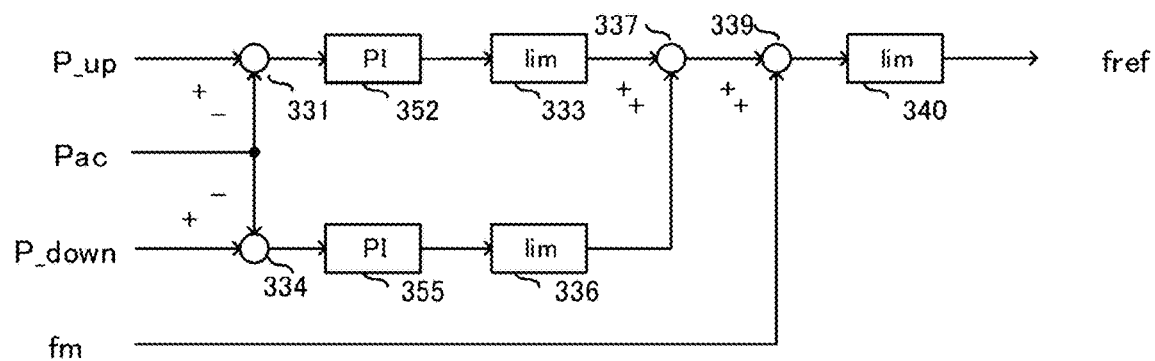
FIG. 11B is another control block diagram for realizing the drooping characteristic of the frequency command correction means provided to the voltage source in the grid system according to embodiment 2.

FIG. 11A and FIG. 11B show examples of control block diagrams for realizing the drooping characteristic of the frequency command correction means 114. FIG. 11A is a control block diagram corresponding to FIG. 10A, and FIG. 11B is a control block diagram corresponding to FIG. 10B.

In FIG. 11A, the detected active power Pac and the upper end active power P_up are inputted to a subtractor 331, and a result of subtraction is outputted as dPacup (dPacup=P_up−Pac).

The output dPacup of the subtractor 331 is inputted to a gain 332, and a result of multiplying dPacup by the gain Kpf is outputted as kPacup (kPacup=dPacup×Kpf).

The output kPacup of the gain 332 is inputted to a limiter 333, and if kPacup is greater than 0, a result of limitation by 0 is outputted as lPacup. That is, if kPacup>0 is satisfied, lPacup=kPacup=0 is outputted, and otherwise, lPacup=kPacup is outputted.

The detected active power Pac and the lower end active power P_down are inputted to a subtractor 334, and a result of subtraction is outputted as dPacdown (dPacdown=P_down−Pac).

The output dPacdown of the subtractor 334 is inputted to a gain 335, and a result of multiplying dPacdown by the gain Kpf is outputted as kPacdown (kPacdown=dPacdown×Kpf).

The output kPacdown of the gain 335 is inputted to a limiter 336, and if kPacdown is smaller than 0, a result of limitation by 0 is outputted as lPacdown. That is, if kPacdown<0 is satisfied, lPacdown=kPacdown=0 is outputted, and otherwise, lPacdown=kPacdown is outputted.

The output lPacup of the limiter 333 and the output lPacdown of the limiter 336 are inputted to an adder 337, and a result of addition is outputted as dfadd (dfadd=lPacup+lPacdown).

The output dfadd of the adder 337 and the predetermined frequency command value fm are inputted to an adder 339, and a result of addition is outputted as fadd (fadd=dfadd+fm).

The output fadd of the adder 339 is inputted to a limiter 340, and if fadd is greater than the upper limit frequency f_up, the frequency command value fref limited by the upper limit frequency f_up is outputted. That is, if fadd>f_up is satisfied, fref=fadd=f_up is outputted, and otherwise, fref=fadd is outputted. On the other hand, if fadd is smaller than the lower limit frequency f_down, the frequency command value fref limited by the lower limit frequency f_down is outputted. That is, if fadd<f_down is satisfied, fref=fadd=f_down is outputted, and otherwise, fref=fadd is outputted.

In FIG. 11B, the detected active power Pac and the upper end active power P_up are inputted to a subtractor 331, and a result of subtraction is outputted as dPacup (dPacup=P_up−Pac).

The output dPacup of the subtractor 331 is inputted to a PI controller 352, and a result of performing PI control of dPacup is outputted as kPacup (kPacup=dPacup×Kppf+dPacup×Kipf/s).

The output kPacup of the PI controller 352 is inputted to a limiter 333, and if kPacup is greater than 0, a limiter result of limitation by 0 is outputted as lPacup. That is, if kPacup>0 is satisfied, lPacup=kPacup=0 is outputted, and otherwise, lPacup=kPacup is outputted. It is noted that the integral value of the PI controller 352 may also be limited in the same manner.

The detected active power Pac and the lower end active power P_down are inputted to a subtractor 334, and a result of subtraction is outputted as dPacdown (dPacdown=P_down−Pac).

The output dPacdown of the subtractor 334 is inputted to a PI controller 355, and a result of performing PI control of dPacdown is outputted as kPacdown (kPacdown=dPacdown×Kppf+dPacdown×Kipf/s).

The output kPacdown of the PI controller 355 is inputted to a limiter 336, and if kPacdown is smaller than 0, a limiter result of limitation by 0 is outputted as lPacdown. That is, if kPacdown<0 is satisfied, lPacdown=kPacdown=0 is outputted, and otherwise, lPacdown=kPacdown is outputted. It is noted that the integral value of the PI controller 355 may also be limited in the same manner.

The output lPacup of the limiter 333 and the output lPacdown of the limiter 336 are inputted to an adder 337, and a result of addition is outputted as dfadd (dfadd=lPacup+lPacdown).

The output dfadd of the adder 337 and the predetermined frequency command value fm are inputted to an adder 339, and a result of addition is outputted as fadd (fadd=dfadd+fm).

The output fadd of the adder 339 is inputted to a limiter 340, and if fadd is greater than the upper limit frequency f_up, the frequency command value fref limited by the upper limit frequency f_up is outputted. That is, if fadd>f_up is satisfied, fref=fadd=f_up is outputted, and otherwise, fref=fadd is outputted. On the other hand, if fadd is smaller than the lower limit frequency f_down, the frequency command value fref limited by the lower limit frequency f_down is outputted. That is, if fadd<f_down is satisfied, fref=fadd=f_down is outputted, and otherwise, fref=fadd is outputted.

In the above embodiment 2, the voltage source device 101 may be provided with a power storage device. In this case, the frequency command correction means 114 of the voltage source device 101 may adjust the correction amount for the frequency command value fref with respect to the detected active power Pac, in accordance with the battery remaining amount of the power storage device of the voltage source device 101.

The voltage source 115 receives the frequency command value fref and outputs voltage to the distribution grid. Specifically, voltage corresponding to the frequency command value fref is outputted to the distribution grid.

As described above, in the grid system of embodiment 2, the voltage source device 101 is provided with the frequency command correction means 114 for correcting the frequency of voltage outputted from the voltage source 115 in accordance with the active power borne by the voltage source 115, whereby it is possible to more minutely reduce the active power borne by the voltage source 115, in addition to the effects of embodiment 1.

Embodiment 3

Hereinafter, a grid system according to embodiment 3 will be described with reference to the drawings.

Figure 12:
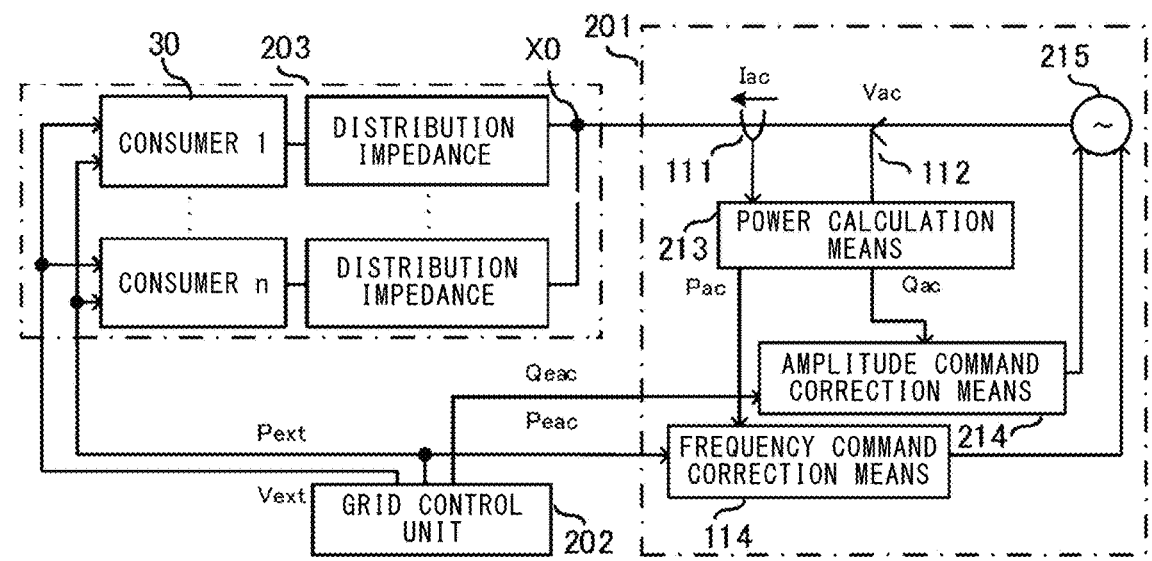
FIG. 12 is a configuration diagram showing the entirety of a grid system according to embodiment 3.

FIG. 12 is a configuration diagram showing the entirety of the grid system using a power conversion device according to embodiment 3. The grid system includes a voltage source device 201 for outputting voltage to the distribution grid, a grid control unit 202 for transmitting a power command to each consumer 30 composing a consumer group 203, and the consumer group 203. The voltage source device 201 and devices provided to each consumer 30 are connected via distribution impedances (corresponding to impedances of the distribution grid). The voltage source device 201 of embodiment 3 is different in that amplitude command correction means 214 is further provided in the voltage source device 101 of embodiment 2.

The voltage source device 201 is provided with the amplitude command correction means 214 for correcting an amplitude or voltage effective value command value for voltage outputted from a voltage source 215 in accordance with reactive power borne by the voltage source 215. In addition, the grid control unit 202 transmits a voltage adjustment width Vext and a power command for the flow active power to each consumer 30 of the consumer group 203, and further transmits an output power command value Peac and a reactive power command value Qeac to the voltage source device 201.

The voltage source device 201 includes current detection means 111, voltage detection means 112, power calculation means 213, frequency command correction means 114, amplitude command correction means 214, and the voltage source 215.

The power calculation means 213 receives voltage Vac detected by the voltage detection means 112 and current Iac detected by the current detection means 111, and outputs detected active power Pac and detected reactive power Qac. The example of the calculation method for the detected active power Pac has been described in embodiment 2 and therefore will not be described here. A specific calculation method for the detected reactive power Qac is as follows. In the power calculation means 213, phase detection for the voltage Vac is performed, and in accordance with the detected phase, sine-component effective value voltage V sin of the voltage Vac, cosine-component effective value voltage Vcos of the voltage Vac, sine-component effective value current I sin of the current Iac, and cosine-component effective value current Icos of the current Iac are extracted through discrete Fourier transform. Then, reactive power Q is calculated by the following Expression (1).

$$Q = V\sin \times I\cos - V\cos \times I\sin \quad (1)$$

In Expression (1), for the reactive power Q, the direction in which the voltage source 215 (voltage source device 201) outputs reactive power with an advanced phase is defined as positive.

As the sine-component effective value voltage V sin, the average of a product of the voltage Vac and a sine wave sin(φ) having an amplitude of √2 (=Vac×√2×sin(φ)) per the cycle based on zero-crossing of the phase φ is calculated. In addition, the product of the voltage Vac and the sine wave sin($\varphi$) having an amplitude of $\sqrt{2}$ (=Vac×$\sqrt{2}$×sin($\varphi$)) may be subjected to filter processing using a low-pass filter or the like.

As the cosine-component effective value voltage V cos, the cycle of a product of the voltage Vac and a cosine wave cos($\varphi$) having an amplitude of $\sqrt{2}$ (=Vac×$\sqrt{2}$×cos($\varphi$)) per the cycle based on zero-crossing of the phase $\varphi$ is calculated. In addition, the product of the voltage Vac and the cosine wave cos($\varphi$) having an amplitude of $\sqrt{2}$ (=Vac×$\sqrt{2}$×cos($\varphi$)) may be subjected to filter processing using a low-pass filter or the like.

As the sine-component effective value current I sin, the average of a product of the current Iac and a sine wave sin($\varphi$) having an amplitude of $\sqrt{2}$ (=Iac×$\sqrt{2}$×sin($\varphi$)) per the cycle based on zero-crossing of the phase $\varphi$ is calculated. In addition, the product of the current Iac and the sine wave sin($\varphi$) having an amplitude of $\sqrt{2}$ (=Iac×$\sqrt{2}$×sin($\varphi$)) may be subjected to filter processing using a low-pass filter or the like.

As the cosine-component effective value current I cos, the average of a product of the detection current Iac and a cosine wave cos($\varphi$) having an amplitude of $\sqrt{2}$ (=Iac×$\sqrt{2}$×cos($\varphi$)) per the cycle based on zero-crossing of the phase $\varphi$ is calculated. In addition, the product of the detection current Iac and the cosine wave cos($\varphi$) having an amplitude of $\sqrt{2}$ (=Iac×$\sqrt{2}$×cos($\varphi$)) may be subjected to filter processing using a low-pass filter or the like.

Here, the phase of the voltage Vac is used for the reactive power calculation. However, instead of this method, the phase of the voltage source 215 may be transmitted to the power calculation means 213, and the phase of the voltage source 215 may be used for the reactive power calculation.

The amplitude command correction means 214 receives the detected reactive power Qac and the reactive power command value Qeac from the grid control unit 202, and outputs a corrected amplitude command value Aref. As a correction method, if the detected reactive power Qac is the reactive power command value Qeac from the grid control unit 202, a predetermined amplitude command value Am is outputted as the amplitude command value Aref, and if the detected reactive power Qac changes from the reactive power command value Qeac, a value obtained by adding a value based on the power change to the predetermined amplitude command value Am is outputted as the amplitude command value Aref.

Specifically, for example, a value obtained by adding a product of a gain Kqa and a difference between the detected reactive power Qac and the reactive power command value Qeac from the grid control unit 202, to the predetermined amplitude command value Am, is the amplitude command value Aref, as follows:

$$Aref = Am + Kqa(Qac - Qeac).$$

This has a drooping characteristic. The drooping characteristic may be imparted with a dead band so that the amplitude command value is not corrected when change in the detected reactive power Qac is small.

Figure 13A:
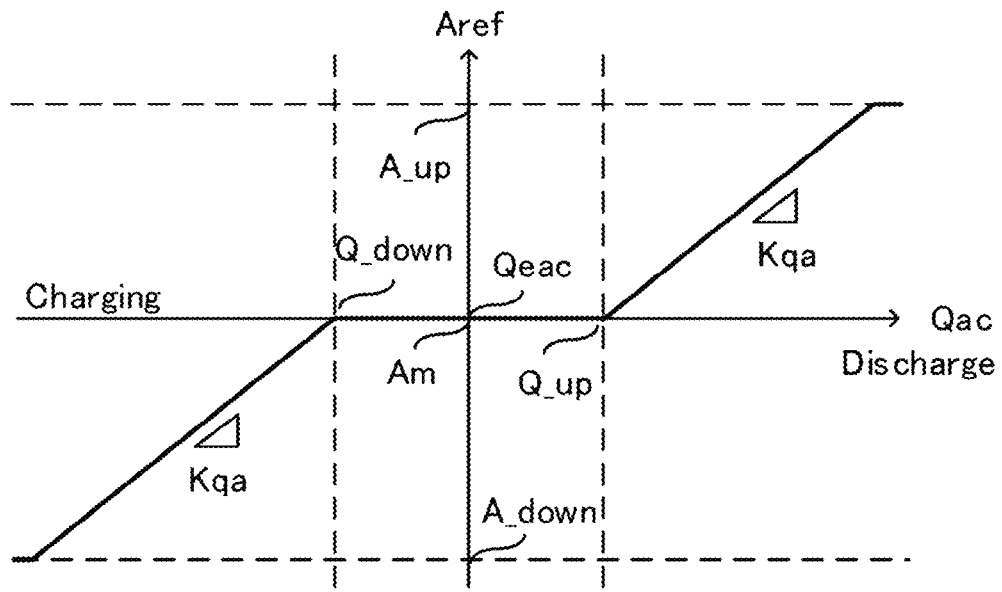
FIG. 13A shows a drooping characteristic of amplitude command correction means for correcting the amplitude of voltage supplied from a voltage source to a consumer in the grid system according to embodiment 3.
Figure 13B:
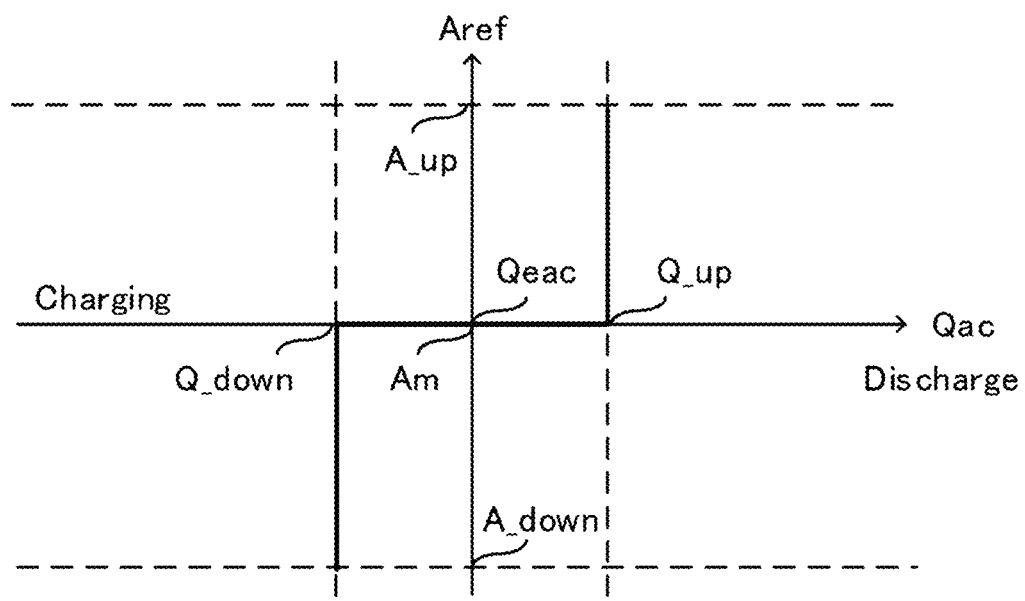
FIG. 13B shows another drooping characteristic of the amplitude command correction means for correcting the amplitude of voltage supplied from the voltage source to the consumer in the grid system according to embodiment 3.

FIG. 13A and FIG. 13B show examples of the drooping characteristic of the amplitude command correction means 214. In the drawings, the horizontal axis indicates the detected reactive power Qac and the vertical axis indicates the corrected amplitude command value Aref. The range of the detected reactive power Qac from a lower end reactive power Q_down to an upper end reactive power Q_up is set as a dead band, and in this range, the predetermined amplitude command value Am is outputted as the corrected amplitude command value Aref. In addition, A_up denotes an upper limit amplitude and A_down denotes a lower limit amplitude, and these may be set as appropriate with reference to a voltage amplitude range in grid interconnection regulations or the like.

FIG. 13A shows an example of the drooping characteristic in the case of correcting the amplitude command value using proportional control (P control) with respect to the detected reactive power Qac. If the detected reactive power Qac is greater than the upper end reactive power Q_up, a value obtained by adding a product of the gain Kqa and a difference between the detected reactive power Qac and the upper end reactive power Q_up to the predetermined amplitude command value Am is used as the amplitude command value Aref. That is, the following is satisfied:

$$Aref = Am + Kqa(Qac - Q\_up).$$

At this time, if the corrected amplitude command value Aref is greater than the upper limit amplitude A_up, the corrected amplitude command value Aref is limited by the upper limit amplitude A_up. That is, the following is satisfied:

$$Aref = A\_up \text{ (if } Aref > A\_up\text{)}.$$

If the detected reactive power Qac is smaller than the lower end reactive power Q_down, a value obtained by adding a product of the gain Kqa and a difference between the detected reactive power Qac and the lower end reactive power Q_down to the predetermined amplitude command value Am is used as the amplitude command value Aref. That is, the following is satisfied:

$$Aref = Am + Kqa(Qac - Q\_down).$$

At this time, if the corrected amplitude command value Aref is smaller than the lower limit amplitude A_down, the corrected amplitude command value Aref is limited by the lower limit amplitude A_down. That is, the following is satisfied:

$$Aref = A\_down \text{ (if } Aref < A\_down\text{)}.$$

Here, the gain Kqa is the same between the case where the detected reactive power Qac is greater than the upper end reactive power Q_up and the case where the detected reactive power Qac is smaller than the lower end reactive power Q_down, but may be set to different values. In addition, dead band information (upper end reactive power Q_up, lower end reactive power Q_down, upper limit amplitude A_up, lower limit amplitude A_down) for the drooping characteristic, information about the gain Kqa, or the like may be separately received from the grid control unit 202, and the drooping characteristic may be set in accordance with such information.

FIG. 13B shows an example of the drooping characteristic in the case of correcting the amplitude command value using proportional integral control (PI control) with respect to the detected reactive power Qac. An output limiter of a PI controller may be set in accordance with the output range of the amplitude command correction means 214. For example, the output limiter of the PI controller may be set in a range between the maximum output and the minimum output of the amplitude command correction means 214, or may be set so that a value obtained by adding an output of the PI controller to the predetermined amplitude command value Am is within a range between the maximum output and the minimum output of the amplitude command correction means 214.

If the detected reactive power Qac is greater than the upper end reactive power Q_up, the PI controller is operated by inputting a difference between the detected reactive power Qac and the upper end reactive power Q_up to the PI controller, and a value obtained by adding the output of the PI control to the predetermined amplitude command value Am is used as the amplitude command value Aref. At this time, if the corrected amplitude command value Aref is greater than the upper limit amplitude A_up, the corrected amplitude command value Aref is limited by the upper limit amplitude A_up. That is, the following is satisfied:

$$Aref=A\_up(\text{if } Aref>A\_up).$$

If the detected reactive power Qac is smaller than the lower end reactive power Q_down, the PI controller is operated by inputting a difference between the detected reactive power Qac and the lower end reactive power Q_down to the PI controller, and a value obtained by adding the output of the PI control to the predetermined amplitude command value Am is used as the amplitude command value Aref. At this time, if the corrected amplitude command value Aref is smaller than the lower limit amplitude A_down, the corrected amplitude command value Aref is limited by the lower limit amplitude A_down. That is, the following is satisfied:

$$Aref=A\_down(\text{if } Aref<A\_down).$$

It is noted that dead band information (upper end reactive power Q_up, lower end reactive power Q_down, upper limit amplitude A_up, lower limit amplitude A_down) for the drooping characteristic, information about the gain and the limiter for the PI controller, or the like may be separately received from the grid control unit 202, and the drooping characteristic may be set in accordance with such information.

Figure 14A:
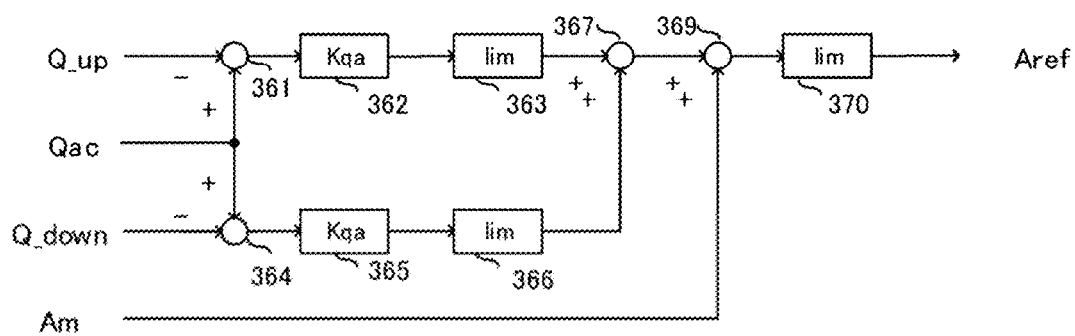
FIG. 14A is a control block diagram for realizing the drooping characteristic of the amplitude command correction means provided to the voltage source in the grid system according to embodiment 3.
Figure 14B:
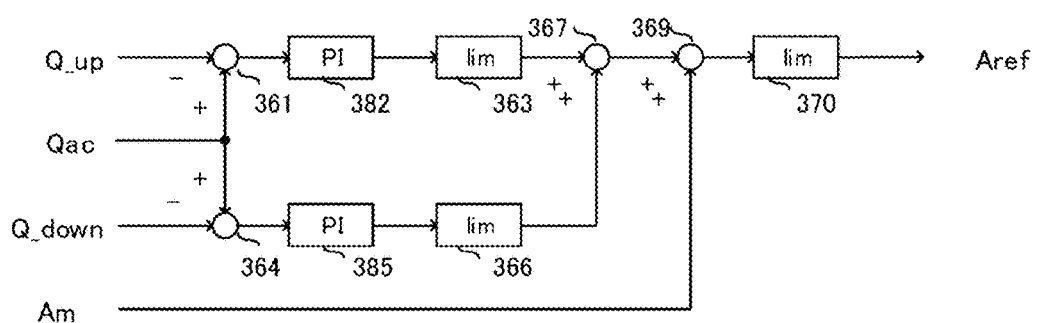
FIG. 14B is a another control block diagram for realizing the drooping characteristic of the amplitude command correction means provided to the voltage source in the grid system according to embodiment 3.

FIG. 14A and FIG. 14B show examples of control block diagrams for realizing the drooping characteristic of the amplitude command correction means 214. FIG. 14A is a control block diagram corresponding to FIG. 13A, and FIG. 14B is a control block diagram corresponding to FIG. 13B.

First, FIG. 14A will be described. In the drawing, the detected reactive power Qac and the upper end reactive power Q_up are inputted to a subtractor 361, and a result of subtraction is outputted as dQacup (dQacup=Qac−Q_up).

The output dQacup of the subtractor 361 is inputted to a gain 362, and a result of multiplying dQacup by the gain Kqa is outputted as kQacup (kQacup=dQacup×Kqa).

The output kQacup of the gain 362 is inputted to a limiter 363, and if kQacup is smaller than 0, a result of limitation by 0 is outputted as lQacup. That is, if kQacup<0 is satisfied, lQacup=kQacup=0 is outputted, and otherwise, lQacup=kQacup is outputted.

The detected reactive power Qac and the lower end reactive power Q_down are inputted to a subtractor 364, and a result of subtraction is outputted as dQacdown (dQacdown=Qac−Q_down).

The output dQacdown of the subtractor 364 is inputted to a gain 365, and a result of multiplying dQacdown by the gain Kqa is outputted as kQacdown (kQacdown=dQacdown×Kqa).

The output kQacdown of the gain 365 is inputted to a limiter 366, and if kQacdown is greater than 0, a result of limitation by 0 is outputted as lQacdown. That is, if kQacdown>0 is satisfied, lQacdown=kQacdown=0 is outputted, and otherwise, lQacdown=kQacdown is outputted.

The output lQacup of the limiter 363 and the output lQacdown of the limiter 366 are inputted to an adder 367, and a result of addition is outputted as dAadd (dAadd=lQacup+lQacdown).

The output dAadd of the adder 367 and the predetermined amplitude command value Am are inputted to an adder 369, and a result of addition is outputted as Aadd (Aadd=dAadd+Am).

The output Aadd of the adder 369 is inputted to a limiter 370, and if Aadd is greater than the upper limit amplitude A_up, the amplitude command value Aref limited by the upper limit amplitude A_up is outputted. That is, if Aadd>A_up is satisfied, Aref=Aadd=A_up is outputted, and otherwise, Aref=Aadd is outputted. On the other hand, if Aadd is smaller than the lower limit amplitude A_down, the amplitude command value Aref limited by the lower limit amplitude A_down is outputted. That is, if Aadd<A_down is satisfied, Aref=Aadd=A_down is outputted, and otherwise, Aref=Aadd is outputted.

Next, FIG. 14B will be described. In the drawing, the detected reactive power Qac and the upper end reactive power Q_up are inputted to a subtractor 361, and a result of subtraction is outputted as dQacup (dQacup=Qac−Q_up).

The output dQacup of the subtractor 361 is inputted to a PI controller 382, and a result of performing PI control of dQacup is outputted as kQacup (kQacup=dQacup×Kpqa+dQacup×Kiqa/s).

The output kQacup of the PI controller 382 is inputted to a limiter 363, and if kQacup is smaller than 0, a limiter result of limitation by 0 is outputted as lQacup. That is, if kQacup<0 is satisfied, lQacup=kQacup=0 is outputted, and otherwise, lQacup=kQacup is outputted. It is noted that the integral value of the PI controller 382 may also be limited in the same manner.

The detected reactive power Qac and the lower end reactive power Q_down are inputted to a subtractor 364, and a result of subtraction is outputted as dQacdown (dQacdown=Qac−Q_down).

The output dQacdown of the subtractor 364 is inputted to a PI controller 385, and a result of performing PI control of dQacdown is outputted as kQacdown (kQacdown=dQacdown×Kpqa+dQacdown×Kiqa/s).

The output kQacdown of the PI controller 385 is inputted to a limiter 366, and if kQacdown is greater than 0, a result of limitation by 0 is outputted as lQacdown. That is, if kQacdown>0 is satisfied, lQacdown=kQacdown=0 is outputted, and otherwise, lQacdown=kQacdown is outputted. It is noted that the integral value of the PI controller 385 may also be limited in the same manner.

The output lQacup of the limiter 363 and the output lQacdown of the limiter 366 are inputted to an adder 367, and a result of addition is outputted as dAadd (dAadd=lQacup+lQacdown).

The output dAadd of the adder 367 and the predetermined amplitude command value Am are inputted to an adder 369, and a result of addition is outputted as Aadd (Aadd=dAadd+Am).

The output Aadd of the adder 369 is inputted to a limiter 370, and if Aadd is greater than the upper limit amplitude A_up, the amplitude command value Aref limited by the upper limit amplitude A_up is outputted. That is, if Aadd>A_up is satisfied, Aref=Aadd=A_up is outputted, and otherwise, Aref=Aadd is outputted. On the other hand, if Aadd is smaller than the lower limit amplitude A_down, the amplitude command value Aref limited by the lower limit amplitude A_down is outputted. That is, if Aadd<A_down is satisfied, Aref=Aadd=A_down is outputted, and otherwise, Aref=Aadd is outputted.

Figure 15:
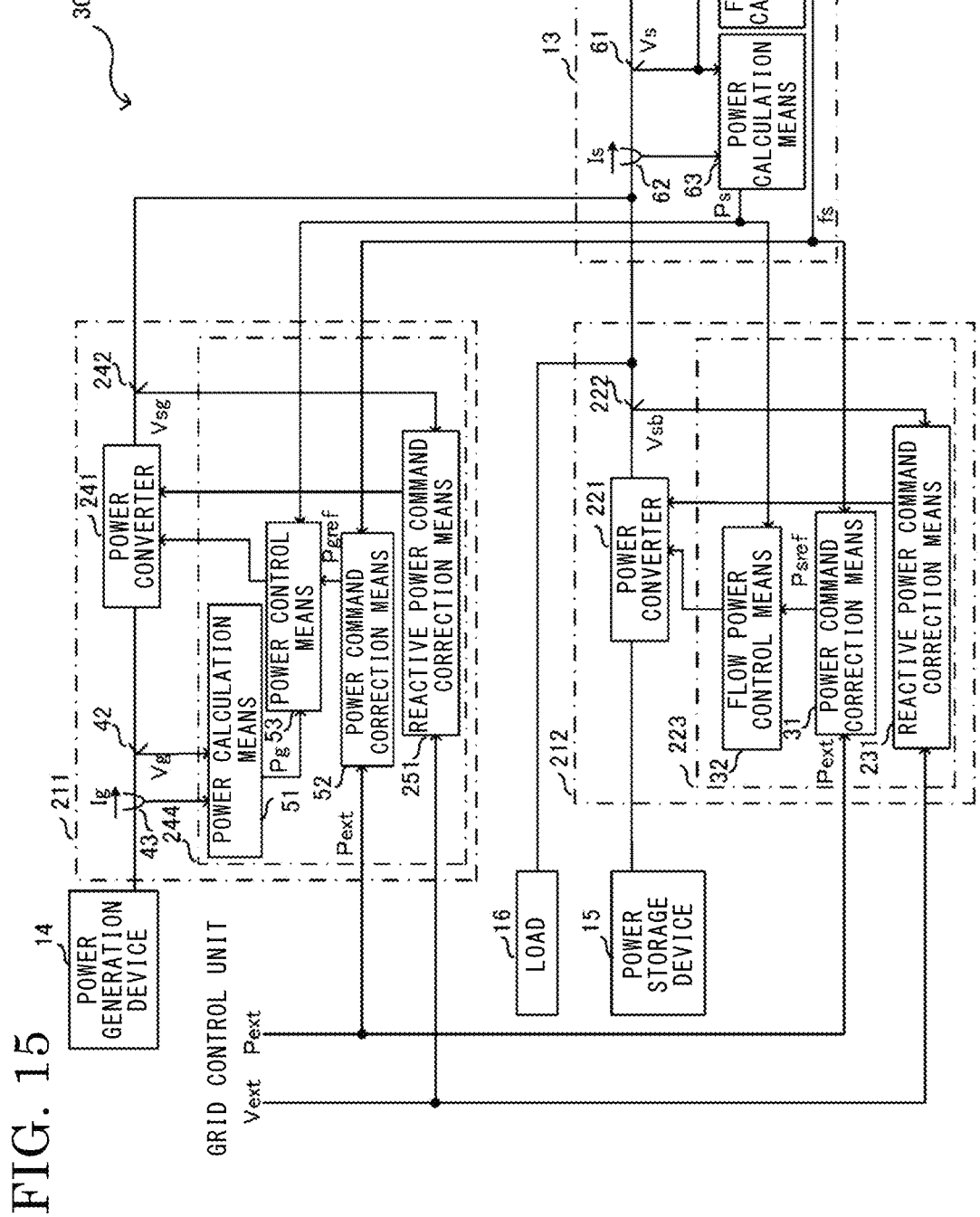
FIG. 15 is a schematic wiring diagram in a consumer having a power generation device and a power storage device in the grid system according to embodiment 3.

FIG. 15 is a schematic wiring diagram in the consumer 30 having a power generation device and a power storage device, of the consumer group 203 in the grid system shown in FIG. 12. In the drawing, the consumer 30 includes the detection unit 13, the power generation device 14, the power storage device 15, the load 16, a power conversion device 211 for converting power of the power generation device 14, and a power conversion device 212 for converting power of the power storage device 15. The same reference characters as those in FIG. 2 in embodiment 1 denote the corresponding parts and the description thereof is omitted.

The power conversion device 211 includes a power converter 241, voltage detection means 42, 242, current detection means 43, and a control unit 244. The power conversion device 211 is connected between the power generation device 14 and the detection unit 13, and converts DC voltage of the power generation device 14 to AC voltage for the distribution grid. Regarding the output power of the power conversion device 211, although the details are omitted here because description has been given in embodiment 1, the output power is basically adjusted so that the generated power of the power generation device 14 is maximized. However, if the flow active power Ps is greater than the power command value determined by the power command value Pext from the grid control unit 202 and the frequency fs, operation of reducing output power of the power conversion device 211 is performed. In addition, the power conversion device 211 includes reactive power command correction means 251 (first reactive power command correction means) which, when the voltage of the consumer increases to be greater than first predetermined voltage or decreases to be smaller than second predetermined voltage, outputs reactive power in accordance with the increase or decrease of the voltage of the consumer, i.e., in accordance with a difference between the voltage of the consumer and the first predetermined voltage or the second predetermined voltage. In addition, the power conversion device 211 can output reactive power in a state in which the power generation device 14 is not generating power, and thus it is possible to adjust reactive power irrespective of the state of the power generation device 14 of the consumer 30. The first predetermined voltage and the second predetermined voltage will be described later.

The power converter 241 includes a switching element, a driving circuit for the switching element, a capacitor for stabilizing output voltage of the power generation device 14, and the like, and is configured as a full-bridge or half-bridge inverter circuit or the like, for example. In accordance with a drive command and a reactive power drive command from the control unit 244, the driving circuit switches the switching element to convert DC voltage of the power generation device 14 to AC voltage for the distribution grid so as to have predetermined voltage. The output power of the power converter 241 is controlled so as to coincide with the drive command and the reactive power drive command from the control unit 244, within a range not exceeding the apparent power of the power converter 241. Specifically, the power converter 241 receives the drive command and the reactive power drive command from the control unit 244, and outputs the output power so as to coincide with the drive command and the reactive power drive command if the vector sum of the drive command and the reactive power drive command is not greater than the apparent power that the power converter 241 can output. If the vector sum of the drive command and the reactive power drive command is greater than the apparent power that the power converter 241 can output, the drive command or the reactive power drive command is limited or both of the drive command and the reactive power drive command are limited, and the power converter 241 outputs the output power within a range not exceeding the apparent power of the power converter 241. For the limitation of the commands, for example, the drive command and the reactive power drive command may be limited by a certain rate, or may be limited in accordance with a lower limit power factor of the power converter 241.

The voltage detection means 242 is connected between the power converter 241 and the detection unit 13, and detects output voltage Vsg of the power converter 241 as the voltage of the consumer.

The control unit 244 includes power calculation means 51, power command correction means 52, power control means 53, and reactive power command correction means 251.

The reactive power command correction means 251 receives the voltage Vsg and the voltage adjustment width Vext from the grid control unit 202, and outputs a reactive power drive command value Qref. A method for determining the reactive power drive command is as follows. If the voltage effective value of the voltage Vsg is in a voltage effective value range (e.g., range of Vm−Vext−dV to Vm+Vext+dV) determined by the voltage adjustment width Vext from the grid control unit 202, a predetermined voltage effective value Vm, and correction voltage dV, a predetermined reactive power command value Qm is outputted as the reactive power drive command value Qref, and if the voltage effective value of the voltage Vsg changes from the voltage effective value range determined by the voltage adjustment width Vext from the grid control unit 202 and the predetermined voltage effective value Vm, a value obtained by adding a value based on the voltage change to the predetermined reactive power command value Qm is outputted as the reactive power drive command value Qref.

Specifically, a difference of the voltage effective value of the voltage Vsg from the voltage effective value range determined by the voltage adjustment width Vext from the grid control unit 202 and the predetermined voltage effective value Vm is multiplied by a gain Kvq, and a value obtained by adding the multiplication result to the predetermined reactive power command value Qm is the reactive power drive command value Qref, which has a drooping characteristic. The drooping characteristic may be imparted with a dead band so that the reactive power command value is not corrected when change in the voltage effective value of the detected voltage Vsg is small.

Figure 16A:
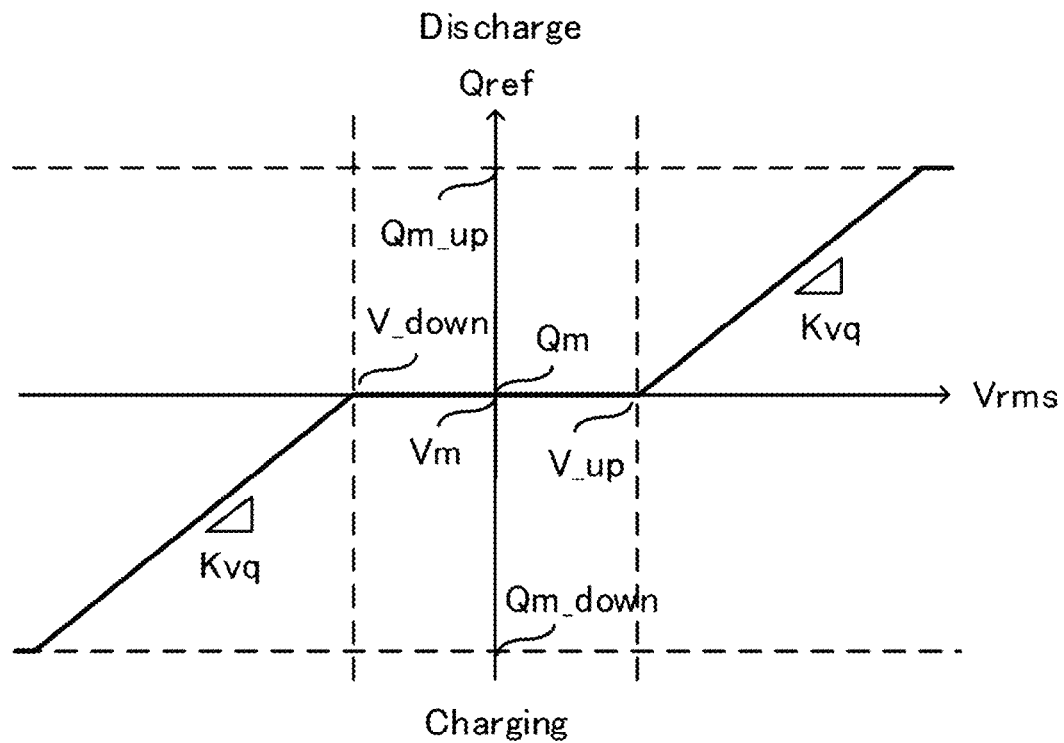
FIG. 16A shows a drooping characteristic of reactive power command correction means provided to a power conversion device for the power generation device in the consumer in the grid system according to embodiment 3.
Figure 16B:
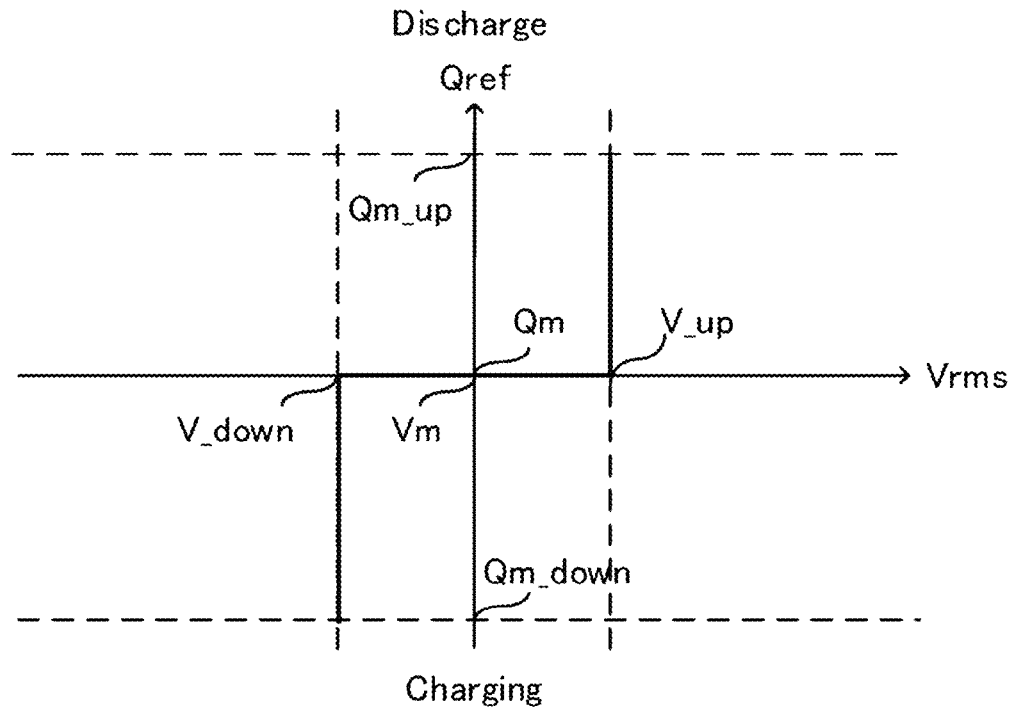
FIG. 16B shows a drooping characteristic of the reactive power command correction means provided to the power conversion device for the power generation device in the consumer in the grid system according to embodiment 3.

FIG. 16A and FIG. 16B show examples of the drooping characteristic of the reactive power command correction means 251. In the drawings, the horizontal axis indicates a voltage effective value Vrms and the vertical axis indicates the reactive power drive command value Qref. The range of the voltage effective value Vrms of the voltage Vsg from lower end voltage V_down to upper end voltage V_up is set as a dead band, and in this range, the predetermined reactive power Qm is outputted as the reactive power drive command value Qref. Here, the upper end voltage V_up of the dead band is, for example, a value obtained by adding the voltage adjustment width Vext and the correction voltage dV to the predetermined voltage Vm (V_up=Vm+Vext+dV, corresponding to the first predetermined voltage), and the lower end voltage V_down is, for example, a value obtained by subtracting the voltage adjustment width Vext and the correction voltage dV from the predetermined voltage Vm (V_down=Vm−Vext−dV, corresponding to the second predetermined voltage). The predetermined voltage Vm may be set with reference to reference voltage in interconnection regulations (for example, 202 Vrms). The predetermined reactive power Qm may be 0 Var, or although not specifically described in the present embodiment, if a reactive power command is transmitted from the grid control unit 202, the reactive power command value from the grid control unit 202 may be used as the predetermined reactive power Qm. In addition, Qm_up denotes an upper limit reactive power drive command value and Qm_down denotes a lower limit reactive power drive command value, and these may be set as appropriate with reference to the rated power of the power converter 241 or the like.

The power conversion device 212 for converting power of the power storage device 15 as described later is also provided with reactive power command correction means 231 (second reactive power command correction means) which, when the voltage of the consumer in the power conversion device 212 increases to be greater than third predetermined voltage or decreases to be smaller than fourth predetermined voltage, outputs reactive power in accordance with the increase or decrease of the voltage of the consumer, i.e., in accordance with a difference between the voltage of the consumer and the third predetermined voltage or the fourth predetermined voltage.

The above correction voltage dV is set such that the first predetermined voltage for operating the reactive power command correction means 251 of the power conversion device 211 for the power generation device 14 is greater than the third predetermined voltage for operating the reactive power command correction means 231 of the power conversion device 212 for the power storage device 15, and the second predetermined voltage for operating the reactive power command correction means 251 of the power conversion device 211 for the power generation device 14 is smaller than the fourth predetermined voltage for operating the reactive power command correction means 231 of the power conversion device 212 for the power storage device 15. That is, the correction voltage dV is set so as to increase the voltage width for starting operation of the reactive power command correction means 251. In addition, the correction voltage dV may be set in consideration of voltage detection error in the voltage detection means 242, 222 and calculation error of the voltage effective value.

FIG. 16A shows an example of the drooping characteristic of the reactive power drive command value Qref in the case of using proportional control (P control) with respect to the voltage effective value Vrms of the voltage Vsg. If the voltage effective value Vrms of the voltage Vsg is greater than the upper end voltage V_up, a value obtained by adding a product of the gain Kvq and a difference between the voltage effective value Vrms of the detected voltage Vsg and the upper end voltage V_up, to the predetermined reactive power Qm, is used as the reactive power drive command value Qref. That is, the following is satisfied:

$Qref=Qm+Kvq(Vrms-V\_up)$.

At this time, if the reactive power drive command value Qref is greater than the upper limit reactive power drive command value Qm_up, the reactive power drive command value Qref is limited by the upper limit reactive power drive command value Qm_up. That is, the following is satisfied:

$Qref=Qm\_up(\text{if } Qref>Qm\_up)$.

If the voltage effective value Vrms of the voltage Vsg is smaller than the lower end voltage V_down, a value obtained by adding a product of the gain Kvq and a difference between the voltage effective value Vrms of the detected voltage Vsg and the lower end voltage V_down, to the predetermined reactive power Qm, is used as the reactive power drive command value Qref. That is, the following is satisfied:

$Qref=Qm+Kvq(Vrms-V\_down)$.

At this time, if the reactive power drive command value Qref is smaller than the lower limit reactive power drive command value Qm_down, the reactive power drive command value Qref is limited by the lower limit reactive power drive command value Qm_down. That is, the following is satisfied:

$Qref=Qm\_down(\text{if } Qref<Qm\_down)$.

Here, the gain Kvq is the same between the case where the voltage effective value Vrms of the voltage Vsg is greater than the upper end voltage V_up and the case where the voltage effective value Vrms of the voltage Vsg is smaller than the lower end voltage V_down, but may be set to different values. In addition, information about the predetermined voltage Vm, information about the gain Kvq, or the like may be separately received from the grid control unit 202, and the drooping characteristic may be set in accordance with such information.

FIG. 16B shows an example of the drooping characteristic of the reactive power drive command value Qref in the case of using proportional integral control (PI control) with respect to the voltage effective value Vrms of the voltage Vsg. An output limiter of a PI controller may be set in accordance with the output range of the reactive power command correction means 251. For example, the output limiter of the PI controller may be set in a range between the maximum output and the minimum output of the reactive power command correction means 251, or may be set so that a value obtained by adding the output of the PI controller to the predetermined reactive power Qm is within a range between the maximum output and the minimum output of the reactive power command correction means 251.

If the voltage effective value Vrms of the voltage Vsg is greater than the upper end voltage V_up, the PI controller is operated by inputting a difference between the voltage effective value Vrms of the voltage Vsg and the upper end voltage V_up to the PI controller, and a value obtained by adding the predetermined reactive power Qm to the output of the PI control is used as the reactive power drive command value Qref. At this time, if the reactive power drive command value Qref is greater than the upper limit reactive power drive command value Qm_up, the reactive power drive command value Qref is limited by the upper limit reactive power drive command value Qm_up. That is, the following is satisfied:

$Qref=Qm\_up(\text{if } Qref>Qm\_up)$.

If the voltage effective value Vrms of the voltage Vsg is smaller than the lower end voltage V_down, the PI controller is operated by inputting a difference between the voltage effective value Vrms of the detection voltage Vsg and the lower end voltage V_down to the PI controller, and a value obtained by adding the predetermined reactive power Qm to the output of the PI control is used as the reactive power drive command value Qref. At this time, if the reactive power drive command value Qref is smaller than the lower limit reactive power drive command value Qm_down, the reactive power drive command value Qref is limited by the lower limit reactive power drive command value Qm_down. That is, the following is satisfied:

$$Qref=Qm\_down \text{(if } Qref<Qm\_down).$$

Information about the predetermined voltage Vm, information about the gain and the limiter for the PI controller, or the like may be separately received from the grid control unit 202, and the drooping characteristic may be set in accordance with such information.

Figure 17A:
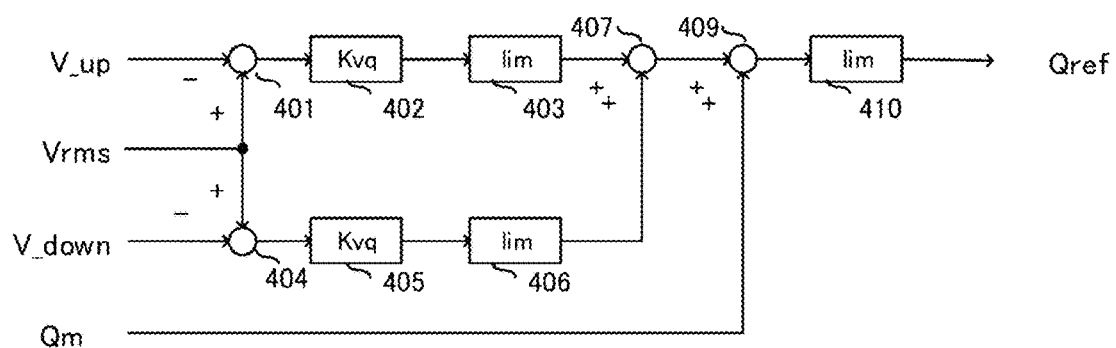
FIG. 17A is a control block diagram for realizing the drooping characteristic of the reactive power command correction means provided to the power conversion device for the power generation device in the consumer in the grid system according to embodiment 3.
Figure 17B:
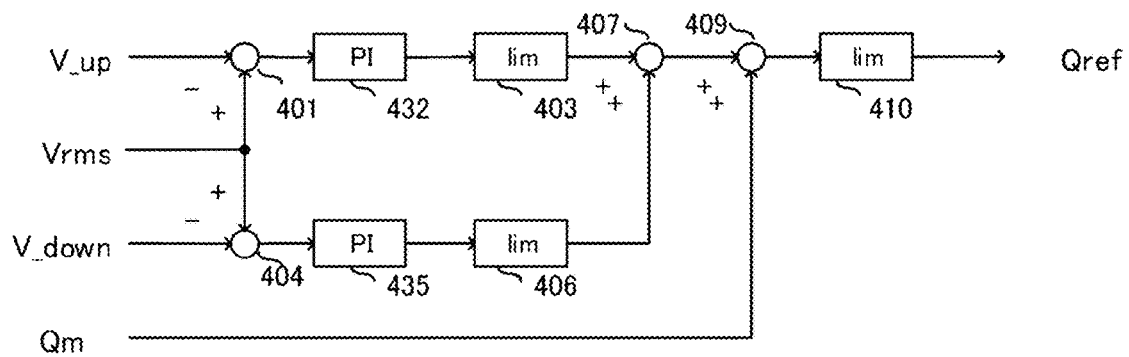
FIG. 17B is another control block diagram for realizing the drooping characteristic of the reactive power command correction means provided to the power conversion device for the power generation device in the consumer in the grid system according to embodiment 3.
Figure 17C:
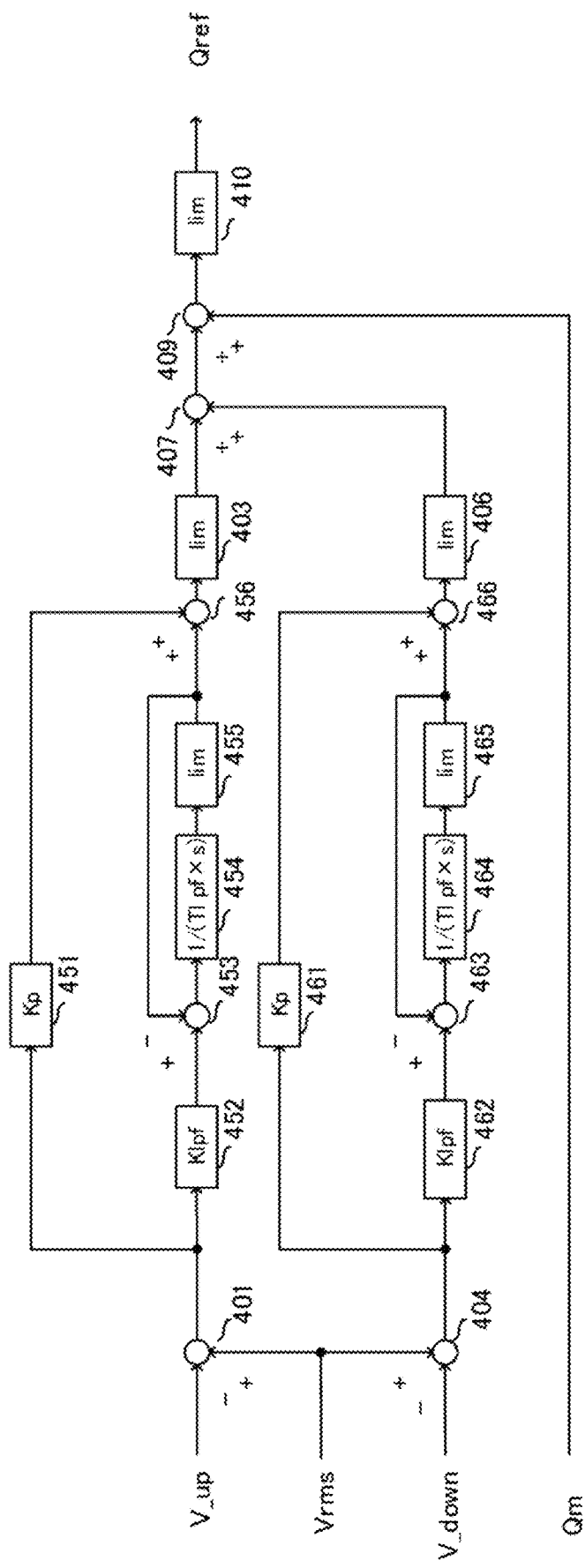
FIG. 17C is still another control block diagram for realizing the drooping characteristic of the reactive power command correction means provided to the power conversion device for the power generation device in the consumer in the grid system according to embodiment 3.

FIG. 17A, FIG. 17B, and FIG. 17C show examples of the control block diagram for realizing the drooping characteristic of the reactive power command correction means 251. FIG. 17A and FIG. 17C are examples of control block diagrams corresponding to FIG. 16A, and FIG. 17B is an example of a control block diagram corresponding to FIG. 16B.

First, FIG. 17A will be described. In the drawing, the voltage effective value Vrms and the upper end voltage V_up are inputted to a subtractor 401, and a result of subtraction is outputted as dVrmsup (dVrmsup=Vrms−V_up).

The output dVrmsup of the subtractor 401 is inputted to a gain 402, and a result of multiplying dVrmsup by the gain Kvq is outputted as kVrmsup (kVrmsup=dVrmsup×Kvq).

The output kVrmsup of the gain 402 is inputted to a limiter 403, and if kVrmsup is smaller than 0, a result of limitation by 0 is outputted as lVrmsup. That is, if kVrmsup<0 is satisfied, lVrmsup=kVrmsup=0 is outputted, and otherwise, lVrmsup=kVrmsup is outputted.

The voltage effective value Vrms and the lower end voltage V_down are inputted to a subtractor 404, and a result of subtraction is outputted as dVrmsdown (dVrmsdown=Vrms−V_down).

The output dVrmsdown of the subtractor 404 is inputted to a gain 405, and a result of multiplying dVrmsdown by the gain Kvq is outputted as kVrmsdown (kVrmsdown=dVrmsdown×Kvq).

The output kVrmsdown of the gain 405 is inputted to a limiter 406, and if kVrmsdown is greater than 0, a result of limitation by 0 is outputted as lVrmsdown. That is, if kVrmsdown>0 is satisfied, lVrmsdown=kVrmsdown=0 is outputted, and otherwise, lVrmsdown=kVrmsdown is outputted.

The output lVrmsup of the limiter 403 and the output lVrmsdown of the limiter 406 are inputted to an adder 407, and a result of addition is outputted as dQadd (dQadd=lVrmsup+lVrmsdown).

The output dQadd of the adder 407 and the predetermined reactive power Qm are inputted to an adder 409, and a result of addition is outputted as Qadd (Qadd=dQadd+Qm).

The output Qadd of the adder 409 is inputted to a limiter 410, and if Qadd is greater than the upper limit reactive power drive command value Qm_up, the reactive power drive command value Qref limited by the upper limit reactive power drive command value Qm_up is outputted. That is, if Qadd>Qm_up is satisfied, Qref=Qadd=Qm_up is outputted, and otherwise, Qref=Qadd is outputted. On the other hand, if Qadd is smaller than the lower limit reactive power drive command value Qm_down, the reactive power drive command value Qref limited by the lower limit reactive power drive command value Qm_down is outputted. That is, if Qadd<Qm_down is satisfied, Qref=Qadd=Qm_down is outputted, and otherwise, Qref=Qadd is outputted.

Next, FIG. 17B will be described. In the drawing, the voltage effective value Vrms and the upper end voltage V_up are inputted to a subtractor 401, and a result of subtraction is outputted as dVrmsup (dVrmsup=Vrms−V_up).

The output dVrmsup of the subtractor 401 is inputted to a PI controller 432, and a result of performing PI control of dVrmsup is outputted as kVrmsup (kVrmsup=dVrmsup×Kpvq+dVrmsup×Kivq/s).

The output kVrmsup of the PI controller 432 is inputted to a limiter 403, and if kVrmsup is smaller than 0, a result of limitation by 0 is outputted as lVrmsup. That is, if kVrmsup<0 is satisfied, lVrmsup=kVrmsup=0 is outputted, and otherwise, lVrmsup=kVrmsup is outputted. It is noted that the integral value of the PI controller 432 may also be limited in the same manner.

The voltage effective value Vrms and the lower end voltage V_down are inputted to a subtractor 404, and a result of subtraction is outputted as dVrmsdown (dVrmsdown=Vrms−V_down).

The output dVrmsdown of the subtractor 404 is inputted to a PI controller 435, and a result of performing PI control of dVrmsdown is outputted as kVrmsdown (kVrmsdown=dVrmsdown×Kpvq+dVrmsdown×Kivq/s).

The output kVrmsdown of the PI controller 435 is inputted to a limiter 406, and if kVrmsdown is greater than 0, a limiter result of limitation by 0 is outputted as lVrmsdown. That is, if kVrmsdown>0 is satisfied, lVrmsdown=kVrmsdown=0 is outputted, and otherwise, lVrmsdown=kVrmsdown is outputted. It is noted that the integral value of the PI controller 435 may also be limited in the same manner.

The output lVrmsup of the limiter 403 and the output lVrmsdown of the limiter 406 are inputted to an adder 407, and a result of addition is outputted as dQadd (dQadd=lVrmsup+lVrmsdown).

The output dQadd of the adder 407 and the predetermined reactive power Qm are inputted to an adder 409, and a result of addition is outputted as Qadd (Qadd=dQadd+Qm).

The output Qadd of the adder 409 is inputted to a limiter 410, and if Qadd is greater than the upper limit reactive power drive command value Qm_up, the reactive power drive command value Qref limited by the upper limit reactive power drive command value Qm_up is outputted. That is, if Qadd>Qm_up is satisfied, Qref=Qadd=Qm_up is outputted, and otherwise, Qref=Qadd is outputted. On the other hand, if Qadd is smaller than the lower limit reactive power drive command value Qm_down, the reactive power drive command value Qref limited by the lower limit reactive power drive command value Qm_down is outputted. That is, if Qadd<Qm_down is satisfied, Qref=Qadd=Qm_down is outputted, and otherwise, Qref=Qadd is outputted.

Next, FIG. 17C will be described. In the drawing, the voltage effective value Vrms and the upper end voltage V_up are inputted to a subtractor 401, and a result of subtraction is outputted as dVrmsup (dVrmsup=Vrms−V_up).

The output dVrmsup of the subtractor 401 is inputted to a gain 451, and a result of multiplying dVrmsup by a gain Kp is outputted as kVrmsup (kVrmsup=dVrmsup×Kp).

The output dVrmsup of the subtractor 401 is inputted to a gain 452, and a result of multiplying dVrmsup by a gain Klpf is outputted as kVrmsupl (kVrmsupl=dVrmsup×Klpf).

The output kVrmsupl of the gain 452 and an output lVrmsupl of a limiter 455 are inputted to a subtractor 453, and a result of subtraction is outputted as dVrmsupl (dVrmsupl=kVrmsupl−lVrmsupl).

The output dVrmsupl of the subtractor 453 is inputted to an integrator 454, and an integration result of integrating dVrmsupl by a time constant Tlpf is outputted as sVrmsupl (sVrmsupl=(1/Tlpf)×∫dVrmsupl·dt).

The output sVrmsupl of the integrator 454 is inputted to the limiter 455, and if sVrmsupl is smaller than 0, a result of limitation by 0 is outputted as lVrmsupl. That is, if sVrmsupl<0 is satisfied, lVrmsupl=sVrmsupl=0 is outputted, and otherwise, lVrmsupl=sVrmsupl is outputted.

The output kVrmsup of the gain 451 and the output lVrmsupl of the limiter 455 are inputted to an adder 456, and a result of addition is outputted as aVrmsup (aVrmsup=kVrmsup+lVrmsupl).

The output aVrmsup of the adder 456 is inputted to a limiter 403, and if aVrmsup is smaller than 0, a result of limitation by 0 is outputted as lVrmsup. That is, if aVrmsup<0 is satisfied, lVrmsup=aVrmsup=0 is outputted, and otherwise, lVrmsup=aVrmsup is outputted.

The voltage effective value Vrms and the lower end voltage V_down are inputted to a subtractor 404, and a result of subtraction is outputted as dVrmsdown (dVrmsdown=Vrms−V_down).

The output dVrmsdown of the subtractor 404 is inputted to a gain 461, and a result of multiplying dVrmsdown by the gain Kp is outputted as kVrmsdown (kVrmsdown=dVrmsdown×Kp).

The output dVrmsdown of the subtractor 404 is inputted to a gain 462, and a result of multiplying dVrmsdown by the gain Klpf is outputted as kVrmsdownl (kVrmsdownl=dVrmsdown×Klpf).

The output kVrmsdownl of the gain 462 and an output lVrmsdownl of a limiter 465 are inputted to a subtractor 463, and a result of subtraction is outputted as dVrmsdownl (dVrmsdownl=kVrmsdownl−lVrmsdownl).

The output dVrmsdownl of the subtractor 463 is inputted to an integrator 464, and an integration result of integrating dVrmsdownl by the time constant Tlpf is outputted as sVrmsdownl (sVrmsdownl=(1/Tlpf)×∫dVrmsdownl·dt).

The output sVrmsdownl of the integrator 464 is inputted to the limiter 465, and if sVrmsdownl is greater than 0, a result of limitation by 0 is outputted as lVrmsdownl. That is, if sVrmsdownl>0 is satisfied, lVrmsdownl=sVrmsdownl=0 is outputted, and otherwise, lVrmsdownl=sVrmsdownl is outputted.

The output kVrmsdown of the gain 461 and the output lVrmsdownl of the limiter 465 are inputted to an adder 466, and a result of addition is outputted as aVrmsdown (aVrmsdown=kVrmsdown+lVrmsdownl).

The output aVrmsdown of the adder 466 is inputted to a limiter 406, and if aVrmsdown is greater than 0, a result of limitation by 0 is outputted as lVrmsdown. That is, if aVrmsdown>0 is satisfied, lVrmsdown=aVrmsdown=0 is outputted, and otherwise, lVrmsdown=aVrmsdown is outputted.

The output lVrmsup of the limiter 403 and the output lVrmsdown of the limiter 406 are inputted to an adder 407, and a result of addition is outputted as dQadd (dQadd=lVrmsup+lVrmsdown).

The output dQadd of the adder 407 and the predetermined reactive power Qm are inputted to an adder 409, and a result of addition is outputted as Qadd (Qadd=dQadd+Qm).

The output Qadd of the adder 409 is inputted to a limiter 410, and if Qadd is greater than the upper limit reactive power drive command value Qm_up, the reactive power drive command value Qref limited by the upper limit reactive power drive command value Qm_up is outputted. That is, if Qadd>Qm_up is satisfied, Qref=Qadd=Qm_up is outputted, and otherwise, Qref=Qadd is outputted. On the other hand, if Qadd is smaller than the lower limit reactive power drive command value Qm_down, the reactive power drive command value Qref limited by the lower limit reactive power drive command value Qm_down is outputted. That is, if Qadd<Qm_down is satisfied, Qref=Qadd=Qm_down is outputted, and otherwise, Qref=Qadd is outputted.

Next, the power conversion device 212 will be described. The power conversion device 212 includes a power converter 221, voltage detection means 222, and a control unit 223. The power conversion device 212 is connected between the power storage device 15 and the detection unit 13, and converts DC voltage of the power storage device 15 to AC voltage for the distribution grid. Regarding the output power of the power conversion device 212, although the details are omitted here because description has been given in embodiment 1, the output power is basically adjusted so that the flow active power Ps becomes equal to the power command value Pext from the grid control unit 2. If the frequency fs changes from a predetermined frequency, the power command value Pext from the grid control unit 202 is corrected and thus the output power is adjusted so that the corrected power command value and the flow active power coincide with each other. Further, the power conversion device 212 includes reactive power command correction means 231 which, when the voltage of the consumer (voltage at an end of the power converter 221) increases to be greater than the third predetermined voltage or decreases to be smaller than the fourth predetermined voltage, outputs reactive power in accordance with the increase or decrease of the voltage of the consumer. In addition, the power conversion device 212 can output reactive power in a state in which the power storage device 15 is fully-charged or over-discharged or is not connected, and thus it is possible to adjust reactive power irrespective of the power storage device 15 of the consumer 30.

The power converter 221 includes a switching element, a driving circuit for the switching element, a capacitor for stabilizing output voltage of the power storage device 15, and the like, and is configured as a full-bridge or half-bridge inverter circuit or the like, for example. The driving circuit switches the switching element in accordance with a drive command and a reactive power drive command from the control unit 223, and converts DC voltage of the power storage device 15 to AC voltage for the distribution grid so as to have predetermined voltage. The output power of the power converter 221 is controlled so as to coincide with the drive command and the reactive power drive command from the control unit 223, within a range not exceeding the apparent power of the power converter 221. Specifically, the power converter 221 receives the drive command and the reactive power drive command from the control unit 223, and outputs the output power so as to coincide with the drive command and the reactive power drive command if the vector sum of the drive command and the reactive power drive command is not greater than the apparent power that the power converter 221 can output. If the vector sum of the drive command and the reactive power drive command is greater than the apparent power that the power converter 221 can output, the drive command or the reactive power drive command is limited or both of the drive command and the reactive power drive command are limited, and the power converter 221 outputs the output power within a range not exceeding the apparent power of the power converter 221. For the limitation of the commands, for example, the drive command and the reactive power drive command may be limited by a certain rate, or may be limited in accordance with a lower limit power factor of the power converter 221.

The voltage detection means 222 is connected between the power converter 221 and the detection unit 13, and detects output voltage Vsb of the power converter 221 as the voltage of the consumer.

The control unit 223 includes power command correction means 31, flow power control means 32, and reactive power command correction means 231.

The reactive power command correction means 231 receives the voltage Vsb and the voltage adjustment width Vext from the grid control unit 202, and outputs a reactive power drive command value Qref. A method for determining the reactive power drive command is as follows. If the voltage effective value of the detected voltage Vsb is in a voltage effective value range (e.g., range of Vm−Vext to Vm+Vext) determined by the voltage adjustment width Vext from the grid control unit 202 and a predetermined voltage effective value Vm, a predetermined reactive power command value Qm is outputted as the reactive power drive command value Qref, and if the voltage effective value of the voltage Vsb changes from the voltage effective value range determined by the voltage adjustment width Vext from the grid control unit 202 and the predetermined voltage effective value Vm, a value obtained by adding a value based on the voltage change to the predetermined reactive power command value Qm is outputted as the reactive power drive command value Qref.

Specifically, a difference of the voltage effective value of the voltage Vsb from the voltage effective value range determined by the voltage adjustment width Vext from the grid control unit 202 and the predetermined voltage effective value Vm is multiplied by a gain Kvq, and a value obtained by adding the multiplication result to the predetermined reactive power command value Qm is the reactive power drive command value Qref, which has a drooping characteristic. The drooping characteristic may be imparted with a dead band so that the reactive power command value is not corrected when change in the voltage effective value of the voltage Vsb is small.

A difference between the reactive power command correction means 251 provided to the control unit 244 of the power conversion device 211, and the reactive power command correction means 231, is whether or not the correction voltage dV is included as a setting value for the upper end voltage V_up and the lower end voltage V_down. Therefore, examples of the drooping characteristic of the reactive power command correction means 231 will be described with reference to FIG. 16 (FIG. 16A, FIG. 16B) used in the description for the reactive power command correction means 251.

With reference to FIG. 16A and FIG. 16B, the drooping characteristic having a dead band in the reactive power command correction means 231 will be described. The upper end voltage V_up of the dead band is, for example, a value obtained by adding the voltage adjustment width Vext to the predetermined voltage Vm (V_up=Vm+Vext, corresponding to the third predetermined voltage), and the lower end voltage V_down is, for example, a value obtained by subtracting the voltage adjustment width Vext from the predetermined voltage Vm (V_down=Vm−Vext, corresponding to the fourth predetermined voltage). The predetermined voltage Vm may be set with reference to reference voltage in interconnection regulations (for example, 202 Vrms). The predetermined reactive power Qm may be 0 Var, or although not specifically described in the present embodiment, if a reactive power command is transmitted from the grid control unit 202, the reactive power command from the grid control unit 202 may be used as the predetermined reactive power Qm. The range of the voltage effective value Vrms of the voltage Vsb from the lower end voltage V_down to the upper end voltage V_up is set as a dead band, and in this range, the predetermined reactive power Qm is outputted as the reactive power drive command value Qref. In addition, Qm_up denotes an upper limit reactive power drive command value and Qm_down denotes a lower limit reactive power drive command value, and these may be set as appropriate with reference to the rated power of the power converter 221 or the like.

FIG. 16A shows an example of the drooping characteristic of the reactive power drive command value Qref in the case of using proportional control (P control) with respect to the voltage effective value Vrms of the voltage Vsb. If the voltage effective value Vrms of the voltage Vsb is greater than the upper end voltage V_up, a value obtained by adding a product of the gain Kvq and a difference between the voltage effective value Vrms of the voltage Vsb and the upper end voltage V_up, to the predetermined reactive power Qm, is used as the reactive power drive command value Qref. That is, the following is satisfied:

$$Qref=Qm+Kvq(Vrms-V\_up).$$

At this time, if the reactive power drive command value Qref is greater than the upper limit reactive power drive command value Qm_up, the reactive power drive command value Qref is limited by the upper limit reactive power drive command value Qm_up. That is, the following is satisfied:

$$Qref=Qm\_up (if\ Qref>Qm\_up).$$

If the voltage effective value Vrms of the voltage Vsb is smaller than the lower end voltage V_down, a value obtained by adding a product of the gain Kvq and a difference between the voltage effective value Vrms of the voltage Vsb and the lower end voltage V_down, to the predetermined reactive power Qm, is used as the reactive power drive command value Qref. That is, the following is satisfied:

$$Qref=Qm+Kvq(Vrms-V\_down).$$

At this time, if the reactive power drive command value Qref is smaller than the lower limit reactive power drive command value Qm_down, the reactive power drive command value Qref is limited by the lower limit reactive power drive command value Qm_down. That is, the following is satisfied:

$$Qref=Qm\_down (if\ Qref<Qm\_down).$$

Here, the gain Kvq is the same between the case where the voltage effective value Vrms of the detected voltage Vsb is greater than the upper end voltage V_up and the case where the voltage effective value Vrms of the detected voltage Vsb is smaller than the lower end voltage V_down, but may be set to different values. In addition, information about the predetermined voltage Vm, information about the gain Kvq, or the like may be separately received from the grid control unit 202, and the drooping characteristic may be set in accordance with such information.

FIG. 16B shows an example of the drooping characteristic of the reactive power drive command value Qref in the case of using proportional integral control (PI control) with respect to the voltage effective value Vrms of the voltage Vsb. An output limiter of a PI controller may be set in accordance with the output range of the reactive power command correction means 231. For example, the output limiter of the PI controller may be set in a range between the maximum output and the minimum output of the reactive power command correction means 231, or may be set so that a value obtained by adding the output of the PI controller to the predetermined reactive power Qm is within a range between the maximum output and the minimum output of the reactive power command correction means 231.

If the voltage effective value Vrms of the voltage Vsb is greater than the upper end voltage V_up, the PI controller is operated by inputting a difference between the voltage effective value Vrms of the voltage Vsb and the upper end voltage V_up to the PI controller, and a value obtained by adding the predetermined reactive power Qm to the output of the PI control is used as the reactive power drive command value Qref. At this time, if the reactive power drive command value Qref is greater than the upper limit reactive power drive command value Qm_up, the reactive power drive command value Qref is limited by the upper limit reactive power drive command value Qm_up. That is, the following is satisfied:

$$Qref=Qm\_up(\text{if } Qref>Qm\_up).$$

If the voltage effective value Vrms of the voltage Vsb is smaller than the lower end voltage V_down, the PI controller is operated by inputting a difference between the voltage effective value Vrms of the voltage Vsb and the lower end voltage V_down to the PI controller, and a value obtained by adding the predetermined reactive power Qm to the output of the PI control is used as the reactive power drive command value Qref. At this time, if the reactive power drive command value Qref is smaller than the lower limit reactive power drive command value Qm_down, the reactive power drive command value Qref is limited by the lower limit reactive power drive command value Qm_down. That is, the following is satisfied:

$$Qref=Qm\_down(\text{if } Qref<Qm\_down).$$

Information about the predetermined voltage Vm, information about the gain and the limiter for the PI controller, or the like may be separately received from the grid control unit 202, and the drooping characteristic may be set in accordance with such information.

In the above description, the voltage dead band width in the reactive power command correction means 251 is set to be greater by the correction voltage dV than the voltage dead band width in the reactive power command correction means 231. However, instead of this setting, the voltage dead band width in the reactive power command correction means 231 may be set to be smaller by the correction voltage dV than the voltage dead band width of the reactive power command correction means 251. Alternatively, the above settings may be combined such that, for example, the voltage dead band width in the reactive power command correction means 251 is increased by a part of the correction voltage dV and the voltage dead band width in the reactive power command correction means 231 is decreased by the rest of the correction voltage dV.

As described above, by setting the correction voltage dV for the reactive power command correction means 231 and the reactive power command correction means 251, the power conversion device 212 connected to the power storage device 15 preferentially performs reactive power output with respect to consumer voltage variation, so that reactive power borne by the power conversion device 211 connected to the power generation device 14 is reduced. Thus, reduction in the generated power for outputting reactive power is decreased, so that the generated power can be effectively used.

Hereinafter, a specific example for suppressing power variation in the grid system according to embodiment 3 will be described with reference to FIG. 18 corresponding to the case where the number of the consumers 30 in FIG. 12 is one. It is noted that the consumer 30 in FIG. 18 has the configuration shown in FIG. 15, and operations relevant to active power and frequency have been described in embodiment 2. Therefore, description regarding reactive power and voltage will be given below. The drooping characteristic of the amplitude command correction means 214 is the one shown in FIG. 13B, and the drooping characteristic of the reactive power command correction means 231, 251 is the one shown in FIG. 16A.

Figure 18:
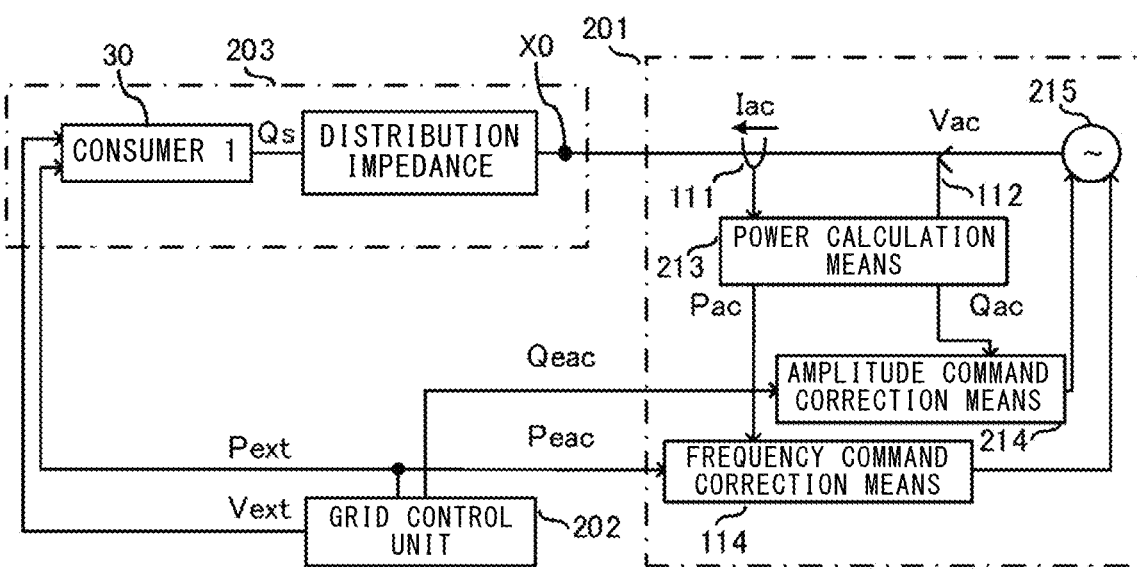
FIG. 18 is a configuration diagram showing the entirety of the grid system according to embodiment 3 in the case where the number of consumers is one.

In FIG. 18, Qs denotes flow reactive power from the consumer 30, Qac denotes reactive power of the voltage source device 201, and Vext denotes the voltage adjustment width from the grid control unit 202 to the consumer 30.

The flow reactive power Qs of the consumer 30 is determined by output reactive power Qgac of the power conversion device 211, output reactive power Qbac of the power conversion device 212, and consumed reactive power Qload of the load 16. Specifically, Qs=Qgac+Qbac−Qload is satisfied.

Figure 19A:
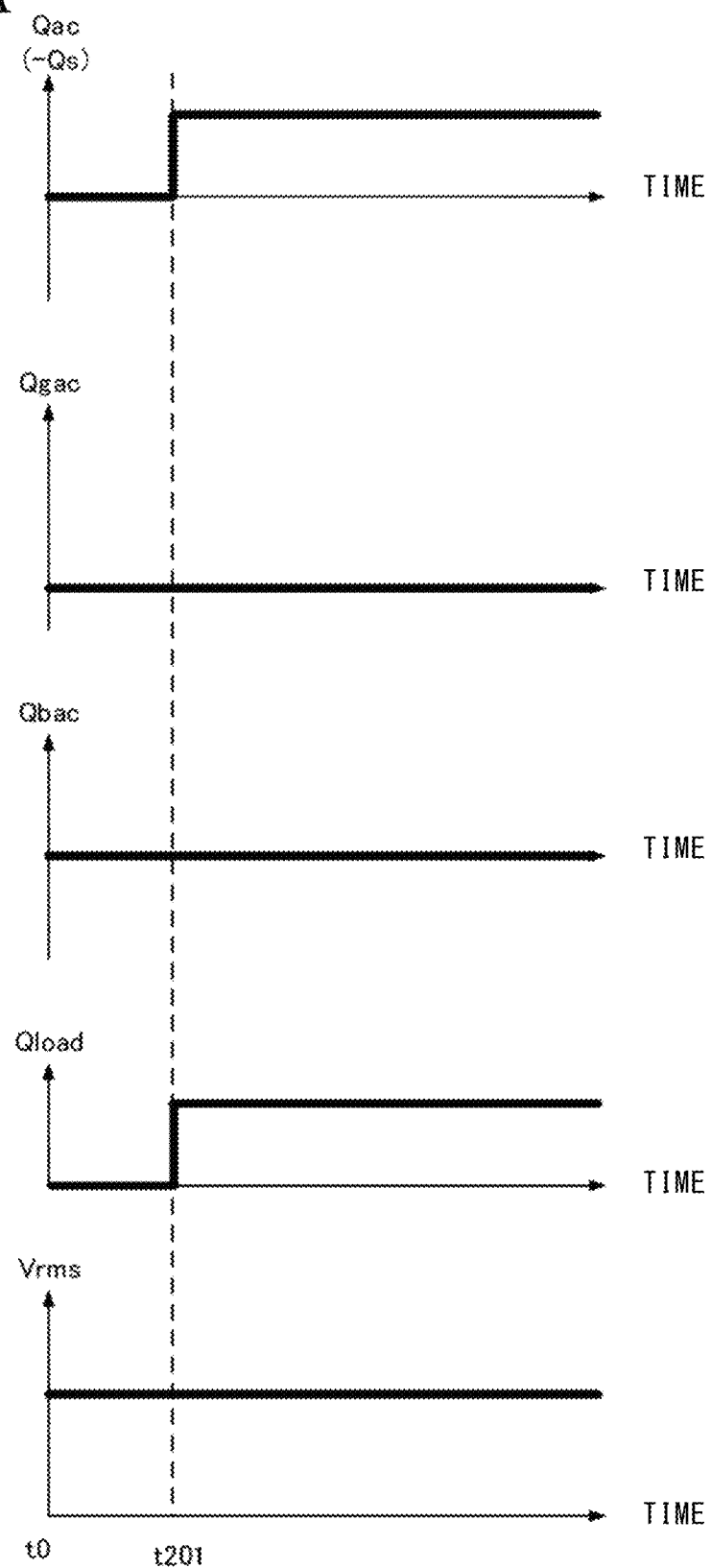
FIG. 19A is an operation timing chart for explaining suppression of power variation in the grid system according to embodiment 3.
Figure 19B:
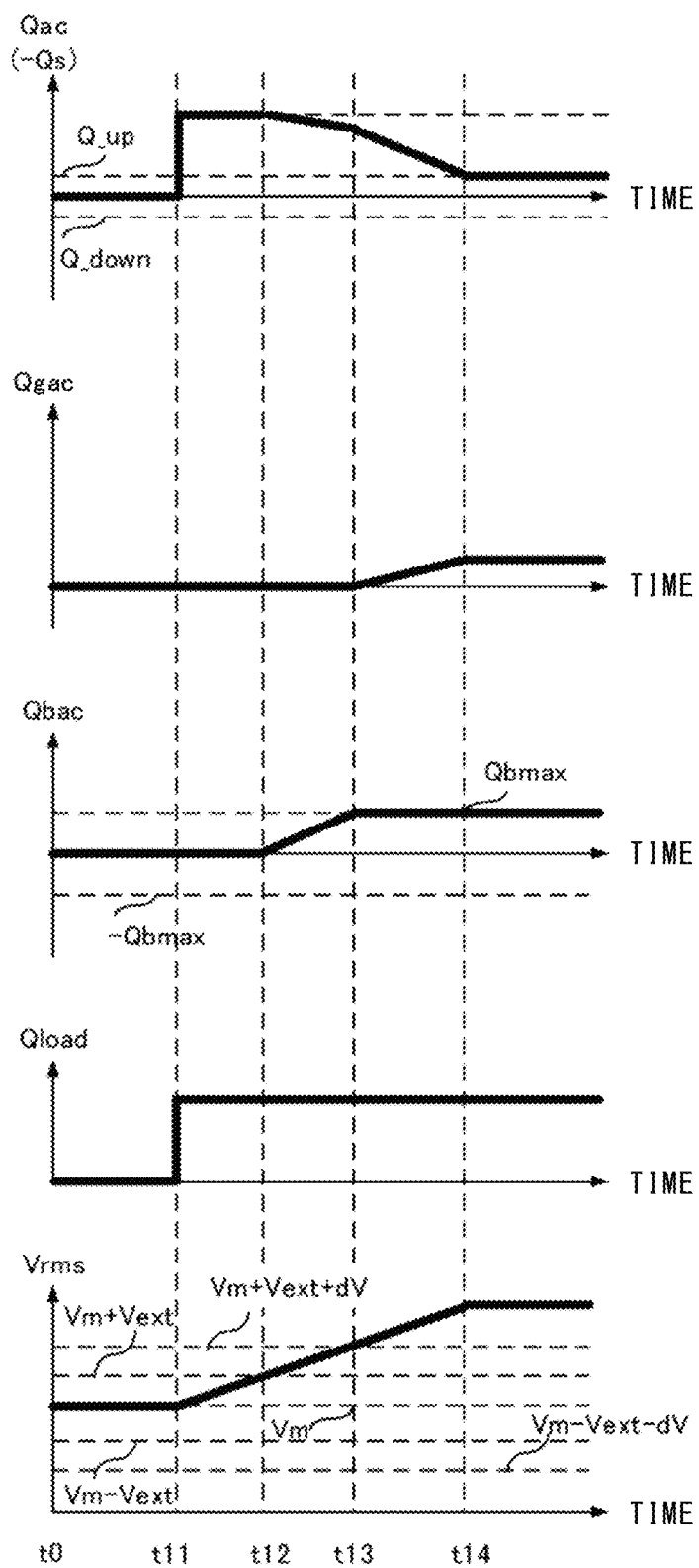
FIG. 19B is an operation timing chart for explaining suppression of power variation in the grid system according to embodiment 3.

FIG. 19A and FIG. 19B are timing charts of powers Qac (−Qs), Qgac, Qbac, Qload and the voltage effective value Vrms in the grid system shown in FIG. 18, and show the case where the consumed reactive power of the load 16 increases. FIG. 19A shows a conventional example for comparison, and FIG. 19B shows an example in which the configuration of the present embodiment described above is applied.

FIG. 19A and FIG. 19B show timing charts of, from the upper stage, flow reactive power Qs of the consumer 30, output reactive power Qgac of the power conversion device 211 on the side connected with the detection unit 13, the output reactive power Qbac of the power conversion device 212 on the side connected with the detection unit 13, consumed reactive power Qload of the load, and the voltage effective value Vrms detected by the voltage detection means 222, 242. In the drawings, Qbmax denotes the maximum output reactive power of the power conversion device 212, Q_up denotes the upper end reactive power of the drooping characteristic of the amplitude command correction means 214, Q_down denotes the lower end reactive power of the drooping characteristic of the amplitude command correction means 214, Vext denotes the voltage adjustment width from the grid control unit 202, Vm denotes the predetermined voltage effective value, and dV denotes the correction voltage value.

First, FIG. 19A for the conventional configuration will be described. In the conventional configuration, a grid system does not have the amplitude command correction means 214 and the reactive power command correction means 231, 251 and thus does not have a function of adjusting the reactive power.

Before time t201, there is no consumed reactive power in the load 16, and the reactive power Qac of the voltage source device 201 is 0.

At time t201, the consumed reactive power Qload of the load 16 increases, so that the reactive power Qac of the voltage source device 201 increases. Since the voltage source device 201 does not have an operation function for the reactive power Qac, the consumed reactive power Qload of the load 16 of the consumer is all borne by the voltage source device 201.

Next, with reference to FIG. 19B, the case of applying the configuration of the present embodiment described above will be described.

Before time t11, there is no consumed reactive power in the load 16, and the reactive power Qac of the voltage source device 201 is 0.

At time t11, the consumed reactive power Qload of the load 16 increases, so that the reactive power Qac of the voltage source device 201 increases. Thus, the amplitude command correction means 214 increases the voltage effective value Vrms in accordance with the reactive power Qac.

At time t12, the voltage effective value Vrms becomes greater than Vm+Vext corresponding to the upper end voltage V_up of the reactive power command correction means 231 of the power conversion device 212 which converts power of the power storage device 15. Thus, the reactive power command correction means 231 outputs the reactive power drive command value Qref in accordance with the voltage effective value Vrms, and the reactive power Qbac is outputted from the power conversion device 212. As a result, the magnitude of the reactive power Qac borne by the voltage source device 201 is reduced.

At time t13, the voltage effective value Vrms becomes greater than Vm+Vext+dV corresponding to the upper end voltage V_up of the reactive power command correction means 251 of the power conversion device 211 which converts power of the power generation device 14. Thus, the reactive power command correction means 251 outputs the reactive power drive command value Qref in accordance with the voltage effective value Vrms, and the reactive power Qgac is outputted from the power conversion device 211. As a result, the magnitude of the reactive power Qac borne by the voltage source device 201 is further reduced.

At time t14, the reactive power Qac borne by the voltage source device 201 coincides with the upper end reactive power Q_up of the amplitude command correction means 214, and increase of the voltage effective value Vrms is stopped.

As described above, in addition to the effects of embodiments 1 and 2, the following effects are provided. That is, in the present embodiment 3, the power conversion device 211 is provided with the reactive power command correction means 231, the power conversion device 212 is provided with the reactive power command correction means 251, and control is performed so as to prioritize reactive power output operation of the power storage device 15. Thus, the reactive power output of the power generation device 14 can be reduced, and therefore an effect of enabling output operation for the generated power of the power generation device 14 to be prioritized is provided. In addition, an effect of further reducing the reactive power borne by the voltage source device 201 is also provided.

Further, the voltage source device 201 is provided with the amplitude command correction means 214. Therefore, in the case where the voltage of the consumer increases or decreases from predetermined voltage due to voltage drop based on the distribution impedance and the flow power of the consumer 30, reactive power is outputted from the consumer 30 and the voltage source device 201 adjusts the voltage effective value in accordance with the reactive power from the consumer 30, whereby consumer voltage variation can be made close to the predetermined voltage.

In the grid system in which a plurality of consumers 30 are connected, if the reactive power command correction means 231, 251 have such a drooping characteristic having an integral element as shown in FIG. 16B, the reactive power allocations to be borne can be uneven due to difference in distribution impedance or flow power among the consumers 30. In this case, operation may be performed such that a current effective value Isrms (corresponding to flow current) of the current detection means 62 or active current and reactive current with a grid voltage phase as a reference are detected and inputted to the reactive power command correction means 231, 251 to adjust V_up and V_down for operation of the drooping characteristic. Specifically, in the case of using the current effective value Isrms, the reactive power command correction means 231 may be set as V_up=Vm+Vext+k×Isrms and V_down=Vm−Vext−k×Isrms, and the reactive power command correction means 251 may be set as V_up=Vm+Vext+dV+k×Isrms and V_down=Vm−Vext−dV−k×Isrms. At this time, the above gain k may be set for each power conversion device, or may be transmitted from the grid control unit. As described above, the reactive power command correction means 231, 251 may adjust operation voltage (corresponding to V_up, V_down) in accordance with the flow current of the consumer 30.

Embodiment 4

Hereinafter, a grid system according to embodiment 4 will be described with reference to the drawings.

Figure 20:
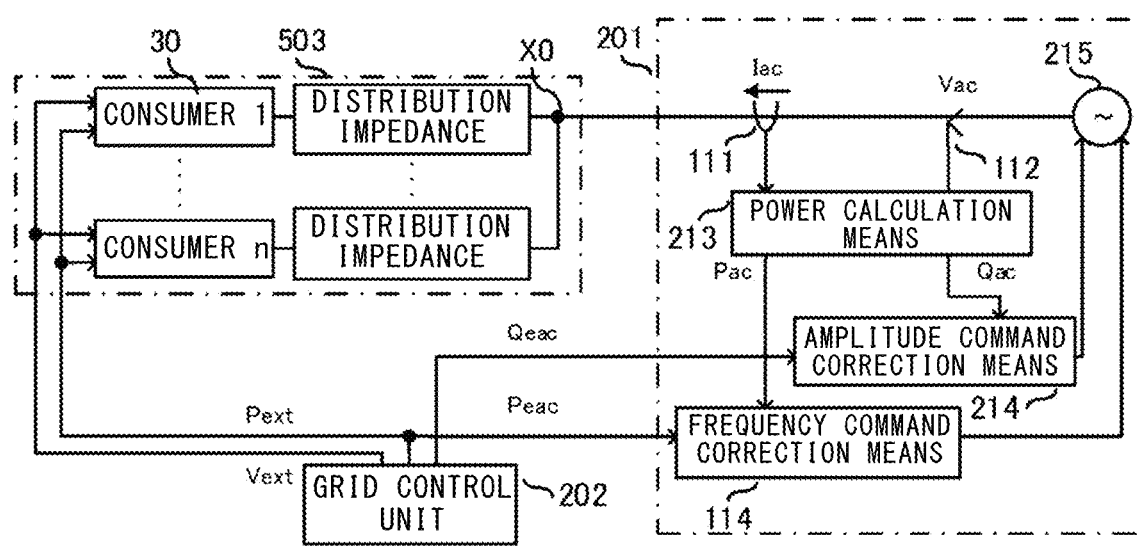
FIG. 20 is a configuration diagram showing the entirety of a grid system according to embodiment 4.

FIG. 20 is a configuration diagram showing the entirety of the grid system according to embodiment 4. In the drawing, the grid system includes the voltage source device 201 for outputting voltage to the grid, the grid control unit 202 for transmitting a power command to each consumer 30 composing a consumer group 503, and the consumer group 503. The voltage source device 201 and devices provided to each consumer 30 are connected via distribution impedances (corresponding to impedances of the distribution grid). In the following description, parts having the same functions as those in the above embodiments 1 to 3 are denoted by the same reference characters, and the detailed description thereof is omitted.

Figure 21:
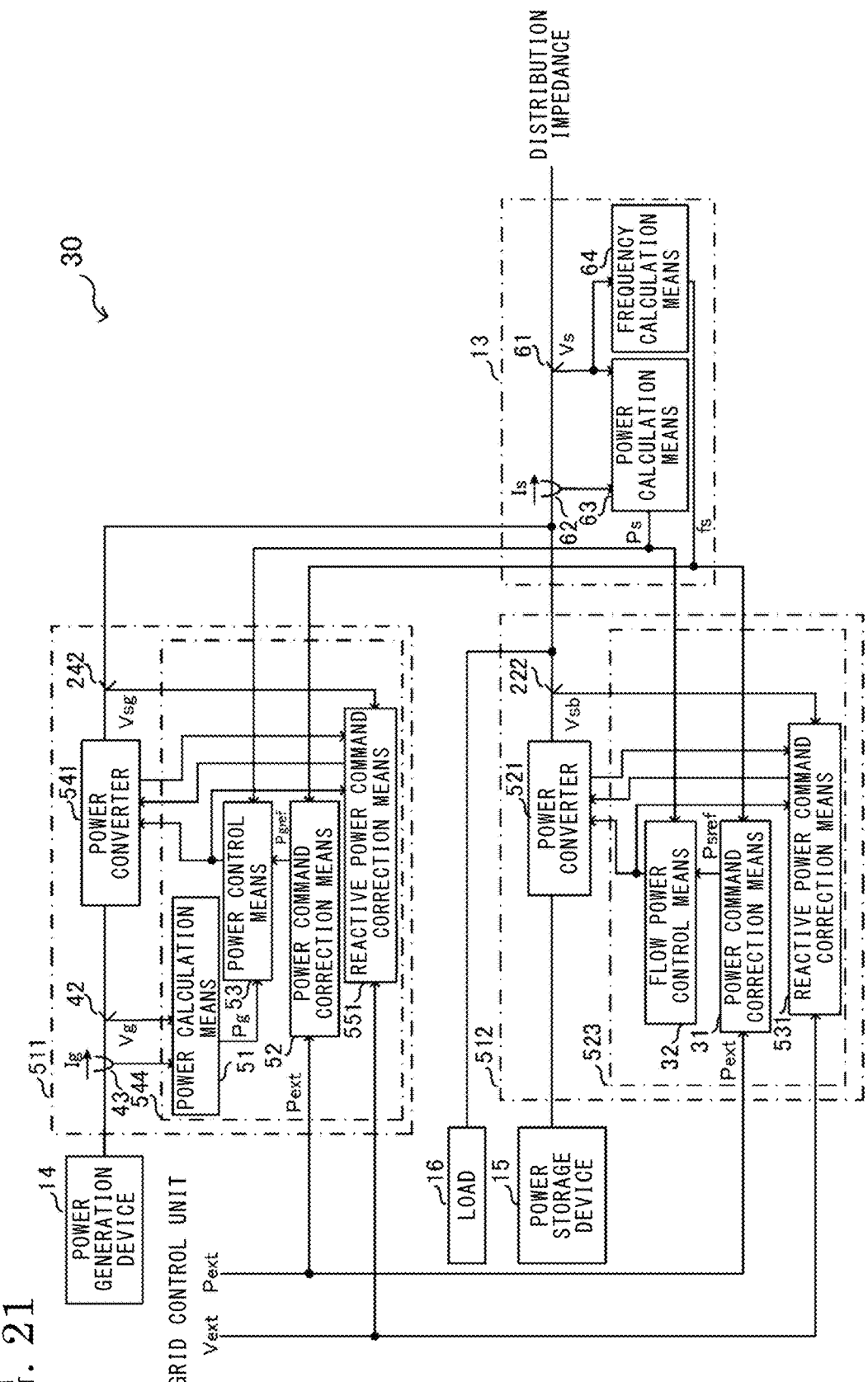
FIG. 21 is a schematic wiring diagram in a consumer having a power generation device and a power storage device in the grid system according to embodiment 4.

FIG. 21 is a schematic wiring diagram in the consumer 30 having a power generation device and a power storage device, of the consumer group 503 in the grid system shown in FIG. 20. In the drawing, the consumer 30 includes the detection unit 13, the power generation device 14, the power storage device 15, the load 16, a power conversion device 511 for converting power of the power generation device 14, and a power conversion device 512 for converting power of the power storage device 15.

The power conversion device 511 includes a power converter 541, voltage detection means 42, 242, and current detection means 43, and a control unit 544. The power conversion device 511 is connected between the power generation device 14 and the detection unit 13, and converts DC voltage of the power generation device 14 to AC voltage for the distribution grid. Regarding the output power of the power conversion device 511, although the details are omitted here because description has been given in embodiment 1, the output power is basically adjusted so that the generated power of the power generation device 14 is maximized. However, if the flow active power Ps is greater than the power command value determined by the power command value Pext from the grid control unit 202 and the frequency fs, operation of reducing output power of the power conversion device 511 is performed. In addition, the power conversion device 511 includes reactive power command correction means 551 which, when the voltage of the consumer (voltage at an end of the power converter 541) increases to be greater than first predetermined voltage or decreases to be smaller than second predetermined voltage, outputs reactive power in accordance with the increase or decrease of the voltage of the consumer. In addition, the power conversion device 511 can output reactive power in a state in which the power generation device 14 is not generating power.

The power converter 541 has, in addition to the functions described in embodiment 3, a function of transmitting, to the control unit 544, output active power Pout and output reactive power Qout that the power converter 541 is outputting, or a function of transmitting, to the control unit 544, output active current Ipout and output reactive current Iqout that the power converter 541 is outputting.

In the case of transmitting the output active power Pout and the output reactive power Qout to the control unit 544, the output active power Pout and the output reactive power Qout may be power information measured in the power converter 541, or may be an active power command and a reactive power command after the drive command and the reactive power drive command transmitted from the control unit 544 are limited by the apparent power of the power converter 541 or the like, for example.

In the case of transmitting the output active current Ipout and the output reactive current Iqout to the control unit 544, the output active current Ipout and the output reactive current Iqout may be current information measured by the power converter 541, or may be an active current command value and a reactive current command value obtained by limiting the drive command and the reactive power drive command transmitted from the control unit 544 by the apparent power of the power converter 541 or the like and then dividing them by the grid voltage or the like so as to be converted to current command values, for example.

The control unit 544 includes the power calculation means 51, the power command correction means 52, the power control means 53, and the reactive power command correction means 551.

The reactive power command correction means 551 receives the voltage Vsg, the voltage adjustment width Vext from the grid control unit 202, the output active power Pout and the output reactive power Qout or the output active current Ipout and the output reactive current Iqout from the power converter 541, and the drive command value Pref, and outputs a reactive power drive command value Qref.

The reactive power command correction means 551 has, in addition to the functions described in embodiment 3, a function of adjusting the upper end voltage V_up of the dead band and the lower end voltage V_down of the dead band in accordance with the output active power Pout and the output reactive power Qout, the output active current Ipout and the output reactive current Iqout, or the drive command value Pref and the reactive power drive command value Qref, and a function of generating the predetermined voltage effective value Vm.

Figure 22A:
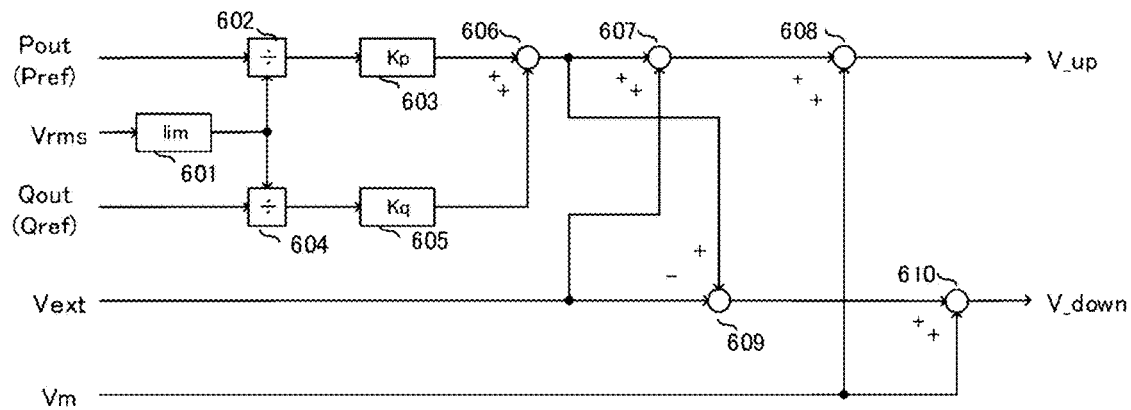
FIG. 22A is a control block diagram of reactive power command correction means provided to a power conversion device for the power generation device in the consumer in the grid system according to embodiment 4.
Figure 22B:
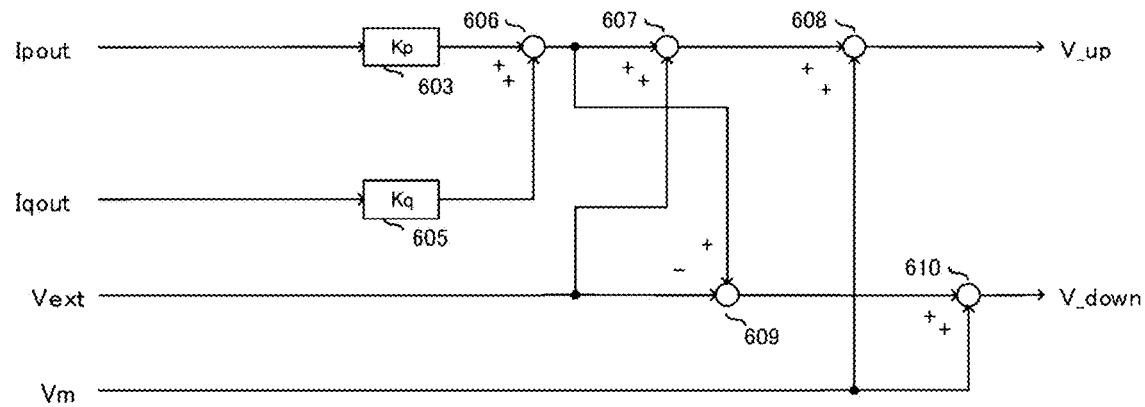
FIG. 22B is a control block diagram of the reactive power command correction means provided to the power conversion device for the power generation device in the consumer in the grid system according to embodiment 4.

FIG. 22A and FIG. 22B show control block diagrams for generating the upper end voltage and the lower end voltage of the dead band in the reactive power command correction means 551. These correspond to the examples of generating the upper end voltage V_up and the lower end voltage V_down of the dead band of the drooping characteristics shown in FIG. 16A and FIG. 16B in the above embodiment 3.

FIG. 22A shows an example of adjusting the upper end voltage V_up of the dead band and the lower end voltage V_down of the dead band in accordance with the output active power Pout and the output reactive power Qout or the drive command value Pref and the reactive power drive command value Qref.

In the drawing, the voltage effective value Vrms is inputted to a limiter 601, and a limiter result of limitation within a predetermined voltage range is outputted as lVrms. The predetermined voltage range is for limiting the upper end voltage V_up of the dead band and the lower end voltage V_down of the dead band so as not to be abnormal values when the voltage effective value Vrms is an abnormal value. An example of the predetermined voltage range is a normal voltage range prescribed in grid interconnection regulations or the like.

The output lVrms of the limiter 601 and the output active power Pout are inputted to a divider 602, and a division result of dividing the output active power Pout by lVrms is outputted as dIp (dIp=Pout/lVrms). Alternatively, the output lVrms of the limiter 601 and the drive command value Pref are inputted to the divider 602, and a division result of dividing the drive command value Pref by lVrms is outputted as dIp (dIp=Pref/lVrms).

The output dIp of the divider 602 is inputted to a gain 603, and a result of multiplying dIp by a gain Kp is outputted as kVp (kVp=dIp×Kp).

The output lVrms of the limiter 601 and the output reactive power Qout are inputted to a divider 604, and a result of dividing the output reactive power Qout by lVrms is outputted as dIq (dIq=Qout/lVrms). Alternatively, the output lVrms of the limiter 601 and the reactive power drive command value Qref are inputted to the divider 604, and a division result of dividing the reactive power drive command value Qref by lVrms is outputted as dIq (dIq=Qref/lVrms).

The output dIq of the divider 604 is inputted to a gain 605, and a result of multiplying the input by a gain Kq is outputted as kVq (kVq=dIq×Kq).

The output kVp of the gain 603 and the output kVq of the gain 605 are inputted to an adder 606, and a result of addition is outputted as aVz (aVz=kVp+kVq).

The output aVz of the adder 606 and the voltage adjustment width Vext from the grid control unit 202 are inputted to an adder 607, and a result of addition is outputted as aVze (aVze=aVz+Vext).

The output aVze of the adder 607 and the predetermined voltage effective value Vm are inputted to an adder 608, and a result of addition is outputted as V_up (V_up=aVze+Vm).

The output aVz of the adder 606 and the voltage adjustment width Vext from the grid control unit 202 are inputted to a subtractor 609, and a result of subtraction is outputted as mVze (mVze=aVz−Vext).

The output mVze of the subtractor 609 and the predetermined voltage effective value Vm are inputted to an adder 610, and a result of addition is outputted as V_down (V_down=mVze+Vm).

FIG. 22B shows an example of adjusting the upper end voltage V_up of the dead band and the lower end voltage V_down of the dead band in accordance with the output active current Ipout and the output reactive current Iqout.

The configuration in FIG. 22B includes gains 603, 605, adders 606, 608, 610, and a subtractor 609. The detailed operation is the same as the operation subsequent to the dividers 602, 604 in FIG. 22A, which can be replaced by inputting Ipout instead of dIp to the gain 603 and inputting Iqout instead of dIq to the gain 605. Therefore, the description thereof is omitted.

Figure 23:
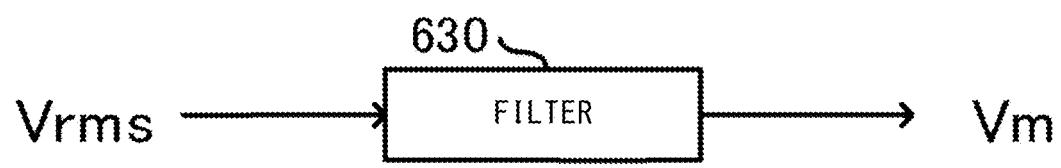
FIG. 23 is a configuration diagram for adjusting the effective value of voltage in the grid system according to embodiment 4.

FIG. 23 shows a configuration for adjusting the predetermined voltage effective value Vm in accordance with the voltage effective value Vrms. In the drawing, a filter 630 receives the voltage effective value Vrms and outputs the predetermined voltage effective value Vm. Regarding the characteristic of the filter, in the case of desiring to suppress sharp voltage variation of the voltage effective value Vrms, moving average may be used, or a low-pass filter may be used so as to allow only mild voltage variation of the voltage effective value Vrms to pass. Specifically, a moving average of the voltage effective value Vrms for five minutes, or a result of the voltage effective value Vrms passing a low-pass filter corresponding to a time constant for five minutes, may be used.

In the above example, it has been described that the power converter 541 has, in addition to the functions described in embodiment 3, a function of transmitting, to the control unit 544, output active power Pout and output reactive power Qout that the power converter 541 is outputting, or a function of transmitting, to the control unit 544, output active current Ipout and output reactive current Iqout that the power converter 541 is outputting. As in the power converter 541, a power converter 521 has a function of transmitting, to a control unit 523, output active power Pout and output reactive power Qout that the power converter 521 is outputting, or a function of transmitting, to the control unit 523, output active current Ipout and output reactive current Iqout that the power converter 521 is outputting. The operation is the same as that described above and therefore the description thereof is omitted.

As described above, according to embodiment 4, the power converter 541 has a function of transmitting output active power Pout and output reactive power Qout that the power converter 541 is outputting, or a function of transmitting output active current Ipout and output reactive current Iqout that the power converter 541 is outputting. Thus, it becomes possible to minutely set the upper end voltage and the lower end voltage of the dead band for the effective voltage of the voltage source device 201. In the case where the impedances of the distribution grid and the consumers 30 greatly differ among the consumers 30, minute setting for the upper end voltage and the lower end voltage of the dead band for the effective voltage as described in embodiment 4 makes it possible to more minutely reduce the reactive power borne by the voltage source device 201.

In embodiments 3 and 4, the output voltages of the power converters 241, 221, 541, are used as the voltage of the consumer, to output reactive powers of the power converters 241, 221, 541, 521 or correct the reactive power command values therefor. However, the voltage of the consumer may be voltage at another part. For example, voltage at the power receiving point X2 which corresponds to the consumer end and which is the connection point between the consumer 30 and the detection unit may be used as the voltage of the consumer, to output reactive powers of the power converters 241, 221, 541, 521 or correct the reactive power command values therefor. Alternatively, voltage of the consumer group may be used as the voltage of the consumer, that is, voltage at the power receiving point X0 between the voltage source and the distribution impedance, which corresponds to the consumer group end, may be used.

Embodiments 1 to 4 have shown the configurations in which, regarding the devices provided to the consumer 30, the power generation device 14 is provided with the power conversion device 11, 211, 511 and the power storage device 15 is provided with the power conversion device 12, 212, 512, and the power conversion devices have the respective control units. Alternatively, as shown in FIG. 24A to FIG. 24C, the calculation functions of the control units and the detection unit 13 may be collectively provided as a control device 1000, 2000, 3000 in the consumer 30.

Figure 24A:
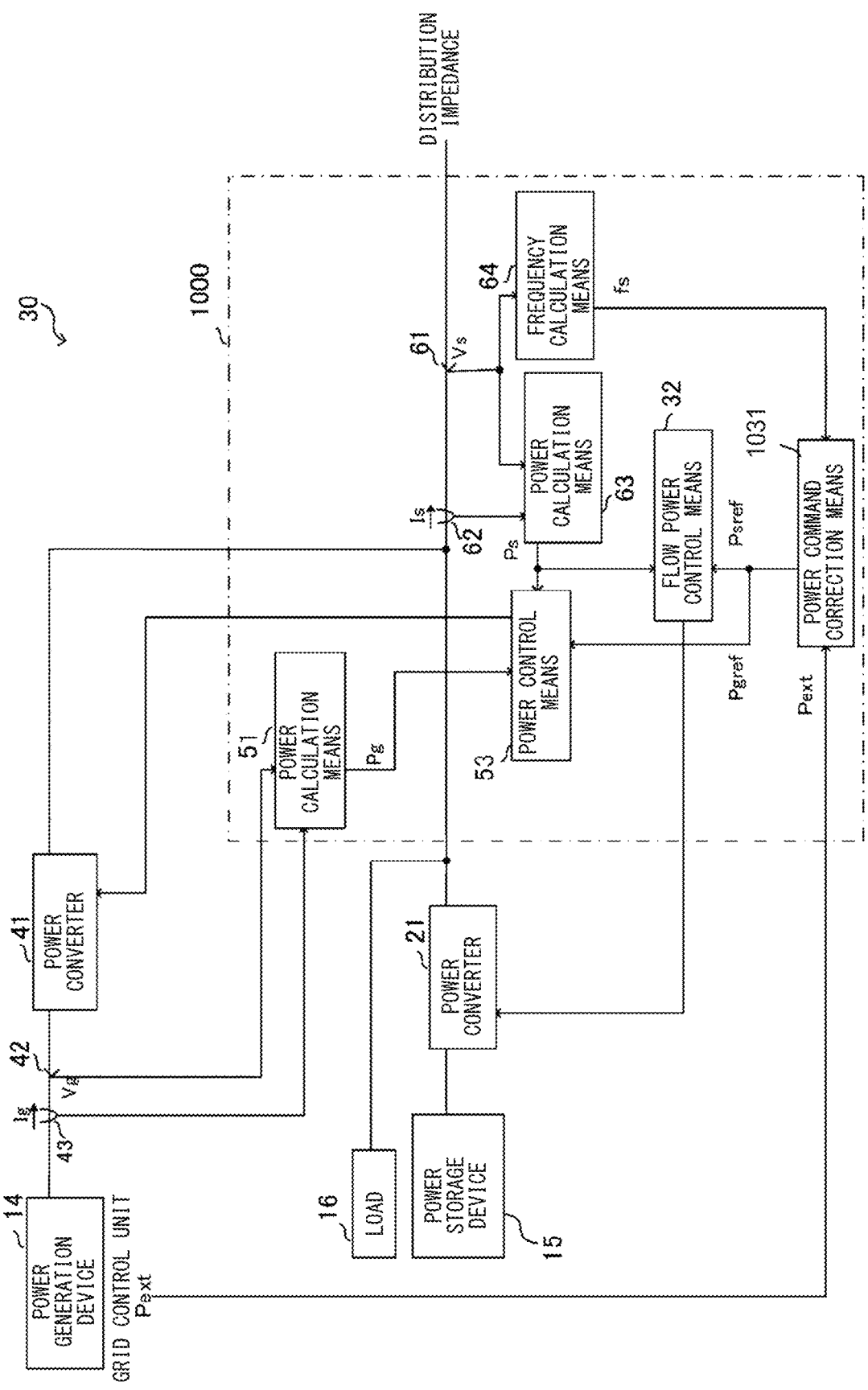
FIG. 24A is another schematic wiring diagram in the consumer having the power generation device and the power storage device shown in FIG. 2, in the grid system according to embodiment 1.

FIG. 24A shows the internal configuration of the consumer and is another schematic wiring diagram different from FIG. 2 in the consumer having the power generation device and the power storage device. In the drawing, the control device 1000 includes the voltage detection means 61, the current detection means 62, the power calculation means 63, the frequency calculation means 64, the power calculation means 51 which receives the output voltage Vg and the output current Ig from the power generation device 14, power command correction means 1031 which receives the frequency fs outputted from the frequency calculation means 64 and outputs the corrected power command value Pgref and the corrected power command value Psref based on Pext, the power control means 53 which outputs the drive command value Pref to the power converter 41 on the basis of the outputs from the power calculation means 51 and the power command correction means 1031, and the flow power control means 32 which outputs the drive command value Pref to the power converter 21. The operation is the same as that described in embodiment 1. The power command correction means 1031 has both of the functions of the power command correction means 52 and the power command correction means 31 shown in FIG. 2.

In the above description, an example in which the control functions of the control units 22, 44 and the detection unit in FIG. 2 in embodiment 1 are collectively provided in the control device 1000, has been shown. However, as a matter of course, the control functions in FIG. 15 in embodiment 2 or FIG. 21 in embodiment 4 can be collectively provided in one control device in the same manner.

Figure 24B:
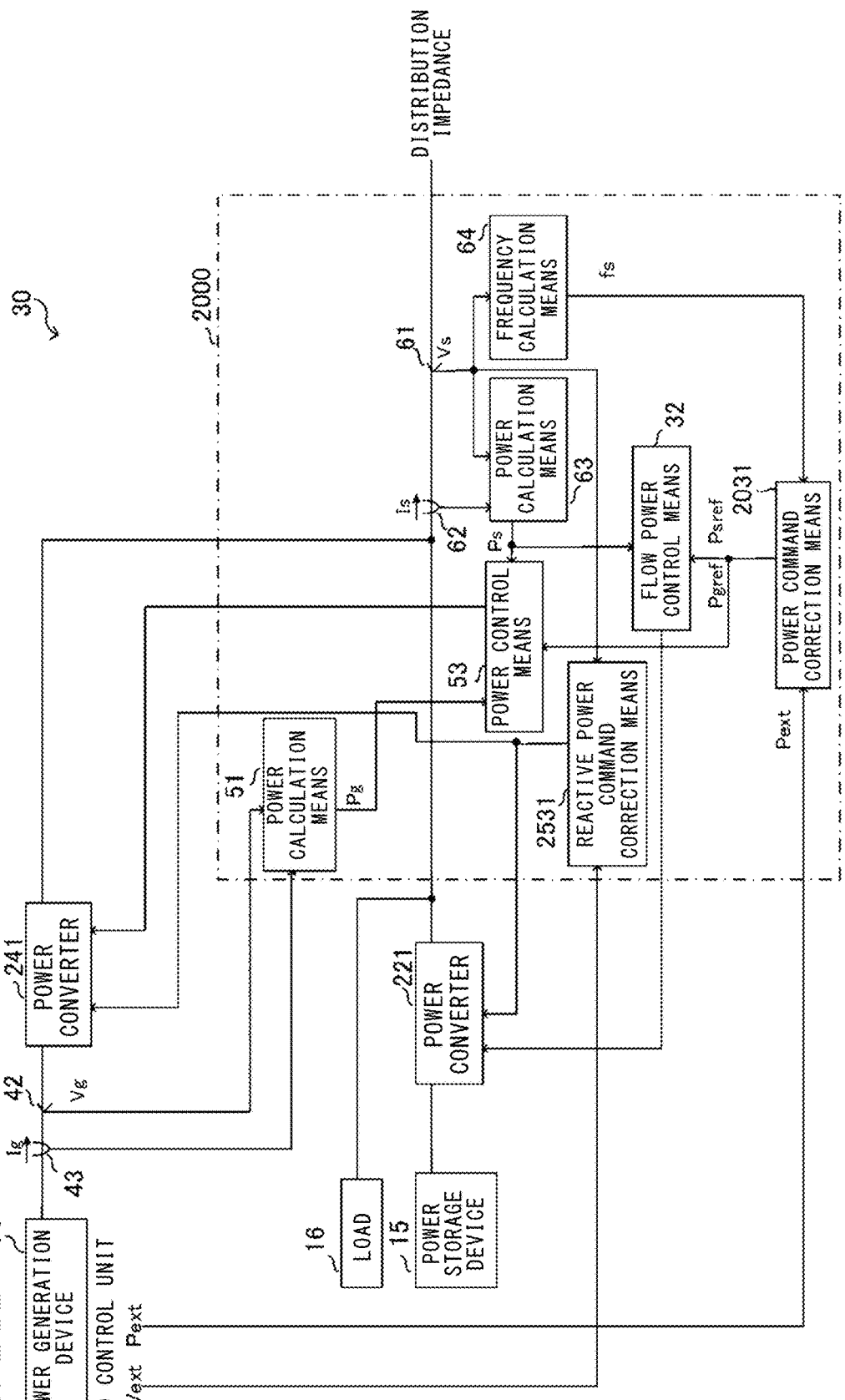
FIG. 24B is another schematic wiring diagram in the consumer having the power generation device and the power storage device shown in FIG. 15, in the grid system according to embodiment 3.
Figure 24C:
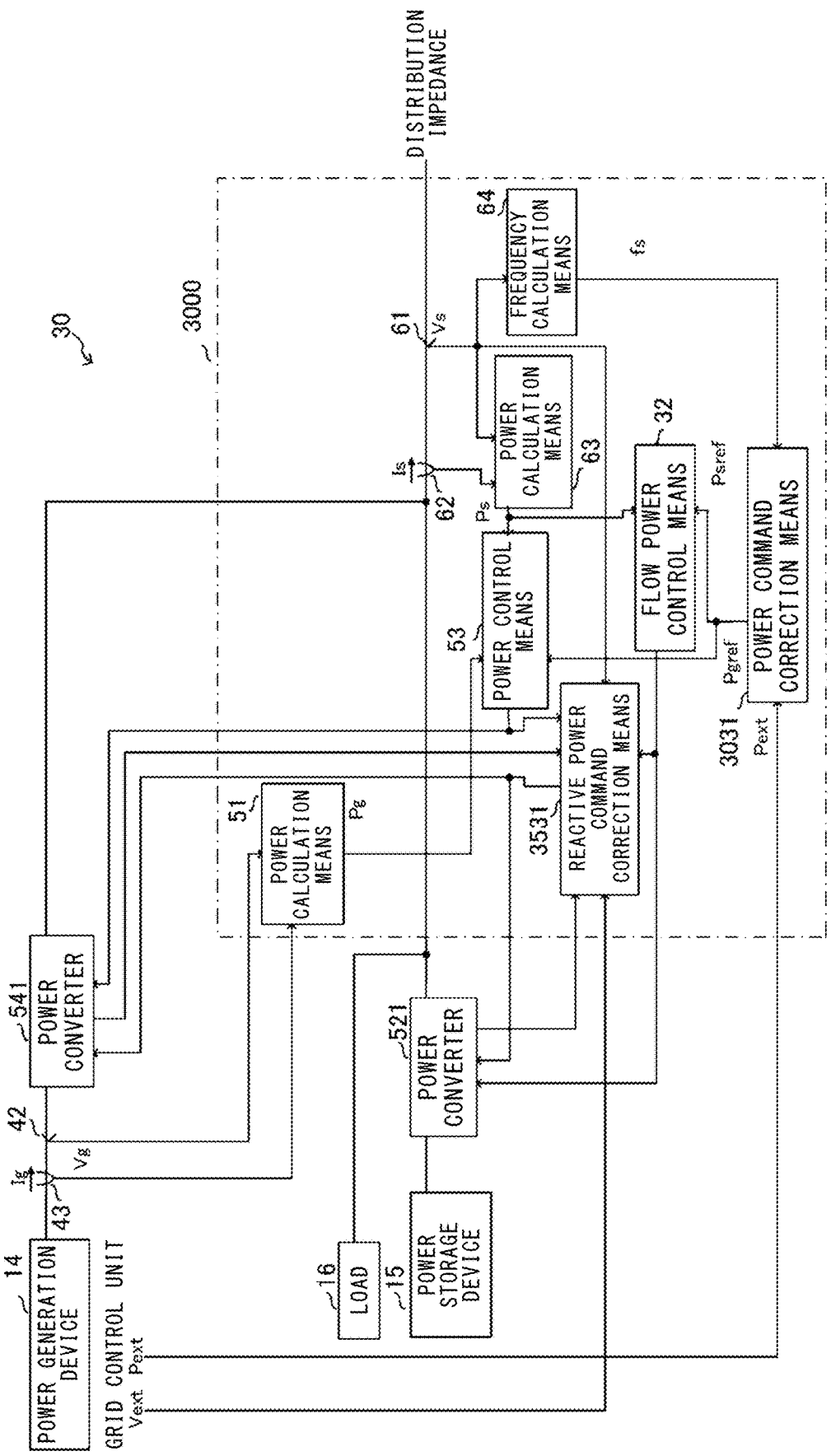
FIG. 24C is another schematic wiring diagram in the consumer having the power generation device and the power storage device shown in FIG. 21, in the grid system according to embodiment 4.

FIG. 24B shows the internal configuration of the consumer and is another schematic wiring diagram different from FIG. 15 in the consumer having the power generation device and the power storage device. In the drawing, a control device 2000 includes the voltage detection means 61, the current detection means 62, the power calculation means 63, the frequency calculation means 64, the power calculation means 51 which receives the output voltage Vg and the output current Ig from the power generation device 14, power command correction means 2031 which receives the frequency fs outputted from the frequency calculation means 64 and outputs the corrected power command value Pgref and the corrected power command value Psref based on Pext, the power control means 53 which outputs the drive command value Pref to the power converter 241 on the basis of the outputs from the power calculation means 51 and the power command correction means 2031, the flow power control means 32 which outputs the drive command value Pref to the power converter 221, and reactive power command correction means 2531 which receives the voltage Vs at the power receiving point and the voltage adjustment width Vext from the grid control unit and outputs the reactive power drive command value Qref to the power converter 241 and the power converter 221. The operation is the same as that described in embodiment 2. The power command correction means 2031 has both of the functions of the power command correction means 52 and the power command correction means 31 shown in FIG. 15, and the reactive power command correction means 2531 has both of the functions of the reactive power command correction means 251 and the reactive power command correction means 231 shown in FIG. 15.

FIG. 24C shows the internal configuration of the consumer and is another schematic wiring diagram different from FIG. 21 in the consumer having the power generation device and the power storage device. In the drawing, reactive power command correction means 3531 of a control device 3000 has, in addition to the function of the reactive power command correction means 2531 in FIG. 24B, a function of receiving the output active power Pout and the output reactive power Qout or the output active current Ipout and the output reactive current Iqout from the power converters 541, 521 and outputting the reactive power drive command value Qref. The operation is the same as that described in embodiment 4. Power command correction means 3031 has both of the functions of the power command correction means 52 and the power command correction means 31 shown in FIG. 21, and the reactive power command correction means 3531 has both of the functions of the reactive power command correction means 551 and reactive power command correction means 531 shown in FIG. 21.

Figure 25:
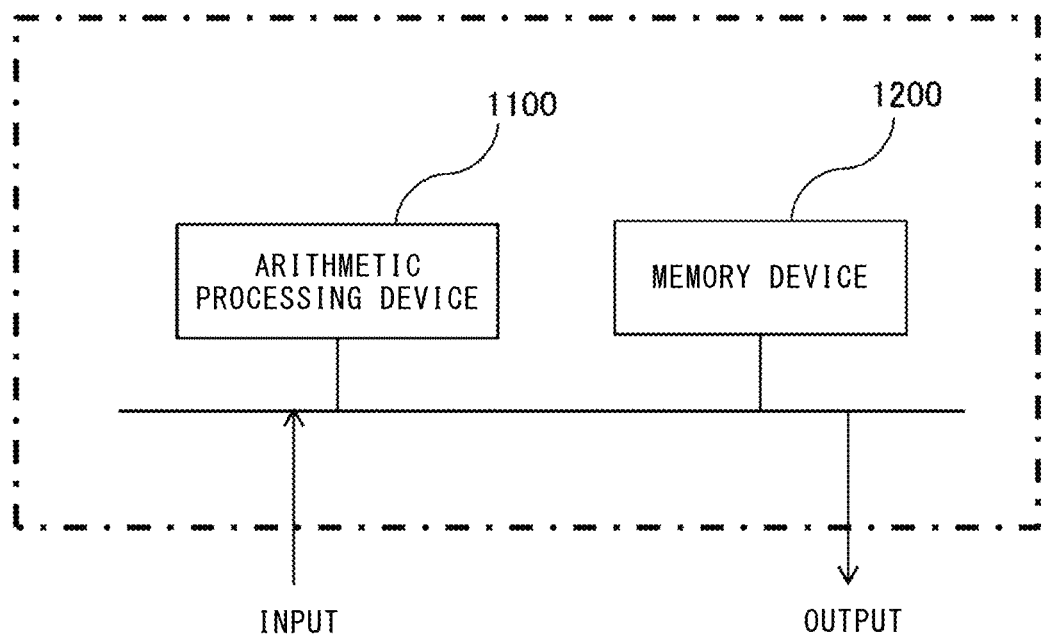
FIG. 25 is a hardware configuration diagram of the control device and the control unit.

FIG. 25 shows an example of a hardware configuration for the devices having the control functions in the grid systems of embodiments 1 to 4. The devices having the control functions are the grid control units 2, 102, 202, the control units 22, 44, 223, 244, 523, 544, the control devices 1000, 2000, 3000, the detection unit 13, and the like. In the drawing, an arithmetic processing device 1100 such as a processor is provided. It is noted that the arithmetic processing device 1100 may be provided with various types of logical circuits such as an application specific integrated circuit (ASIC), an integrated circuit (IC), or a digital signal processor (DSP), various types of signal processing circuits, and the like.

A memory device 1200 is connected to the arithmetic processing device 1100, and the arithmetic processing device 1100 executes a program received from the memory device 1200, for example. The memory device 1200 transmits/receives data to/from the arithmetic processing device 1100. The memory device 1200 includes a random access memory (RAM) configured to allow data to be read and written from the arithmetic processing device 1100, a read only memory (ROM) or a non-volatile memory (electrically erasable programmable read only memory (EEPROM)) to be configured to allow data to be read from the arithmetic processing device 1100, and the like. Further, an auxiliary memory device may be provided externally.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1, 115, 215 voltage source
2, 102, 202 grid control unit
3, 203, 503 consumer group
11, 12, 211, 212, 511, 512 power conversion device
13 detection unit
14 power generation device
15 power storage device
16 load
21, 41, 221, 241, 521, 541 power converter
22, 44, 223, 244, 523, 544 control unit
30 consumer
31, 52, 1031, 2031, 3031 power command correction means
32 flow power control means
42, 61, 112, 222, 242 voltage detection means
43, 62, 111 current detection means
51, 63, 113, 213 power calculation means
53 power control means
64 frequency calculation means
101, 201 voltage source device
114 frequency command correction means
214 amplitude command correction means
231, 251, 531, 551, 2531, 3531 reactive power command correction means
301, 304, 331, 334, 361, 364, 401, 404, 453, 463, 609 subtractor
302, 305, 332, 335, 362, 365, 402, 405, 451, 452, 461, 462, 603, 605 gain
303, 306, 310, 333, 336, 340, 363, 366, 370, 403, 406, 410, 455, 465, 601 limiter
307, 308, 309, 337, 339, 367, 369, 407, 409, 456, 466, 606, 607, 608, 610 adder
322, 325, 352, 355, 382, 385, 432, 435 PI controller
454, 464 integrator
602, 604 divider
630 filter
1000, 2000, 3000 control device
1100 arithmetic processing device
1200 memory device

The invention claimed is:

1. A grid system comprising:
a voltage source;
a plurality of consumers each connected to the voltage source via a distribution grid; and
a grid controller to transmit a power command value to each of the plurality of consumers, wherein
at least one of the plurality of consumers includes
a power generation device connected to a power receiving point which is a connection point with the distribution grid,
a power storage device connected to the power receiving point,
a first power conversion device provided between the power generation device and the power receiving point and including a first power converter for converting an output voltage of the power generation device to a predetermined AC voltage,
a second power conversion device provided between the power storage device and the power receiving point and including a second power converter for converting an output voltage of the power storage device to another predetermined AC voltage, and
a detector to acquire a frequency of a voltage at the power receiving point,
the first power conversion device includes a first power command corrector to correct the power command value from the grid controller on the basis of the frequency of the voltage at the power receiving point acquired by the detector, and a first power controller to control the first power converter on the basis of the power command value corrected by the first power command corrector, the second power conversion device includes a second power command corrector to correct the power command value from the grid controller on the basis of the frequency of the voltage at the power receiving point acquired by the detector, and a second power controller to control the second power converter on the basis of the power command value corrected by the second power command corrector, and the power command value corrected by the first power command corrector is set to be greater than the power command value corrected by the second power command corrector, wherein the first power conversion device includes a first reactive power command corrector to, when voltage of the at least one consumer becomes greater than a first predetermined voltage set in advance or becomes smaller than a second predetermined voltage set in advance, output a reactive power corresponding to a difference from the first predetermined voltage or the second predetermined voltage, and the second power conversion device includes a second reactive power command corrector to, when the voltage of the at least one consumer becomes greater than a third predetermined voltage set in advance or smaller than a fourth predetermined voltage set in advance, output a reactive power corresponding to a difference from the third predetermined voltage or the fourth predetermined voltage.

2. The grid system according to claim 1, wherein the first power controller controls the first power converter so that generated power of the power generation device does not exceed the power command value corrected by the first power command corrector.

3. The grid system according to claim 1, wherein the detector further acquires flow power at the power receiving point, and on the basis of the flow power acquired by the detector, the second power controller controls the second power converter so that the flow power at the power receiving point coincides with the power command value corrected by the second power command corrector.

4. The grid system according to claim 1, wherein the second power command corrector of the second power conversion device adjusts a correction amount for the power command value in accordance with a battery remaining amount of the power storage device.

5. The grid system according to claim 1, wherein the voltage source includes a frequency command corrector to correct a frequency of voltage outputted from the voltage source in accordance with active power borne by the voltage source.

6. The grid system according to claim 5, wherein the voltage source further includes a power storage device, and the frequency command corrector of the voltage source adjusts a correction amount for a frequency command for detected active power in accordance with a battery remaining amount of the power storage device of the voltage source.

7. The grid system according to claim 1, wherein the voltage of the consumer is the voltage at the power receiving point.

8. The grid system according to claim 1, wherein the first power conversion device includes the first reactive power command corrector to, when output voltage of the first power converter becomes greater than the first predetermined voltage set in advance or becomes smaller than the second predetermined voltage set in advance, output reactive power corresponding to a difference from the first predetermined voltage or the second predetermined voltage, and the second power conversion device includes the second reactive power command corrector to, when output voltage of the second power converter becomes greater than the third predetermined voltage set in advance or becomes smaller than the fourth predetermined voltage set in advance, output reactive power corresponding to a difference from the third predetermined voltage or the fourth predetermined voltage.

9. A control device for controlling at least one of a plurality of consumers connected to a voltage source via a distribution grid, based on a power command value from a grid controller connected to each of the plurality of consumers, the at least one of the plurality of consumers including
a power generation device connected to a power receiving point which is a connection point with the distribution grid,
a power storage device connected to the power receiving point,
a first power converter which is provided between the power generation device and the power receiving point, and which converts an output voltage of the power generation device to a predetermined AC voltage, and
a second power converter which is provided between the power storage device and the power receiving point, and which converts an output voltage of the power storage device to another predetermined AC voltage, the control device comprising:
a power command corrector to correct the power command value from the grid controller on the basis of a frequency of voltage at the power receiving point; and
a power controller to control the first power converter and the second power converter respectively based on different power command values corrected by the power command corrector, wherein the power command value for controlling the first power converter is set to be greater than the power command value for controlling the second power converter, the first power converter includes a first reactive power command corrector to, when voltage of the at least one consumer becomes greater than a first predetermined voltage set in advance or becomes smaller than a second predetermined voltage set in advance, output a reactive power corresponding to a difference from the first predetermined voltage or the second predetermined voltage, and the second power converter includes a second reactive power command corrector to, when the voltage of the at least one consumer becomes greater than a third predetermined voltage set in advance or smaller than a fourth predetermined voltage set in advance, output a reactive power corresponding to a difference from the third predetermined voltage or the fourth predetermined voltage.

10. The control device according to claim 9, wherein
the consumer includes a plurality of consumers,
at least one of the plurality of consumers is provided with the power generation device and the power storage device, and
the control device controls the devices provided to the plurality of consumers.

11. A control method for a grid system including a voltage source, a plurality of consumers each connected to the voltage source via a distribution grid, and a grid controller to transmit a power command value to each of the plurality of consumers, the method comprising:
 acquiring a frequency of a voltage at a power receiving point which is a connection point between the device and the distribution grid;
 correcting the power command value from the grid controller based on the frequency of the voltage at the power receiving point;
 converting an output voltage of a power generation device included in at least one consumer of the plurality of consumers and connected to the voltage source to a value of an AC voltage based on the corrected first power command value;
 converting an output voltage of a power storage device included in the at least one consumer of the plurality of consumers and connected to the voltage source to a value of the AC voltage based on a second power command value having a smaller value than the corrected first power command value;
 when voltage of the at least one consumer becomes greater than a first predetermined voltage set in advance or becomes smaller than a second predetermined voltage set in advance, outputting a reactive power corresponding to a difference from the first predetermined voltage or the second predetermined voltage; and
 when the voltage of the at least one consumer becomes greater than a third predetermined voltage set in advance or smaller than a fourth predetermined voltage set in advance, outputting a reactive power corresponding to a difference from the third predetermined voltage or the fourth predetermined voltage.

12. A power conversion device used in a grid system including a voltage source, a plurality of consumers connected to the voltage source via a distribution grid, and a grid controller to transmit a power command value to each of the plurality of consumers, the power conversion device having an end connected to the distribution grid via a power receiving point, and another end connected to a power generation device or a power storage device, the power conversion device comprising:
 a power converter to convert an output DC voltage of the power generation device or the power storage device to a predetermined AC voltage; and
 a controller to control the power converter based on the power command value transmitted from the grid controller, wherein
 the controller includes
  a power command corrector to correct the power command value transmitted from the grid controller, based on a frequency of voltage at the power receiving point,
  a power controller to control the power converter based on the power command value corrected by the power command corrector, and
  a reactive power command corrector,
 when the power generation device is connected,
  the power command corrector corrects the transmitted power command value so as to be increased, and
  when voltage of the at least one consumer becomes greater than a first predetermined voltage set in advance or becomes smaller than a second predetermined voltage set in advance, the reactive power command corrector outputs a reactive power corresponding to a difference from the first predetermined voltage or the second predetermined voltage, and
 when the power storage device is connected,
  the power command corrector corrects the transmitted power command value so as to be decreased, and
  when the voltage of the at least one consumer becomes greater than a third predetermined voltage set in advance or smaller than a fourth predetermined voltage set in advance, the reactive power command corrector outputs a reactive power corresponding to a difference from the third predetermined voltage or the fourth predetermined voltage.

13. The power conversion device according to claim 12, wherein
when the power generation device is connected, the power controller controls the power converter so that generated power does not exceed the power command value corrected by the power command corrector.

14. The power conversion device according to claim 12, wherein
on the basis of flow power at the power receiving point, the power controller controls the power converter so that the flow power at the power receiving point coincides with the power command value corrected by the power command corrector.

15. The power conversion device according to claim 12, wherein
when the power storage device is connected, the power command corrector adjusts a correction amount for the power command value in accordance with a battery remaining amount of the power storage device.

* * * * *